(12) United States Patent
Kurihara et al.

(10) Patent No.: US 12,458,643 B2
(45) Date of Patent: Nov. 4, 2025

(54) ANTIDEPRESSANT/ANXIOLYTIC DRUG IN WHICH PAC1 RECEPTOR ANTAGONIST IS USED

(71) Applicants: KAGOSHIMA UNIVERSITY, Kagoshima (JP); OSAKA UNIVERSITY, Osaka (JP)

(72) Inventors: Takashi Kurihara, Kagoshima (JP); Ichiro Takasaki, Toyama (JP); Hitoshi Hashimoto, Osaka (JP); Atsuko Hayata, Osaka (JP); Yusuke Shintani, Osaka (JP)

(73) Assignees: KAGOSHIMA UNIVERSITY, Kagoshima (JP); OSAKA UNIVERSITY, Osaka (JP)

( * ) Notice: Subject to any disclaimer, the term of this patent is extended or adjusted under 35 U.S.C. 154(b) by 503 days.

(21) Appl. No.: 17/997,974

(22) PCT Filed: May 7, 2021

(86) PCT No.: PCT/JP2021/017501
§ 371 (c)(1),
(2) Date: Nov. 5, 2022

(87) PCT Pub. No.: WO2021/225161
PCT Pub. Date: Nov. 11, 2021

(65) Prior Publication Data
US 2023/0181587 A1 Jun. 15, 2023

(30) Foreign Application Priority Data
May 8, 2020 (JP) ................. 2020-082465

(51) Int. Cl.
*A61K 31/519* (2006.01)
*A61K 31/4178* (2006.01)
*A61P 25/22* (2006.01)
*A61P 25/24* (2006.01)

(52) U.S. Cl.
CPC ........ *A61K 31/519* (2013.01); *A61K 31/4178* (2013.01); *A61P 25/22* (2018.01); *A61P 25/24* (2018.01)

(58) Field of Classification Search
CPC ... A61K 31/519; A61K 31/4178; A61P 25/22; A61P 25/24
USPC ....................................................... 514/258.1
See application file for complete search history.

(56) References Cited

U.S. PATENT DOCUMENTS 11,365,194 B2 * 6/2022 Kurihara ................. A61P 43/00
2022/0184081 A1 6/2022 Kurihara et al.

FOREIGN PATENT DOCUMENTS

| EP | 3932490 A1 | 1/2022 | |
| JP | 2019513398 A | 5/2019 | |
| WO | 2017181039 A1 | 10/2017 | |
| WO | WO-2019065794 A1 * | 4/2019 | ............. A61P 25/04 |
| WO | 2020175134 A1 | 9/2020 | |

OTHER PUBLICATIONS

Roman et al Psychoneuroendocrinology, 2014, 47, 151-165 (Year: 2014).*

(Continued)

*Primary Examiner* — Yevgeny Valenrod
(74) *Attorney, Agent, or Firm* — Lucas & Mercanti, LLP

(57) ABSTRACT

This invention relates to an antidepressant/anxiolytic drug comprising a compound represented by the following formula (I) or (II),

[Formula 1]

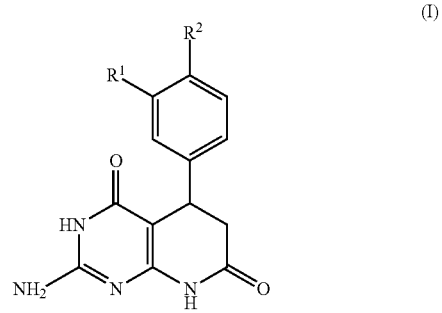

(I)

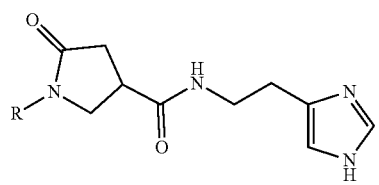

(II)

wherein $R^1$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group; $R^2$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group; and R is an indazolyl group substituted with a halogen atom; a substituted or unsubstituted phenyl group; a pyrazolyl group; or a substituted or unsubstituted aralkyl group;
or a salt thereof, or a solvate thereof.

14 Claims, 37 Drawing Sheets

(56) References Cited

OTHER PUBLICATIONS

Yokai et al., "Spinal astrocytic activation contributes to both induction and maintenance of pituitary adenylate cyclase-activating polypeptide type 1 receptor-induced long-lasting mechanical allodynia in mice", Molecular Pain, 2016, vol. 12, pp. 1-13.
Mabuchi et al., "Pituitary Adenylate Cyclase-Activating Polypeptide is Required for the Development of Spinal Sensitization and Induction of Neuropathic Pain", The Journal of Neuroscience, 2004, vol. 24, No. 33, pp. 7283-7291.
Roman et al., "PAC1 receptor antagonism in the bed nucleus of the stria terminal is (BNST) attenuates the endocrine and behavioral consequences of chronic stress", Psychoneuroendocrinology, 2014, vol. 47, pp. 151-165.
International Search Report for Corresponding International Application No. PCT/JP2021/017501, 2 pages, Jul. 13, 2021.
Takasaki et al., Synthesis of a novel and potent small-molecule antagonist of PAC1 receptor for the treatment of neuropathic pain, Eur J Med Chem, 2020, vol. 186, No. 111902, pp. 1-9.
Seiglie et al., "Pituitary adenylate cyclase-activating polypeptide induces a depressive-like phenotype in rats", Psychopharmacology, 2015, vol. 232, No. 20, pp. 3821-3831.
European Search Report for Corresponding European Application No. 21799745.1, May 10, 2024, 10 pages.
Seiglie et al., "Pituitary adenylate cyclase-activating polypeptide induces a depressive-like phenotype in rats", Psychopharmacology, 2015, vol. 232, No. 2, pp. 3821-3831.

\* cited by examiner

ANTIDEPRESSANT/ANXIOLYTIC DRUG IN WHICH PAC1 RECEPTOR ANTAGONIST IS USED

CROSS-REFERENCE TO RELATED APPLICATIONS

This application is a 371 of PCT/JP2021/017501, filed May 7, 2021, which claims the benefit of Japanese Patent Application No. 2020-082465, filed May 8, 2020.

TECHNICAL FIELD

The present invention relates to an antidepressant/anxiolytic drug using a PAC1 receptor antagonist.

BACKGROUND ART

Against the backdrop of stressful society in recent years, the number of patients consulting medical settings due to mental illness such as anxiety disorder, depression, or schizophrenia has drastically increased recently in Japan, and exceeded 3,920,000 people in 2014 and 4,000,000 people in 2017. "Anxiety disorder" is a common name for a disease group of mental illness with anxiety as a prominent symptom, while "depression" refers to a disease that causes severe depressed mood beyond a certain level. From epidemiological research in recent years, it has been reported that; anxiety disorder precedes approximately 40% of depression cases; and depression associated with anxiety disorder tends to become severe and treatment-resistant.

The treatment of anxiety disorder and/or depression is divided into drug therapy and mental therapy. For the drug therapy, recent drugs of the first choice are selective serotonin reuptake inhibitors (SSRIs), which are antidepressant drugs, for both anxiety disorder and depression, though benzodiazepine derivatives (BZDs: benzodiazepine receptor agonists) are also still often used for early-onset anxiety disorder. On the other hand, cognitive behavioral therapy is basically practiced in the mental therapy.

SSRI and BZD have their respective features, and combination therapy is recommended based on their advantages and disadvantages. SSRI has no immediate effect (requires 2 to 4 weeks for exerting its effect) and may exhibit adverse reactions such as drowsiness, nausea, loss of appetite, diarrhea, or loose stool, or temporary increase in anxiety (serotonin syndrome) at an initial stage (1 to 2 weeks) of administration. Also, SSRI has many drug interactions and causes withdrawal symptoms (headache, dizziness, cold-like symptoms, etc.) when discontinued abruptly. On the other hand, long-term use of BZD is likely to cause drug dependence and has the risk of abuse. The abrupt discontinuation of BZD also tends to cause rebound or withdrawal symptoms (insomnia, irritability, abnormal perception, etc.). As mentioned above, SSRI and BZD have many disadvantages or limitations, and their response rates are by no means high (response rate: 50% or less). Thus, there is a demand for developing a drug having novel mechanism of action.

In 2019, esketamine, an optical isomer of ketamine, was approved as nasal drops for concomitant use with an oral antidepressant in the USA and Europe. Esketamine reportedly has an immediate effect as compared with other antidepressant drugs. Furthermore, ketamine has been reported to also have a fast-acting effect on suicide ideation or suicidal feelings of severe depression patients. However, ketamine is known to have mental symptom-inducing action, dissociation symptoms, and addiction ascribable to repeated administration and thus has problems associated with safety.

PACAP (Pituitary Adenylate Cyclase-Activating Polypeptide) is a neuropeptide which was originally isolated from ovine hypothalamus based on its ability to stimulate adenylate cyclase in rat anterior pituitary cell cultures and structurally determined in 1989, and causes mechanical pain hypersensitivity (mechanical allodynia: the phenomenon of feeling pain even though the patient is only touched) through spinal PAC1 receptors (Non Patent Literature 1). However, it is unclear what type of pain PACAP is involved in clinically (in a human).

It is suggested that PACAP is involved in peripheral neuropathic (spinal neuropathic) pain (SNL model) at the level of animal experiments (mice and rats) (Non Patent Literature 2). However, it is unclear which PACAP receptor is involved (PACAP receptors have at least three types, which are PAC1, VPAC1 and VPAC2).

Patent Literature 1 states that an anti-PACAP antibody and an antigen binding fragment thereof are useful as preventive drugs or therapeutic drugs for depression, anxiety disorder, and the like.

Patent Literature 2 discloses that the compounds PA-8 and PA-9 and their derivatives have PAC1 receptor antagonistic action and analgesic action, but has no mention about antidepressant and/or anti-anxiety action.

The compound PA-8 is a compound represented by the following formula (A):

[Formula 1]

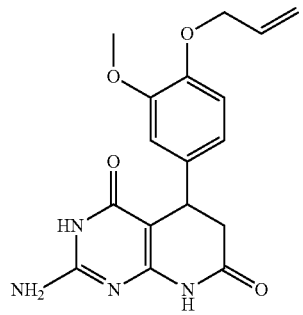

The compound PA-9 is a compound represented by the following formula (B):

[Formula 2]

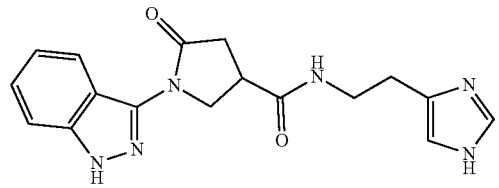

These compounds are common in that the compounds each have a nitrogen-containing heterocyclic structure containing two or more nitrogen atoms and a lactam structure.

CITATION LIST

Patent Literature

[Patent Literature 1] JP 2019-513398 A
[Patent Literature 2] WO 2019/065794

Non Patent Literature

[Non Patent Literature 1] Yokai et al. Mol. Pain 2016. 12, 1-13.
[Non Patent Literature 2] Mabuchi et al., J Neurosci 2004, 24, 7283-7291.

SUMMARY OF INVENTION

Technical Problem

An object of the present invention is to provide an antidepressant/anxiolytic drug that has a different mechanism of action from that of SSRI or BZD which has heretofore been generally used in anxiety disorder and/or depression treatment, and is effective for treatment-resistant (intractable) stress disorder, anxiety disorder, and/or depression.

Solution to Problem

The present inventors have conducted diligent studies to attain the object and consequently completed the present invention by finding that the compounds PA-8 and PA-9 described in Patent Literature 2 and their derivatives exhibit a strong anti-anxiety and/or antidepressant effect on mice that manifest anxiety and/or depressive-like behavior resulting from restraint or chronic social defeat stress.

More specifically, the present invention will be summarized as follows.

(1) An antidepressant/anxiolytic drug comprising a compound represented by the following formula (I),

[Formula 3]

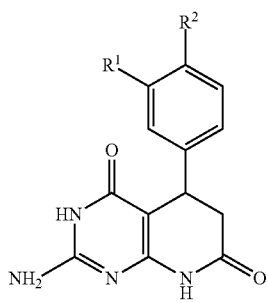

(I)

wherein $R^1$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group; and $R^2$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group;
or a salt thereof, or a solvate thereof.

(2) The antidepressant/anxiolytic drug according to (1) for treating and/or preventing anxiety disorder, stress disorder and/or depression.

(3) The antidepressant/anxiolytic drug according to (1) or (2), which is orally administered.

(4) An antidepressant/anxiolytic drug comprising a compound represented by the following formula (II),

[Formula 4]

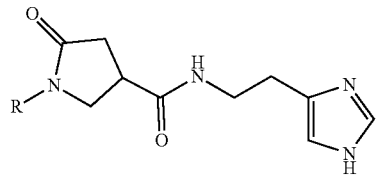

(II)

wherein R is an indazolyl group substituted with a halogen atom; a substituted or unsubstituted phenyl group; a pyrazolyl group; or a substituted or unsubstituted aralkyl group; or a salt thereof, or a solvate thereof.

(5) The antidepressant/anxiolytic drug according to (4), wherein R is an indazolyl group substituted with a halogen atom in the formula (II).

(6) The antidepressant/anxiolytic drug according to (4), wherein R is an indazolyl group substituted with a chlorine atom in the formula (II).

(7) The antidepressant/anxiolytic drug according to any one of (4) to (6) for treating and/or preventing anxiety disorder, stress disorder and/or depression.

(8) The antidepressant/anxiolytic drug according to any one of (4) to (7), which is orally administered.

Advantageous Effects of Invention

The antidepressant/anxiolytic drug of the present invention has a different mechanism (PAC1 receptor antagonistic action) from that of SSRI or BZD which has heretofore been generally used in anxiety disorder and/or depression treatment, and enables anxiety disorder and/or depression treatment that avoids a sedative effect (which leads to harmful actions such as drowsiness or dizziness) in a drug efficacy amount often found in study on the effect of BZD and/or SSRI using rodents.

Although not exhibiting pharmacological action on normal mice, the antidepressant/anxiolytic drug of the present invention is highly effective for pathological models (stress-induced anxiety- and/or depression-like model mice) and thus enables treatment dedicated to the pathological condition with fewer adverse reactions.

Moreover, the antidepressant/anxiolytic drug of the present invention has both anti-anxiety and antidepressant actions and can therefore be expected to improve QOL of patients with depression associated with anxiety disorder which is reportedly highly intractable.

DESCRIPTION OF EMBODIMENTS

Figure 1:
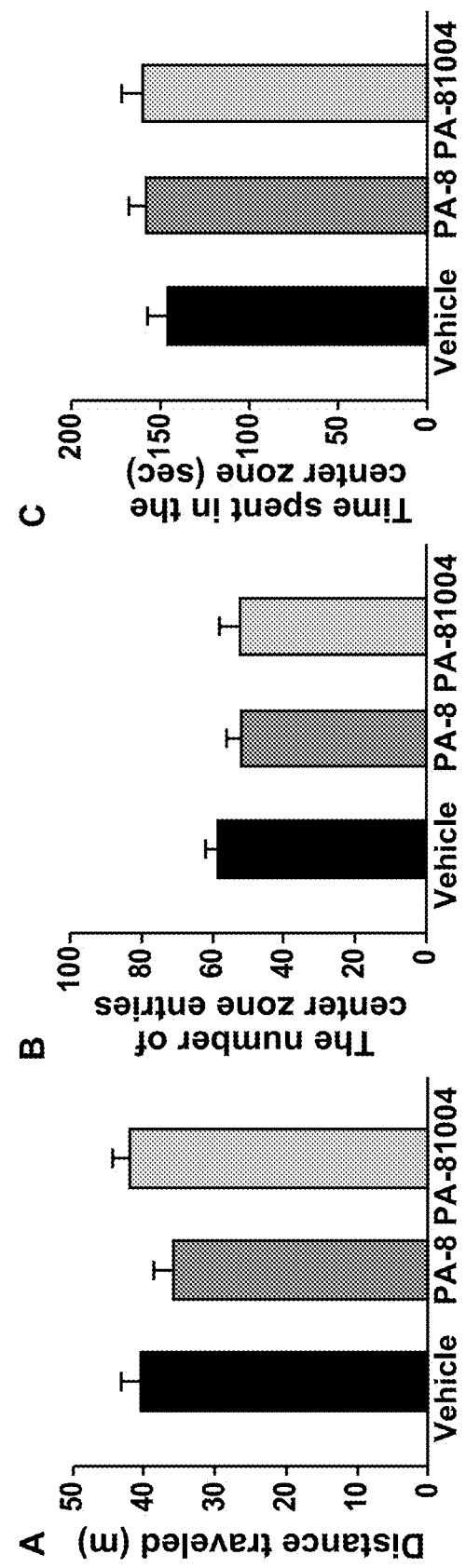
FIG. 1 shows the effects of PA-8 and PA-81004 in normal mice (evaluation by an open field test).

The present invention will be described in detail hereinafter.

Examples of the $C_{1-6}$-alkyl group represented by $R^1$ or $R^2$ in the formula (I) include a methyl group, an ethyl group, a propyl group, an isopropyl group, a butyl group, an isobutyl group, a sec-butyl group (1-methylpropyl group), a tert-butyl group, a pentyl group, an isopentyl group, 1-ethylpropyl group, a hexyl group, a cyclopropyl group, a cyclobutyl group, a cyclopentyl group and a cyclohexyl group.

Examples of the $C_{1-6}$-alkoxy group represented by $R^1$ or $R^2$ in the formula (I) include a methoxy group, an ethoxy group, a propoxy group, an isopropoxy group, a butoxy group, an isobutoxy group, a sec-butoxy group, a tert-butoxy group, a pentyloxy group, an isopentyloxy group, a hexyloxy group, a cyclopropyloxy group, a cyclobutyloxy group, a cyclopentyloxy group and a cyclohexyloxy group.

Examples of the $C_{2-6}$-alkenyloxy group represented by $R^1$ or $R^2$ in the formula (I) include a vinyloxy group, a 1-propenyloxy group, an allyloxy group, a 1-butenyloxy group, a 2-butenyloxy (crotyloxy) group, a pentenyloxy group, a 3-methyl-2-butenyloxy (prenyloxy) group and a hexenyloxy group.

Examples of the halogen atom represented by $R^1$ or $R^2$ in the formula (I) include a fluorine atom, a chlorine atom, a bromine atom and an iodine atom.

Examples of the $C_{1-6}$-haloalkyl group represented by $R^1$ or $R^2$ in the formula (I) include a trifluoromethyl group.

Examples of the $C_{1-6}$-haloalkoxy group represented by $R^1$ or $R^2$ in the formula (I) include a trifluoromethoxy group.

The phenyl group represented by $R^1$ or $R^2$ in the formula (I) may be substituted with one or more substituents selected from a $C_{1-6}$-alkyl group, a $C_{1-6}$-alkoxy group, a methylenedioxy group, a $C_{2-6}$-alkenyloxy group, an aralkyloxy group (for example, a benzyloxy group, a 4-methylbenzyloxy group, a 3-methylbenzyloxy group, a 2-methylbenzyloxy group, a 4-fluorobenzyloxy group, a 3-fluorobenzyloxy group, a 4-chlorobenzyloxy group and a 3-chlorobenzyloxy group), a halogen atom, a $C_{1-6}$-haroalkyl group, a $C_{1-6}$-haroalkoxy group, a substituted or unsubstituted phenyl group, an acyl group (for example, a $C_{1-6}$-aliphatic acyl group such as a formyl group, an acetyl group, a propanoyl group, a butanoyl group, a pentanoyl group and a hexanoyl group; and an aroyl group such as a benzoyl group and a toluoyl group), an acyloxy group (for example, a $C_{1-6}$-aliphatic acyloxy group such as a formyloxy group, an acetoxy group, a propanoyloxy group, a butanoyloxy group, a pentanoyloxy group and a hexanoyloxy group; and an aroyloxy group such as a benzoyloxy group and a toluoyloxy group), a hydroxyl group, a carboxyl group, an acetamido group, a carbamoyl group, a cyano group, a nitro group, and the like.

Among the compounds represented by the formula (I), compounds wherein $R^1$ is a $C_{1-6}$-alkoxy group or a $C_{1-6}$-haroalkoxy group (for example, a trifluoromethoxy group) are preferable.

An indazolyl group substituted with a halogen atom and represented by R in the formula (II) is not particularly limited as long as it is an indazolyl group substituted with at least one halogen atom selected from fluorine atoms, chlorine atoms, bromine atoms and iodine atoms (preferably chlorine atom). However, preferable examples thereof include a 3-indazolyl group substituted with at least one chlorine atom.

Examples of the aralkyl group represented by R in the formula (II) include a benzyl group and a phenethyl group.

The phenyl and aralkyl group represented by R in the formula (II) may be substituted with one or more substituents selected from a $C_{1-6}$-alkyl group (for example, a methyl group, an ethyl group, a propyl group, an isopropyl group, a butyl group, an isobutyl group, a sec-butyl group (1-methylpropyl group), a tert-butyl group, a pentyl group, an isopentyl group, 1-ethylpropyl group, a hexyl group, a cyclopropyl group, a cyclobutyl group, a cyclopentyl group and a cyclohexyl group), a $C_{1-6}$-alkoxy group (for example, a methoxy group, an ethoxy group, a propoxy group, an isopropoxy group, a butoxy group, an isobutoxy group, a sec-butoxy group, a tert-butoxy group, a pentyloxy group, an isopentyloxy group, a hexyloxy group, a cyclopropyloxy group, a cyclobutyloxy group, a cyclopentyloxy group and a cyclohexyloxy group), a methylenedioxy group, a $C_{2-6}$-alkenyloxy group, an aralkyloxy group (for example, a benzyloxy group, a 4-methylbenzyloxy group, a 3-methylbenzyloxy group, a 2-methylbenzyloxy group, a 4-fluorobenzyloxy group, a 3-fluorobenzyloxy group, a 4-chlorobenzyloxy group and a 3-chlorobenzyloxy group), a halogen atom (such as a fluorine atom, a chlorine atom, a bromine atom and an iodine atom), a $C_{1-6}$-haroalkyl group, a $C_{1-6}$-haroalkoxy group, a substituted or unsubstituted phenyl group, an acyl group (for example, a $C_{1-6}$-aliphatic acyl group such as a formyl group, an acetyl group, a propanoyl group, a butanoyl group, a pentanoyl group and a hexanoyl group; and an aroyl group such as a benzoyl group and a toluoyl group), an acyloxy group (for example, a $C_{1-6}$-aliphatic acyloxy group such as a formyloxy group, an acetoxy group, a propanoyloxy group, a butanoyloxy group, a pentanoyloxy group and a hexanoyloxy group; and an aroyloxy group such as a benzoyloxy group and a toluoyloxy group), a hydroxyl group, a carboxyl group, an acetamido group, a carbamoyl group, a cyano group, a nitro group, and the like.

The salt of a compound represented by the formula (I) or (II) is preferably a pharmaceutically acceptable salt, and examples of the salt include a salt of the compound with an inorganic acid such as hydrochloric acid, sulfuric acid, phosphoric acid, hydrobromic acid, hydroiodic acid, nitric acid, pyrosulfuric acid and metaphosphoric acid or with an organic acid such as citric acid, benzoic acid, acetic acid, propionic acid, fumaric acid, maleic acid and sulfonic acid (for example, methanesulfonic acid, p-toluene sulfonic acid, naphthalene sulfonic acid).

Examples of a solvate of a compound represented by the formula (I) or (II), or a salt thereof include a hydrate.

A compound represented by the formula (I) can be produced, for example, according to the method described in Shi, D. Q. et al. J. Heterocyclic Chem. 2009, 46, 1331-1334, or Tu, S. et al. Bioorg. Med. Chem. Lett. 2006, 16, 3578-3581, as follows.

[Formula 5]

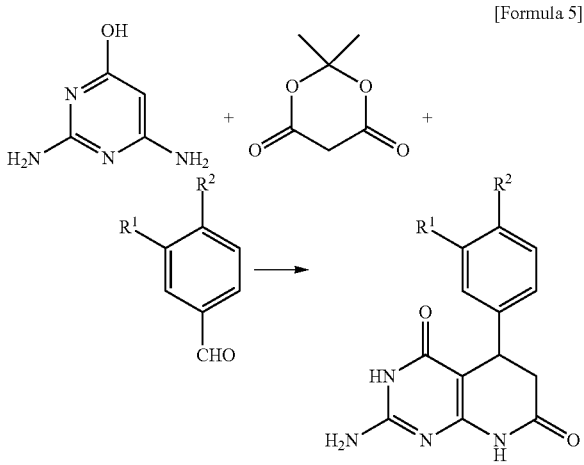

wherein $R^1$ and $R^2$ have the same meaning as defined in the formula (I).

Specifically, a target compound (I) can be manufactured by heating and reacting the corresponding aromatic aldehyde compound, 2,4-diamino-6-hydroxypyrimidine (another name: 2,6-diaminopyrimidin-4(3H)-one) and Meldrum's acid, (i) in water in the presence of triethylbenzylammonium chloride, (ii) while being irradiated with a microwave, or (iii) in an organic solvent.

A compound represented by the formula (II) can be produced, for example, according to the method described in JP 2006-510596 A, as follows.

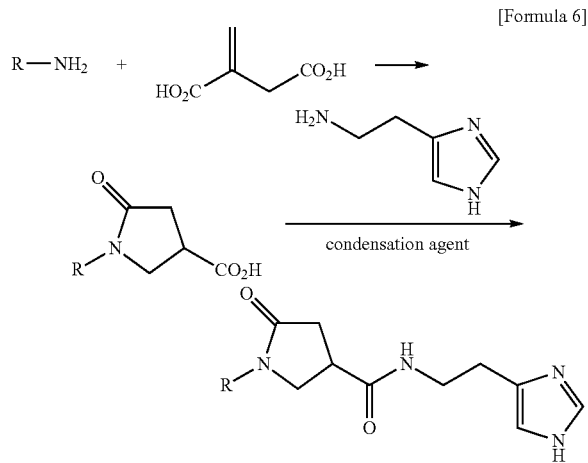

[Formula 6]

wherein R has the same meaning as defined in the formula (II).

Specifically, a target compound (II) can be manufactured by reacting the corresponding amine compound and itaconic acid to convert them into γ-lactam carboxylic acid, and then reacting the γ-lactam carboxylic acid with histamine in the presence of a condensing agent (for example, carbodiimide).

The product obtained as mentioned above may be purified by a customary method, for example, column chromatography using, e.g., silica gel, as a carrier and a recrystallization method using, e.g., methanol, ethanol, chloroform, dimethyl sulfoxide, n-hexane-ethyl acetate or water. Examples of an elution solvent for column chromatography include methanol, ethanol, chloroform, acetone, hexane, dichloromethane, ethyl acetate and mixed solvents of these.

The compound as mentioned above can be used as an antidepressant/anxiolytic drug in combination with a customary pharmaceutical carrier. The dosage form thereof is not particularly limited and appropriately selected and used depending on needs. Examples of the dosage form include oral agents such as a tablet, a capsule, a granule, a fine granule, a powder, a sustained release preparation, a liquid preparation, a suspension, an emulsion, a syrup and an elixir and parenteral agents such as an injection and a suppository, and oral agents are preferable.

An oral agent is produced by using, for example, starch, lactose, sucrose, mannitol, carboxymethylcellulose and inorganic salts in accordance with an ordinary method. In addition to these components, e.g., a binder, a disintegrant, a surfactant, a lubricant, a glidant, a flavoring agent, a colorant and/or a perfume can be appropriately added.

Examples of the binder include starch, dextrin, gum arabic, gelatin, hydroxypropyl starch, methylcellulose, sodium carboxymethylcellulose, hydroxypropylcellulose, crystalline cellulose, ethylcellulose, polyvinyl pyrrolidone and macrogol.

Examples of the disintegrant include starch, hydroxypropyl starch, sodium carboxymethylcellulose, calcium carboxymethylcellulose, carboxymethylcellulose and a low-substituted hydroxypropylcellulose.

Examples of the surfactant include sodium lauryl sulfate, soy lecithin, sucrose fatty acid ester and polysorbate 80.

Examples of the lubricant include talc, wax, hydrogenated vegetable oil, sucrose fatty acid ester, magnesium stearate, calcium stearate, aluminum stearate and polyethylene glycol.

Examples of the glidant include light anhydrous silicic acid, dry aluminum hydroxide gel, synthetic aluminum silicate and magnesium silicate.

An injection is produced in accordance with an ordinary method. As a diluent, generally, distilled water for injection, saline, a glucose solution, olive oil, sesame oil, peanut oil, soybean oil, corn oil, propylene glycol, polyethylene glycol, and/or the like can be used. If necessary, a disinfectant, a preservative, a stabilizer, an isotonic agent, a soothing agent, and/or the like may be added. In view of stability, an injection can be added in, e.g., a vial, frozen and subjected to ordinary lyophilization to remove a water content. From the lyophilized injection, a liquid preparation can be prepared again immediately before use. The content of a compound of the formula (I) or (II) in the injection may be varied between the 5 and 50 wt %; however, the content is not limited to this.

Examples of other parenteral agents include a suppository for intrarectal administration and an external preparation for local administration (for example, eye drop, ointment and paste), which can be produced in accordance with an ordinary method.

The administration schedule of an antidepressant/anxiolytic drug formulated varies depending on, e.g., the dosage form and the route of administration, and, for example, can be administered once to four times per day in a period from a week to 3 months.

In order to obtain a desired effect, the dose of an oral agent, which varies depending on the age, body weight and severity of a disease of a patient, is usually, for example, 0.1 to 1000 mg and preferably 1 to 500 mg per adult in terms of the weight of a compound of the formula (I) or (II), and suitably divided into several portions per day and administered.

In order to obtain a desired effect, the dose of a parenteral agent, which varies depending on the age, body weight and severity of a disease of a patient, is usually, for example, 0.1 to 1000 mg and preferably 1 to 500 mg per adult in terms of the weight of a compound of the formula (I) or (II), and suitably administered by intravenous injection, intravenous drip infusion, subcutaneous injection, intramuscular injection, intraperitoneal administration or intrathecal administration.

The antidepressant/anxiolytic drug of the present invention has a different mechanism (PAC1 receptor antagonistic action) from that of SSRI or BZD and enables anxiety disorder and/or depression treatment that avoids a sedative effect (which leads to harmful actions such as drowsiness or dizziness) in a drug efficacy amount often found in study on the effect of BZD and/or SSRI using rodents.

Although not exhibiting pharmacological action on normal mice, the antidepressant/anxiolytic drug of the present invention exhibits is highly effective for pathological models (stress-induced anxiety- and/or depression-like model mice) and thus enables treatment dedicated to the pathological condition with fewer adverse reactions.

Thus, the antidepressant/anxiolytic drug of the present invention is useful for treating and/or preventing mental illness, particularly, mental illness such as anxiety disorder, stress disorder and/or depression.

This description includes part or all of the content as disclosed in the description and/or drawing of Japanese Patent Application No. 2020-082465, which is a priority document of the present application.

EXAMPLES

Now, the present invention will be more specifically described below by way of Examples; however, the scope of the present invention is not limited to them.

[Example 1] Synthesis of pyrido[2,3-d]pyrimidine Derivatives

[Formula 7]

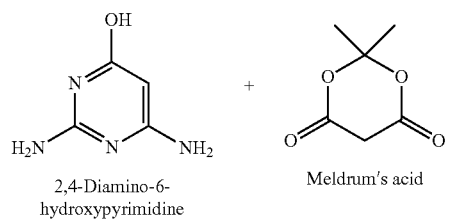

2,4-Diamino-6-hydroxypyrimidine        Meldrum's acid

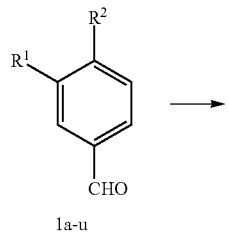

1a-u

1a: $R^1$ = Me, $R^2$ = OEt
1b: $R^1$ = OMe, $R^2$ = OEt
1c: $R^1$ = OMe, $R^2$ = On-Pr[2)]
1d: $R^1$ = $R^2$ = OEt
1e: $R^1$ = $R^2$ = F
1f: $R^1$ = Br, $R^2$ = OEt
1g: $R^1$ = OEt, $R^2$ = OMe
1h: $R^1$ = O(CH$_2$CH=CH$_2$), $R^2$ = OMe[3)]
1i: $R^1$ = On-Pr, $R^2$ = OMe[4)]
1j: $R^1$ = OEt, $R^2$ = H
1k: $R^1$ = O(CH$_2$CH=CH$_2$), $R^2$ = H
1l: $R^1$ = Cl, $R^2$ = OEt[5)]
1m: $R^1$ = Cl, $R^2$ = H
1n: $R^1$ = Br, $R^2$ = H
1o: $R^1$ = OCF$_3$, $R^2$ = H
1p: $R^1$ = OMe, $R^2$ = H
1q: $R^1$ = On-Pr, $R^2$ = H
1r: $R^1$ = Ph, $R^2$ = H
1s: $R^1$ = Et, $R^2$ = H[6)]
1t: $R^1$ = n-Pr, $R^2$ = H[7)]
1u: $R^1$ = n-Bu, $R^2$ = H

-continued

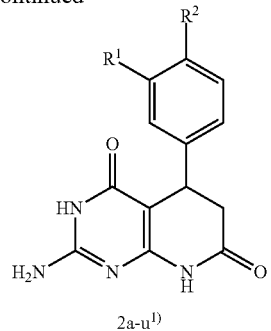

2a-u[1)]

2a: $R^1$ = Me, $R^2$ = OEt (46%)
2b: $R^1$ = OMe, $R^2$ = OEt (37%)
2c: $R^1$ = OMe, $R^2$ = On-Pr (38%)
2d: $R^1$ = $R^2$ = OEt (41%)
2e: $R^1$ = $R^2$ = F (34%)
2f: $R^1$ = Br, $R^2$ = OEt (40%)
2g: $R^1$ = OEt, $R^2$ = OMe (45%)
2h: $R^1$ = O(CH$_2$CH=CH$_2$), $R^2$ = OMe (35%)
2i: $R^1$ = On-Pr, $R^2$ = OMe (41%)
2j: $R^1$ = OEt, $R^2$ = H (43%)
2k: $R^1$ = O(CH$_2$CH=CH$_2$), $R^2$ = H (45%)
2l: $R^1$ = Cl, $R^2$ = OEt (30%)
2m: $R^1$ = Cl, $R^2$ = H (35%)[3)]
2n: $R^1$ = Br, $R^2$ = H (25%)
2o: $R^1$ = OCF$_3$, $R^2$ = H (23%)
2p: $R^1$ = OMe, $R^2$ = H (35%)
2q: $R^1$ = On-Pr, $R^2$ = H (32%)
2r: $R^1$ = Ph, $R^2$ = H (37%)
2s: $R^1$ = Et, $R^2$ = H (37%)
2t: $R^1$ = n-Pr, $R^2$ = H (18%)
2u: $R^1$ = n-Bu, $R^2$ = H (30%)

To a solution of the corresponding aldehyde (1.00 mmol) from the commercial aldehydes (1a, b, d, e, f, g, j, k, m, n, o, p, q and r) and the aldehydes known in Literatures (1c, h, i, l, s and t) in ethylene glycol (0.5 mL) were sequentially added at room temperature 2,4-diamino-6-hydroxypyrimidine (0.67 mmol) and Meldrum's acid (1.00 mmol), and the mixture was stirred at 100° C. for 20 hours in an Ar atmosphere in accordance with a method described in Literature[1)]. The reaction liquid was let to cool, then filtered, and further washed with methanol (0.5 mL×3) to obtain pale yellow crystals 2a to u, respectively.

2-Amino-5-(4-ethoxy-3-methylphenyl)-5,8-dihydro-3H,6H-pyrido[2,3-d]pyrimidine-4,7-dione (2a)

Yield: 46%; mp: >300° C.; IR (KBr): 3455, 3166, 2856, 2699, 1578, 1477 cm$^{-1}$; $^1$H NMR (400 MHz, DMSO-d6): δ 10.55 (1H, br s), 10.01 (1H, s), 6.90 (1H, d, J=2.4 Hz), 6.84 (1H, dd, J=8.8, 2.4 Hz), 6.77 (1H, d, J=8.8 Hz), 6.51 (2H, br s), 4.00 (1H, d, J=7.6 Hz), 3.95 (2H, q, J=7.0 Hz), 2.88 (1H, dd, J=16.0, 7.6 Hz), 2.42 (1H, d, J=16.0 Hz), 2.07 (3H, s), 1.29 (3H, t, J=7.0 Hz); $^{13}$C NMR (100 MHz, DMSO-d6): δ 171.10, 161.42, 156.45, 155.20, 154.95, 135.08, 128.74, 125.49, 124.61, 111.22, 92.07, 63.14, 32.12, 16.21, 14.83; MS (EI) m/z 314 (M+).

2-Amino-5-(4-ethoxy-3-methoxyphenyl)-5,8-dihydro-3H,6H-pyrido[2,3-d]pyrimidine-4,7-dione (2b)

Yield: 37%; mp: >300° C.; IR (KBr): 3462, 3309, 2850, 2743, 1582, 1521 cm$^{-1}$; $^1$H NMR (400 MHz, DMSO-d6): δ

10.57 (1H, br s), 10.02 (1H, s), 6.84 (1H, d, J=2.3 Hz), 6.78 (1H, d, J=8.7 Hz), 6.53 (1H, dd, J=8.7, 2.3 Hz), 6.50 (2H, br s), 4.05 (1H, d, J=7.7 Hz), 3.92 (2H, q, J=6.9 Hz), 3.69 (3H, s), 2.88 (1H, dd, J=16.4, 7.7 Hz), 1.27 (3H, t, J=6.9 Hz); $^{13}$C NMR (100 MHz, DMSO-d6): δ 171.34, 161.47, 156.43, 155.01, 148.89, 146.63, 136.09, 117.65, 112.90, 111.24, 92.03, 63.73, 55.38, 38.71, 32.44, 14.81; MS (EI) m/z 330 (M+).

2-Amino-5-(3-methoxy-4-propoxyphenyl)-5,8-dihydro-3H,6H-pyrido[2,3-d]pyrimidine-4,7-dione (2c)

Yield: 38%; mp: >300° C.; IR (KBr): 3450, 3167, 2959, 2876, 1652, 1591 cm$^{-1}$; $^1$H NMR (400 MHz, DMSO-d6): δ 10.57 (1H, br s), 10.03 (1H, br s), 6.83 (1H, d, J=2.3 Hz), 6.79 (1H, d, J=8.4 Hz), 6.52 (1H, dd, J=8.4, 2.3 Hz), 6.51 (2H, br s), 4.05 (1H, d, J=7.9 Hz), 3.82 (2H, t, J=7.1 Hz), 3.69 (3H, s), 2.88 (1H, dd, J=16.4, 7.9 Hz), 1.67 (2H, sext, J=7.1 Hz), 0.92 (3H, t, J=7.1 Hz); $^{13}$C NMR (100 MHz, DMSO-d6): δ 171.22, 161.69, 158.44, 157.50, 146.831, 145.48, 137.33, 117.79, 113.05, 111.44, 99.65, 69.86, 55.57, 38.73, 32.52, 22.20, 10.53; MS (EI) m/z 344 (M+).

2-Amino-5-(3,4-diethoxyphenyl)-5,8-dihydro-3H,6H-pyrido[2,3-d]pyrimidine-4,7-dione (2d)

Yield: 41%; mp: >300° C.; IR (KBr): 3188, 2977, 2868, 1653, 1635 cm$^{-1}$; $^1$H NMR (400 MHz, DMSO-d6): δ 10.57 (1H, s), 10.01 (1H, s), 6.81 (1H, d, J=1.8 Hz), 6.78 (1H, d, J=8.8 Hz), 6.53 (1H, dd, J=8.8, 1.8 Hz), 6.50 (2H, br s), 4.03 (1H, d, J=7.8 Hz), 3.93 (2H, q, J=6.9 Hz), 3.92 (2H, q, J=6.9 Hz), 2.87 (1H, dd, J=16.0, 7.8 Hz), 1.28 (3H, t, J=6.9 Hz), 1.26 (3H, t, J=6.9 Hz); $^{13}$C NMR (100 MHz, DMSO-d6): δ 171.27, 161.47, 156.42, 154.97, 148.11, 146.87, 136.19, 117.94, 113.45, 112.69, 92.07, 63.83, 63.78, 38.66, 32.37, 14.82; MS (EI) m/z 344 (M+).

2-Amino-5-(3,4-difluorophenyl)-5,8-dihydro-3H,6H-pyrido[2,3-d]pyrimidine-4,7-dione (2e)

Yield: 34%; mp: >300° C.; IR (KBr): 3471, 3161, 1646, 1592 cm$^{-1}$; $^1$H-NMR (400 MHz, DMSO-d6): δ 10.62 (1H, br s), 10.13 (1H, br s), 7.32 (1H, dt, J=10.8, 8.4 Hz), 7.18 (1H, ddd, J=10.8, 8.4, 2.4 Hz), 6.95 (1H, m), 6.57 (2H, br s), 4.12 (1H, d, J=7.2 Hz), 2.94 (1H, dd, J=16.3, 7.2 Hz); $^{13}$C NMR (125 MHz, DMSO-d6): δ 170.86, 161.41, 156.68, 155.24, 149.02, 147.17, 141.45, 122.88, 117.41 (d, J=17.0 Hz), 115.62 (d, J=17.0 Hz), 91.05, 38.22, 32.24; MS (EI) m/z 292 (M+).

2-Amino-5-(3-bromo-4-ethoxyphenyl)-5,8-dihydro-3H,6H-pyrido[2,3-d]pyrimidine-4,7-dione (2O)

Yield: 40%; mp: >300° C.; IR (KBr): 3458, 3080, 2863, 2751, 1540, 1475 cm$^{-1}$; $^1$H NMR (400 MHz, DMSO-d6): δ 10.57 (1H, br s), 10.09 (1H, s), 7.30 (1H, d, J=2.4 Hz), 7.06 (1H, dd, J=8.0, 2.4 Hz), 6.99 (1H, d, J=8.0 Hz), 6.56 (2H, br s), 4.09 (1H, m), 4.04 (2H, q, J=7.1 Hz), 2.90 (1H, dd, J=16.2, 6.7 Hz), 1.31 (3H, t, J=7.1 Hz); $^{13}$C NMR (100 MHz, DMSO-d6): δ 170.93, 161.39, 156.55, 155.10, 153.29, 137.33, 130.87, 126.80, 113.77, 110.89, 91.53, 64.39, 38.47, 31.82, 14.58; MS (EI) m/z 379 (M+).

2-Amino-5-(3-ethoxy-4-methoxyphenyl)-5,8-dihydro-3H,6H-pyrido[2,3-d]pyrimidine-4,7-dione (2g)

Yield: 45%; mp: >300° C.; IR (KBr): 3461, 3160, 2841, 1591, 1516 cm$^{-1}$; $^1$H NMR (400 MHz, DMSO-d6): δ 10.58 (1H, br s), 10.03 (1H, s), 6.82 (1H, d, J=2.4 Hz), 6.80 (1H, d, J=8.4 Hz), 6.55 (1H, dd, J=8.4, 2.4 Hz), 6.50 (1H, br s), 4.04 (1H, d, J=7.8 Hz), 3.96-3.88 (2H, m), 3.68 (3H, s), 2.87 (1H, dd, J=16.0, 7.8 Hz), 1.28 (3H, t, J=7.2 Hz); $^{13}$C NMR (100 MHz, DMSO-d6): δ 171.30, 161.55, 156.51, 155.00, 147.88, 147.66, 136.10, 117.81, 112.20, 111.90, 92.11, 63.68, 55.54, 38.72, 32.42, 14.83; MS (EI) m/z 330 (M+).

5-(3-Allyloxy-4-methoxyphenyl)-2-amino-5,8-dihydro-3H,6H-pyrido[2,3-d]pyrimidine-4,7-dione (2h)

Yield: 35%; mp: >300° C.; IR (KBr): 3462, 3169, 1636, 1617, 1591 cm$^{-1}$; $^1$H NMR (400 MHz, DMSO-d6): δ 10.58 (1H, br s), 10.02 (1H, s), 6.84 (1H, d, J=2.0 Hz), 6.81 (1H, d, J=8.4 Hz), 6.57 (1H, dd, J=8.4, 2.0 Hz), 5.99 (1H, ddd, J=17.6, 10.4, 5.2 Hz), 5.36 (1H, dd, J=17.6, 2.0 Hz), 5.22 (1H, dd, J=10.4, 2.0 Hz), 4.46 (2H, d, J=5.2 Hz), 4.03 (1H, d, J=7.2 Hz), 3.68 (3H, s), 2.87 (1H, dd, J=15.8, 7.2 Hz); $^{13}$C NMR (100 MHz, DMSO-d6): δ 171.16, 158.72, 156.11, 154.99, 147.79, 147.55, 136.10, 133.95, 118.27, 117.88, 112.81, 112.09, 92.02, 69.10, 55.65, 32.41; MS (EI) m/z 342 (M+).

2-Amino-5-(4-methoxy-3-propoxyphenyl)-5,8-dihydro-3H,6H-pyrido[2,3-d]pyrimidine-4,7-dione (2i)

Yield: 41%; mp: >300° C.; IR (KBr): 3463, 3160, 2846, 1695, 1591, 1539, 1516 cm$^{-1}$; $^1$H NMR (400 MHz, DMSO-d6): δ 10.58 (1H, br s), 10.03 (1H, s), 6.82 (1H, d, J=2.4 Hz), 6.80 (1H, dd, J=8.4, 2.4 Hz), 6.55 (1H, d, J=8.4 Hz), 6.51 (2H, br s), 4.04 (1H, d, J=7.2 Hz), 3.84-3.81 (2H, m), 3.67 (3H, s), 2.87 (1H, dd, J=16.4, 7.2 Hz), 1.68 (2H, sext, J=6.8 Hz), 0.94 (3H, t, J=6.8 Hz); $^{13}$C NMR (100 MHz, DMSO-d6): δ 171.24, 161.48, 156.43, 154.96, 148.04, 147.68, 136.14, 117.78, 112.27, 112.04, 92.06, 69.63, 55.61, 38.66, 32.38, 22.12, 10.46; MS (EI) m/z 344 (M+).

2-Amino-5-(3-ethoxyphenyl)-5,8-dihydro-3H,6H-pyrido[2,3-d]pyrimidine-4,7-dione (2j)

Yield: 43%; mp: >300° C.; IR (KBr): 3447, 3170, 2854, 1592, 1539 cm$^{-1}$; $^1$H NMR (400 MHz, DMSO-d6): δ 10.58 (1H, br s), 10.06 (1H, s), 7.15 (1H, t, J=7.8 Hz), 6.72 (1H, dd, J=7.8, 2.4 Hz), 6.70 (1H, dd, J=7.8, 2.4 Hz), 6.66 (1H, d, J=2.4 Hz), 6.53 (2H, br s), 4.07 (1H, d, J=7.4 Hz), 3.94 (2H, q, J=6.0 Hz), 2.91 (1H, dd, J=16.3, 7.4 Hz), 1.28 (3H, t, J=6.0 Hz); $^{13}$C NMR (100 MHz, DMSO-d6): δ 171.04, 161.40, 158.57, 156.59, 155.03, 145.32, 129.28, 118.56, 113.19, 111.58, 91.65, 62.78, 38.50, 32.86, 14.65; MS (EI) m/z 300 (M+).

5-(3-Allyloxyphenyl)-2-amino-5,8-dihydro-3H,6H-pyrido[2,3-d]pyrimidine-4,7-dione (2k)

Yield: 45%; mp: >300° C.; IR (KBr): 3085, 2855, 2727, 1520 cm$^{-1}$; $^1$H NMR (400 MHz, DMSO-d6): δ 10.58 (1H, br s), 10.06 (1H, s), 7.15 (1H, t, J=7.6 Hz), 6.76 (1H, dd, J=7.6, 2.4 Hz), 6.71 (2H, m), 6.53 (2H, br s), 6.00 (1H, ddd, J=17.4, 10.6, 5.5 Hz), 5.36 (1H, dd, J=17.4, 1.6 Hz), 5.23 (1H, dd, J=10.6, 1.6 Hz), 4.48 (2H, d, J=5.5 Hz), 4.07 (1H, d, J=7.5 Hz), 3.89 (1H, dd, J=16.2, 7.5 Hz); $^{13}$C NMR (100 MHz, DMSO-d6): δ 171.09, 161.41, 158.26, 156.58, 155.06, 145.35, 133.75, 129.48, 118.78, 117.56, 113.43, 112.03, 91.60, 68.11, 38.50, 32.86; MS (EI) m/z 312 (M+).

2-Amino-5-(3-chloro-4-ethoxyphenyl)-5,8-dihydro-3H,6H-pyrido[2,3-d]pyrimidine-4,7-dione (2l)

Yield: 30%; mp: >300° C.; $^1$H NMR (400 MHz, DMSO-d6): δ 10.60 (1H, br s), 10.09 (1H, s), 7.15 (1H, s), 7.02 (2H, s), 6.55 (2H, br s), 4.06 (1H, d, J=8.0 Hz), 4.05 (2H, q, J=7.0 Hz), 2.91 (1H, dd, J=16.0, 8.0 Hz), 1.31 (3H, t, J=7.0 Hz); $^{13}$C NMR (100 MHz, DMSO-d6): δ 171.0, 161.38, 156.52, 155.11, 153.38, 136.81, 127.90, 126.09, 121.07, 113.90, 91.53, 64.28, 38.42, 31.87, 14.57.

2-Amino-5-(3-chlorophenyl)-5,8-dihydro-3H,6H-pyrido[2,3-d]pyrimidine-4,7-dione (2m)

Yield: 35%; mp: >300° C.; $^1$H NMR (400 MHz, DMSO-d6): δ 10.61 (1H, br s), 10.11 (1H, s), 7.30 (1H, t, J=8.0 Hz), 7.24 (1H, d, J=8.0 Hz), 7.16 (1H, s), 7.11 (1H, d, J=8.0 Hz), 6.57 (2H, br s), 4.13 (1H, d, J=8.0 Hz), 2.95 (1H, dd, J=16.0, 8.0 Hz); $^{13}$C NMR (100 MHz, DMSO-d6): δ 170.85, 161.42, 156.76, 155.18, 146.35, 133.07, 130.46, 126.49, 126.41, 125.20, 91.61, 38.24, 32.72.

2-Amino-5-(3-bromophenyl)-5,8-dihydro-3H,6H-pyrido[2,3-d]pyrimidine-4,7-dione (2n)

Yield: 25%; mp: >300° C.; $^1$H NMR (400 MHz, DMSO-d6): δ 10.61 (1H, br s), 10.12 (1H, s), 7.38 (1H, d, J=8.0, 1.8 Hz), 7.31 (1H, t, J=1.8 Hz), 7.24 (1H, t, J=8.0 Hz), 7.14 (1H, d, J=8.0 Hz), 6.57 (2H, br s), 4.12 (1H, d, J=8.0 Hz), 2.95 (1H, dd, J=16.2, 8.0 Hz); $^{13}$C NMR (100 MHz, DMSO-d6): δ 170.81, 161.40, 156.74, 155.18, 146.63, 130.77, 129.38, 129.30, 125.57, 121.78, 91.03, 38.25, 32.71.

2-Amino-5-(3-trifluoromethoxyphenyl)-5,8-dihydro-3H,6H-pyrido[2,3-d]pyrimidine-4,7-dione (2o) (PA-81004)

Yield: 23%; mp: >300° C.; $^1$H NMR (400 MHz, DMSO-d6): δ 10.64 (1H, br s), 10.15 (1H, s), 7.40 (1H, t, J=8.0 Hz), 7.17 (2H, t, J=8.0 Hz), 7.12 (1H, s), 6.58 (2H, br s), 4.18 (1H, d, J=7.2 Hz), 2.97 (1H, dd, J=16.2, 7.2 Hz); $^{13}$C NMR (100 MHz, DMSO-d6): δ 171.26, 161.71, 156.92, 155.40, 148.72, 146.70, 130.66, 120.22 (q, J=254.60 Hz), 119.21, 119.08, 116.41, 91.23, 38.31, 32.81.

2-Amino-5-(3-methoxyphenyl)-5,8-dihydro-3H,6H-pyrido[2,3-d]pyrimidine-4,7-dione (2p)

Yield: 35%; mp: >300° C.; $^1$H NMR (400 MHz, DMSO-d6): δ 10.60 (1H, br s), 10.07 (1H, s), 7.17 (1H, t, J=7.6 Hz), 6.75 (1H, dd, J=7.6, 2.4 Hz), 6.71 (1H, d, J=2.4 Hz), 6.70 (1H, s), 6.54 (2H, br s), 4.08 (1H, d, J=7.2 Hz), 3.69 (3H, s), 2.92 (1H, dd, J=16.0, 7.2 Hz); $^{13}$C NMR (100 MHz, DMSO-d6): δ 171.24, 161.45, 159.34, 156.54, 155.11, 145.32, 129.53, 118.56, 112.85, 111.29, 91.65, 54.91, 38.51, 32.89.

2-Amino-5-(3-propoxyphenyl)-5,8-dihydro-3H,6H-pyrido[2,3-d]pyrimidine-4,7-dione (2q)

Yield: 32%; mp: >300° C.; $^1$H NMR (400 MHz, DMSO-d6): δ 10.58 (1H, br s), 10.05 (1H, s), 7.15 (1H, t, J=8.0 Hz), 6.74-6.67 (3H, m), 6.52 (2H, br s), 4.07 (1H, d, J=8.0 Hz), 3.84 (2H, t, J=6.4 Hz), 2.91 (1H, dd, J=16.4, 8.0 Hz), 1.69 (2H, sext, J=6.4 Hz), 0.94 (3H, t, J=6.4 Hz); $^{13}$C NMR (100 MHz, DMSO-d6): δ 171.09, 161.47, 158.76, 156.62, 155.05, 145.34, 129.50, 118.54, 112.19, 111.74, 91.68, 68.76, 38.52, 32.89, 22.05, 10.47.

2-Amino-5-biphenyl-3-yl-5,8-dihydro-3H,6H-pyrido[2,3-d]pyrimidine-4,7-dione (2r)

Yield: 37%; mp: >300° C.; $^1$H NMR (400 MHz, DMSO-d6): δ 10.58 (1H, br s), 10.09 (1H, s), 7.53 (2H, dd, J=8.0, 1.2 Hz), 7.42 (5H, m), 7.32 (2H, t, J=8.0 Hz), 7.01 (1H, d, J=8.0 Hz), 6.51 (2H, brs), 4.17 (1H, d, J=7.6 Hz), 2.95 (1H, dd, J=16.0, 7.6 Hz); $^{13}$C NMR (100 MHz, DMSO-d6): δ 171.38, 161.86, 155.22, 144.66, 140.62, 140.46, 129.37, 129.21, 127.71, 126.94, 126.85, 125.65, 125.20, 91.95, 62.93, 38.71, 33.17.

2-Amino-5-(3-ethylphenyl)-5,8-dihydro-3H,6H-pyrido[2,3-d]pyrimidine-4,7-dione (2s)

Yield: 37%; mp: >300° C.; $^1$H NMR (400 MHz, DMSO-d6): δ 10.60 (1H, br s), 10.07 (1H, s), 7.15 (1H, t, J=8.0 Hz), 7.01 (1H, d, J=8.0 Hz), 7.00 (1H, s), 6.91 (1H, d, J=8.0 Hz), 6.53 (2H, br s), 4.08 (1H, d, J=7.2 Hz), 2.93 (1H, dd, J=16.6, 7.2 Hz), 2.52 (2H, q, J=7.6 Hz), 1.13 (3H, t, J=7.6 Hz); $^{13}$C NMR (100 MHz, DMSO-d6): δ 171.27, 161.52, 156.60, 155.09, 143.76, 128.43, 126.14, 125.87, 123.66, 91.75, 62.82, 32.95, 28.24, 15.61.

2-Amino-5-(3-propylphenyl)-5,8-dihydro-3H,6H-pyrido[2,3-d]pyrimidine-4,7-dione (2t)

Yield: 18%; mp: >300° C.; $^1$H NMR (400 MHz, DMSO-d6): δ 10.57 (1H, br s), 10.05 (1H, s), 7.14 (1H, t, J=7.6 Hz), 6.98 (1H, d, J=7.6 Hz), 6.97 (1H, s), 6.91 (1H, d, J=7.6 Hz), 6.52 (2H, br s), 4.07 (1H, d, J=8.0 Hz), 2.92 (1H, dd, J=16.2, 8.0 Hz), 1.52 (2H, sext, J=7.2 Hz), 0.86 (3H, t, J=7.2 Hz); $^{13}$C NMR (100 MHz, DMSO-d6): δ 171.20, 161.48, 156.59, 155.04, 143.66, 142.24, 128.32, 126.63, 126.43, 123.73, 91.75, 38.87, 37.38, 32.90, 24.18, 13.74.

2-Amino-5-(3-butylphenyl)-5,8-dihydro-3H,6H-pyrido[2,3-d]pyrimidine-4,7-dione (2u)

Yield: 30%; mp: >300° C.; $^1$H NMR (400 MHz, DMSO-d6): δ 10.57 (1H, br s), 10.01 (1H, s), 7.13 (1H, t, J=7.6 Hz), 6.98 (1H, d, J=7.6 Hz), 6.97 (1H, s), 6.90 (1H, d, J=7.6 Hz), 6.52 (2H, br s), 4.07 (1H, d, J=8.0 Hz), 2.92 (1H, dd, J=16.4, 8.0 Hz), 1.48 (2H, quin, J=7.4 Hz), 1.27 (2H, sext, J=7.4 Hz), 0.87 (3H, t, J=7.4 Hz); $^{13}$C NMR (100 MHz, DMSO-d6): δ 171.16, 161.46, 156.59, 155.04, 143.66, 142.42, 128.33, 126.59, 126.39, 123.67, 91.76, 38.70, 34.93, 33.20, 32.90, 21.82, 13.82.

1) Tu, S. et al. Bioorg. Med. Chem. Lett. 2006, 16, 3578-3581.

2) Muskinja, J. et al. Med. Chem. Res. 2016, 25, 1744-1753.

3) McDonald, B. et al. Org. Lett. 2015, 17, 98-101.

4) US 2015/0210682A

5) JP 2010-526138 A

6) Wang, B. et al. Eur. J. Org. Chem. 2009, 22, 3688-3692.
7) WO 2008/136756
8) Shi, D. Q. et al. J. Heterocyclic Chem. 2009, 46, 1331-1334.

[Example 2] Synthesis of PA-9 Derivatives

[Formula 8]

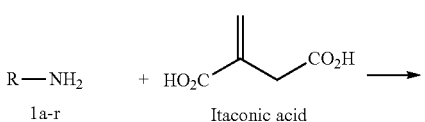

1a-r     Itaconic acid

1a: R = 4-Cl-indazol[3)]
1b: R = 5-Cl-indazol[3)]
1c: R = 6-Cl-indazol[3)]
1d: R = 7-Cl-indazol[3)]
1e: R = Ph
1f: R = 4-Me—Ph
1g: R = 4-Cl—Ph
1h: R = 4-F—Ph
1i: R = 4-OMe—Ph
1j: R = 4-CN—Ph
1k: R = 2-OH—Ph
1l: R = 3-OH—Ph
1m: R = 4-OH—Ph
1n: R = pyrazol
1o: R = Bn
1p: R = 2-OH—Bn[4)]
1q: R = 3-OH—Bn[4)]
1r: R = 4-OH—Bn

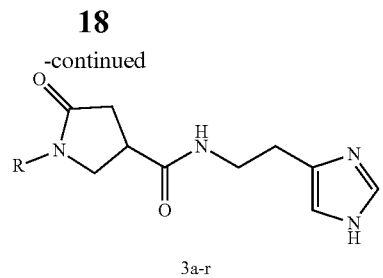

condensation agent 2a-r[1)2)]

2a: R = 4-Cl-indazol
2b: R = 5-Cl-indazol
2c: R = 6-Cl-indazol
2d: R = 7-Cl-indazol
2e: R = Ph
2f: R = 4-Me—Ph
2g: R = 4-Cl—Ph
2h: R = 4-F—Ph
2i: R = 4-OMe—Ph
2j: R = 4-CN—Ph
2k: R = 2-OH—Ph
2l: R = 3-OH—Ph
2m: R = 4-OH—Ph
2n: R = pyrazol
2o: R = Bn
2p: R = 2-OH—Bn
2q: R = 3-OH—Bn
2r: R = 4-OH—Bn 3a-r 3a: R = 4-Cl-indazol (--%)
3b: R = 5-Cl-indazol (24% over two steps)
3c: R = 6-Cl-indazol (17% over two steps)
3d: R = 7-Cl-indazol (36% over two steps)
3e: R = Ph (63%)
3f: R = 4-Me—Ph (93%)
3g: R = 4-Cl—Ph (93%)[5)]
3h: R = 4-F—Ph (94%)
3i: R = 4-OMe—Ph (95%)
3j: R = 4-CN—Ph (69%)
3k: R = 2-OH—Ph (40%)
3l: R = 3-OH—Ph (58%)
3m: R = 4-OH—Ph (54%)
3n: R = pyrazol (30%)
3o: R = Bn (76%)[6)]
3p: R = 2-OH—Bn (30%)
3q: R = 3-OH—Bn (40%)
3r: R = 4-OH—Bn (29%)

The corresponding amine from the amines 1a to d (1.0 eq) and itaconic acid (1.0 eq) were mixed at room temperature, and the mixture was heated gradually from 60° C. to 150° C. in an Ar atmosphere in accordance with Literature[1]) (JP 2006-510596 A). The mixture was heated at 150° C. for 30 minutes and then cooled to room temperature to obtain carboxylic acids 2a to d, respectively, as pale yellow solids. To a solution of the corresponding carboxylic acid from the carboxylic acids 2a to d (1.0 eq) in DMF were sequentially added at room temperature dicyclohexylcarbodiimide (DCC) (1.2 eq), 1-hydroxybenzotriazole (HOBt) (1.2 eq) and histamine (1.2 eq), and the mixture was stirred for 15 hours. A crude product was obtained by distilling off the solvent, and the crude product was purified by silica gel chromatography ($CH_2Cl_2$:MeOH=5:1) and further washed with EtOAc:MeOH=5:1 (0.5 mL×3) to obtain 3a to d, respectively, as white solids.

1-(4-chloro-1H-indazol-3-yl)-5-oxo-3-pyrrolidinecarboxylic acid (2a)

$^1$H NMR (400 MHz, Pyridine-d5): δ 10.74 (1H, br s), 7.73 (1H, d, J=2.1 Hz), 7.45 (1H, d, J=8.6 Hz), 7.15 (1H, dd, J=2.1, 8.6 Hz), 4.65 (1H, dd, J=13.0, 7.6 Hz), 4.44 (1H, t, J=7.6 Hz), 3.40 (1H, quint, J=7.6 Hz), 2.77 (1H, dd, J=17.6, 7.6 Hz), 2.60 (1H, dd, J=17.6, 7.6 Hz).

1-(5-chloro-1H-indazol-3-yl)-5-oxo-3-pyrrolidinecarboxylic acid (2b)

$^1$H NMR (400 MHz, Pyridine-d5): δ 11.53 (1H, br s), 7.38 (1H, d, J=8.4 Hz), 7.14 (1H, dd, J=8.4, 7.2 Hz), 6.93 (1H, d, J=7.2 Hz), 4.67 (1H, dd, J=13.0, 7.5 Hz), 4.52 (1H, t, J=7.5 Hz), 3.39 (1H, quint, J=7.5 Hz), 2.76 (1H, dd, J=17.5, 7.5 Hz), 2.57 (1H, dd, J=17.5, 7.5 Hz).

1-(6-chloro-1H-indazol-3-yl)-5-oxo-3-pyrrolidinecarboxylic acid (2c)

$^1$H NMR (400 MHz, Pyridine-d5): δ 11.63 (1H, br s), 7.71 (1H, d, J=9.0 Hz), 7.48 (1H, d, J=1.7 Hz), 6.88 (1H, dd, J=9.0, 1.7 Hz), 4.65 (1H, dd, J=13.0, 7.7 Hz), 4.44 (1H, t, J=7.7 Hz), 3.40 (1H, quint, J=7.7 Hz), 2.68 (1H, dd, J=17.1, 7.7 Hz), 2.60 (1H, dd, J=17.1, 7.7 Hz).

1-(7-chloro-1H-indazol-3-yl)-5-oxo-3-pyrrolidinecarboxylic acid (2d)

$^1$H NMR (400 MHz, Pyridine-d5): δ 11.66 (1H, br s), 7.67 (1H, d, J=8.7 Hz), 7.30 (1H, d, J=7.3 Hz), 6.86 (1H, dd, J=8.7, 7.3 Hz), 4.71 (1H, dd, J=13.4, 7.4 Hz), 4.48 (1H, t, J=7.4 Hz), 3.42 (1H, quint, J=7.4 Hz), 2.78 (1H, dd, J=17.6, 7.4 Hz), 2.61 (1H, dd, J=17.6, 7.4 Hz).

N-[2-(1H-imidazol-4-yl)ethyl]-1-(4-chloro-1H-indazol-3-yl)-5-oxo-3-pyrrolidinecarboxamide (3a)

mp: 190-191° C.; IR (KBr): 3566, 3437, 3306, 1695, 1636, 1558, 1508 cm$^{-1}$; $^1$H NMR (400 MHz, Pyridine-d5): δ 9.00 (1H, br s), 7.96 (1H, s), 7.61 (1H, d, J=7.4 Hz), 7.14 (1H, t, J=7.4 Hz), 7.15 (1H, s), 6.98 (1H, d, J=7.4 Hz), 4.72 (1H, t, J=9.1 Hz), 3.96-3.85 (3H, m), 3.26 (1H, dd, J=15.6, 9.1 Hz), 3.11 (2H, t, J=6.8 Hz), 2.78 (1H, dd, J=15.6, 9.1 Hz); $^{13}$C NMR (100 MHz, DMSO-d6): δ 169.56, 168.62, 147.59, 134.59, 131.61, 126.70, 123.80, 119.28, 116.97, 115.67, 107.11, 48.23, 36.47, 32.61, 26.57.

N-[2-(1H-imidazol-4-yl)ethyl]-1-(5-chloro-1H-indazol-3-yl)-5-oxo-3-pyrrolidinecarboxamide (3b)

Yield: 24% over two steps; mp: 208-209° C.; IR (KBr): 3735, 3649, 3097, 1684, 1653, 1558, 1508 cm$^{-1}$; $^1$H NMR (400 MHz, Pyridine-d5): δ 9.04 (1H, br s), 8.05 (1H, s), 7.69 (1H, d, J=9.6 Hz), 7.68 (1H, s), 7.27 (1H, d, J=9.6 Hz), 7.71 (1H, s), 5.09 (1H, dd, J=13.6, 8.4 Hz), 4.73 (1H, t, J=8.4 Hz), 3.94-3.86 (3H, m), 3.28 (1H, dd, J=14.8, 8.4 Hz), 3.11 (2H, t, J=6.6 Hz), 2.84 (1H, dd, J=14.8, 8.4 Hz); $^{13}$C NMR (100 MHz, DMSO-d6): δ 169.63, 168.21, 145.55, 134.50, 133.79, 131.92, 127.15, 123.19, 118.50, 118.39, 116.85, 108.13, 48.33, 38.747, 36.33, 32.92, 26.53.

N-[2-(1H-imidazol-4-yl)ethyl]-1-(6-chloro-1H-indazol-3-yl)-5-oxo-3-pyrrolidinecarboxamide (3c)

Yield: 17% over two steps; mp: 196-198° C.; IR(KBr): 3290, 3213, 3101, 1683, 1636, 1558, 1508 cm$^{-1}$; $^1$H NMR (400 MHz, Pyridine-d5): δ 9.12 (1H, br s), 8.30 (1H, s), 7.83 (1H, s), 7.66 (1H, d, J=9.2 Hz), 7.25 (1H, s), 6.96 (1H, d, J=9.2 Hz), 5.03 (1H, dd, J=13.0, 8.3 Hz), 4.71 (1H, t, J=8.3 Hz), 3.91-3.84 (3H, m), 3.27 (1H, dd, J=15.2, 8.3 Hz), 3.12 (2H, t, J=6.4 Hz), 2.87 (1H, dd, J=15.2, 8.3 Hz); $^{13}$C NMR (100 MHz, DMSO-d6): δ 169.79, 168.28, 147.25, 134.03, 132.74, 132.42, 131.35, 121.77, 119.93, 116.53, 115.03, 106.65, 48.23, 38.21, 36.25, 32.92, 25.47.

N-[2-(1H-imidazol-4-yl)ethyl]-1-(7-chloro-1H-indazol-3-yl)-5-oxo-3-pyrrolidinecarboxamide (3d) (PA-915)

Yield: 36% over two steps; mp: 238-239° C.; IR(KBr): 3319, 3231, 3213, 1663, 1636, 1558, 1508 cm$^{-1}$; $^1$H NMR (400 MHz, Pyridine-d5): δ 9.02 (1H, br s), 8.49 (1H, s), 7.76 (1H, s), 7.52 (1H, d, J=7.5 Hz), 7.40 (1H, d, J=7.5 Hz), 6.98 (1H, s), 6.88 (1H, t, J=7.5 Hz), 5.13 (1H, dd, J=14.6, 8.5 Hz), 4.81 (1H, t, J=8.5 Hz), 3.95-3.86 (3H, m), 3.26 (1H, dd, J=16.2, 8.5 Hz), 3.11 (2H, t, J=6.8 Hz), 2.83 (1H, dd, J=16.2, 8.5 Hz); $^{13}$C NMR (100 MHz, DMSO-d6): δ 169.56, 168.32, 144.32, 134.51, 133.83, 133.30, 125.80, 120.48, 119.42, 119.04, 116.84, 109.42, 48.36, 38.77, 36.32, 32.95, 26.57.

To an aqueous solution of the corresponding amine from the amines 1e to j (1.0 eq) (3 mL) was added at room temperature itaconic acid (1.2 eq), and the mixture was heated and refluxed with stirring for 20 hours in an Ar atmosphere in accordance with Literature[2]) (JP 2012-529476 A). The mixture was cooled to room temperature, and a depositing solid was then filtered to obtain carboxylic acids 2e to j, respectively. To a solution of the corresponding carboxylic acid from the carboxylic acids 2e to j (1.0 eq) in a mixture of CH$_2$Cl$_2$ and DMF were sequentially added at room temperature 1-ethyl-3-(3-dimethylaminopropyl)carbodiimide (EDC) (1.2 eq), 4-dimethylaminopyridine (DMAP) (0.1 eq) and histamine (1.2 eq), and the mixture was stirred for 15 hours. A crude product was obtained by distilling off the solvent, and purified by silica gel chromatography (CH$_2$Cl$_2$:MeOH=10:1) to obtain 3e to j, respectively, as white solids.

N-[2-(1H-imidazol-4-yl)ethyl]-1-phenyl-5-oxo-3-pyrrolidinecarboxamide (3e)

Yield: 63%; mp: 149-151° C.; IR (KBr): 3675, 3306, 1678, 1643, 1558 cm$^{-1}$; $^1$H NMR (400 MHz, Pyridine-d5): δ 9.11 (1H, t, J=5.8 Hz), 7.90 (1H, s), 7.72 (2H, d, J=8.4 Hz), 7.28 (2H, t, J=8.4 Hz), 7.09 (1H, s), 7.06 (1H, t, J=8.4 Hz), 4.13 (1H, dd, J=9.6, 8.3 Hz), 3.93 (1H, t, J=8.3 Hz), 3.83 (2H, q, J=7.5 Hz), 3.47 (1H, quint, J=8.3 Hz), 3.14 (1H, dd, J=16.7, 8.3 Hz), 3.08 (2H, t, J=7.5 Hz), 2.84 (1H, dd, J=16.7, 8.3 Hz); $^{13}$C NMR (100 MHz, DMSO-d6): δ 172.16, 171.96, 139.22, 134.58, 133.95, 128.70, 124.00, 119.36, 116.83, 50.73, 38.66, 35.66, 35.43, 26.38.

N-[2-(1H-imidazol-4-yl)ethyl]-1-(4-methylphenyl)-5-oxo-3-pyrrolidinecarboxamide (3f)

Yield: 93%; mp: 176-178° C.; IR (KBr): 3306, 3088, 1675, 1639, 1556 cm$^{-1}$; $^1$H NMR (400 MHz, Pyridine-d5): δ 9.10 (1H, t, J=5.8 Hz), 7.91 (1H, s), 7.64 (2H, d, J=7.2 Hz), 7.08 (2H, t, J=7.2 Hz), 7.07 (1H, s), 4.14 (1H, dd, J=9.6, 8.0 Hz), 3.92 (1H, t, J=8.0 Hz), 3.83 (2H, q, J=7.2 Hz), 3.46 (1H, quint, J=8.0 Hz), 3.14 (1H, dd, J=17.6, 8.0 Hz), 3.08 (2H, t, J=7.2 Hz), 2.84 (1H, dd, J=17.6, 8.0 Hz), 2.13 (3H, s); $^{13}$C NMR (100 MHz, DMSO-d6): δ 172.17, 172.10, 137.00, 134.86, 134.44, 133.26, 129.30, 119.58, 117.04, 51.00, 39.17, 36.02, 35.84, 27.01, 20.63.

1-(4-chlorophenyl)-N-[2-(1H-imidazol-4yl)ethyl]-5-oxo-3-pyrrolidinecarboxamide (3g)

Yield: 93%; mp: 196-198° C.; IR (KBr): 3119, 3017, 1695, 1647, 1558 cm$^{-1}$; $^1$H NMR (400 MHz, Pyridine-d5): δ 9.16 (1H, t, J=5.2 Hz), 7.95 (1H, s), 7.71 (2H, d, J=8.4 Hz), 7.30 (2H, d, J=8.4 Hz), 7.11 (1H, s), 4.10 (1H, dd, J=9.4, 8.3 Hz), 3.92 (1H, t, J=8.3 Hz), 3.83 (2H, q, J=6.7 Hz), 3.50 (1H, quint, J=8.3 Hz), 3.11 (1H, dd, J=17.5, 8.3 Hz), 3.09 (2H, t, J=5.7 Hz), 2.85 (1H, dd, J=17.5, 8.3 Hz); $^{13}$C NMR (100 MHz, DMSO-d6): δ 172.20, 171.68, 137.90, 134.43, 133.95, 128.36, 127.49, 120.60, 116.62, 50.47, 38.74, 35.62, 35.30, 26.52.

N-[2-(1H-imidazol-4-yl)ethyl]-1-(4-fluorophenyl)-5-oxo-3-pyrrolidinecarboxamide (3h)

Yield: 94%; mp: 232-234° C.; IR (KBr): 3140, 3126, 1688, 1645, 1570 cm$^{-1}$; $^1$H NMR (400 MHz, Pyridine-d5):

δ 9.13 (1H, t, J=4.8 Hz), 7.72-7.68 (2H, m), 7.92 (1H, s), 7.11 (1H, s), 7.09-7.04 (2H, m), 4.12 (1H, dd, J=12.2, 8.7 Hz), 3.92 (1H, t, J=8.7 Hz), 3.84 (2H, t, J=7.0 Hz), 3.49 (1H, quint, J=8.7 Hz), 3.14 (1H, dd, J=17.2, 8.7 Hz), 3.09 (2H, t, J=7.0 Hz), 2.85 (1H, dd, J=17.2, 8.7 Hz); $^{13}$C NMR (100 MHz, DMSO-d6): δ 172.05, 171.90, 158.44 (d, J=240.3 Hz), 135.64, 134.62, 134.14, 121.35 (d, J=7.6 Hz), 116.81, 115.25 (d, J=22.0 Hz), 50.92, 38.92, 35.68, 35.58, 26.72.

N-[2-(1H-imidazol-4-yl)ethyl]-1-(4-methoxyphenyl)-5-oxo-3-pyrrolidinecarboxamide (3i)

Yield: 95%; mp: 151-153° C.; IR (KBr): 3239, 3075, 1684, 1635, 1568 cm$^{-1}$; $^1$H NMR (400 MHz, Pyridine-d5): δ 9.08 (1H, t, J=5.2 Hz), 7.91 (1H, s), 7.68 (2H, d, J=8.6 Hz), 7.10 (1H, s), 6.92 (2H, d, J=8.6 Hz), 4.16 (1H, dd, J=9.4, 8.4 Hz), 3.93 (1H, t, J=8.4 Hz), 3.84 (2H, q, J=7.6 Hz), 3.62 (3H, s), 3.46 (1H, quint, J=8.4 Hz), 3.15 (1H, dd, J=17.1, 8.4 Hz), 3.09 (2H, t, J=7.6 Hz), 2.84 (1H, dd, J=17.1, 8.4 Hz); $^{13}$C NMR (100 MHz, DMSO-d6): δ 171.97, 171.57, 155.80, 134.65, 134.26, 132.41, 121.20, 116.80, 113.82, 55.20, 51.03, 38.95, 35.68, 35.62, 26.81.

N-[2-(1H-imidazol-4-yl)ethyl]-1-(4-cyanophenyl)-5-oxo-3-pyrrolidinecarboxamide (3j)

Yield: 69%; mp: 211-212° C.; IR (KBr): 3151, 3019, 2231, 1703, 1646, 1558 cm$^{-1}$; $^1$H NMR (400 MHz, Pyridine-d5): δ 9.17 (1H, t, J=5.2 Hz), 7.92 (1H, s), 7.83 (2H, d, J=8.8 Hz), 7.60 (2H, d, J=8.8 Hz), 7.11 (1H, s), 4.12 (1H, dd, J=9.6, 8.4 Hz), 3.96 (1H, t, J=8.4 Hz), 3.84 (2H, t, J=7.0 Hz), 3.51 (1H, quint, J=8.4 Hz), 3.16 (1H, dd, J=17.2, 8.4 Hz), 3.10 (2H, t, J=7.0 Hz), 2.88 (1H, dd, J=17.2, 8.4 Hz); $^{13}$C NMR (100 MHz, DMSO-d6): δ 173.28, 171.75, 143.03, 134.67, 133.06, 119.03, 118.93, 105.53, 51.51, 38.98, 36.03, 35.39, 26.85.

The corresponding amine from the amines 1k to m (1.0 eq) and itaconic acid (1.0 eq) were mixed at room temperature, and the mixture was heated gradually from 60° C. to 150° C. in an Ar atmosphere in accordance with Literature[1]) (JP 2006-510596 A). The mixture was heated at 150° C. for 30 minutes and then cooled to room temperature to obtain carboxylic acids 2k to m, respectively. To a solution of the corresponding carboxylic acid from the carboxylic acids 2k to m (1 eq) in a mixture of CH$_2$Cl$_2$ and DMF were sequentially added at room temperature EDC (1.2 eq), DMAP (0.1 eq) and histamine (1.2 eq), and the mixture was stirred for 15 hours. A crude product was obtained by distilling off the solvent, and purified by silica gel chromatography (CH$_2$Cl$_2$:MeOH=10:1) to obtain 3k to m as white, yellow and red foamy solids, respectively.

N-[2-(1H-imidazol-4-yl)ethyl]-1-(2-hydroxyphenyl)-5-oxo-3-pyrrolidinecarboxamide (3k)

Yield: 40%; IR (KBr): 3651, 3265, 3213, 1684, 1670, 1558 cm$^{-1}$; $^1$H NMR (400 MHz, Pyridine-d5): δ 9.08 (1H, br s), 7.91 (1H, s), 7.42 (1H, d, J=8.8 Hz), 7.21-7.15 (2H, m), 7.10 (1H, s), 6.92-6.88 (1H, m), 4.30 (1H, dd, J=9.2, 7.5 Hz), 4.10 (1H, t, J=7.5 Hz), 3.85 (2H, q, J=6.4 Hz), 3.47 (1H, quint, J=7.5 Hz), 3.13 (1H, dd, J=16.4, 7.5 Hz), 3.06 (2H, t, J=6.4 Hz), 2.83 (1H, dd, J=16.4, 7.5 Hz); $^{13}$C NMR (100 MHz, DMSO-d6): δ 172.52, 172.22, 152.77, 134.68, 128.30, 128.24, 125.48, 119.12, 118.74, 116.87, 116.74, 51.68, 38.98, 37.09, 34.39, 26.85.

N-[2-(1H-imidazol-4-yl)ethyl]-1-(3-hydroxyphenyl)-5-oxo-3-pyrrolidinecarboxamide (3l)

Yield: 58%; IR (KBr): 3790, 3439, 3337, 1684, 1653, 1558 cm$^{-1}$; $^1$H NMR (400 MHz, Pyridine-d5): δ 8.97 (1H, br s), 8.09 (1H, s), 7.93 (1H, s), 7.28 (1H, t, J=8.2 Hz), 7.20 (1H, d, J=8.2 Hz), 7.13 (1H, s), 6.98 (1H, d, J=8.2 Hz), 4.29 (1H, dd, J=9.0, 8.3 Hz), 3.98 (1H, t, J=8.3 Hz), 3.89 (2H, q, J=6.9 Hz), 3.36 (1H, quint, J=8.3 Hz), 3.21 (1H, dd, J=17.1, 8.3 Hz), 3.09 (2H, t, J=6.9 Hz), 2.82 (1H, dd, J=17.1, 8.3 Hz); $^{13}$C NMR (100 MHz, DMSO-d6): δ 172.07, 171.93, 157.55, 140.28, 134.68, 129.38, 111.17, 109.78, 106.63, 50.84, 39.00, 35.99, 35.54, 26.89.

N-[2-(1H-imidazol-4-yl)ethyl]-1-(4-hydroxyphenyl)-5-oxo-3-pyrrolidinecarboxamide (3m)

Yield: 54%; IR (KBr): 3585, 3251, 3190, 1684, 1653, 1558 cm$^{-1}$; $^1$H NMR (400 MHz, Pyridine-d5): δ 11.49 (1H, br s), 8.97 (1H, br s), 7.93 (1H, s), 7.76 (2H, dd, J=8.6, 2.4 Hz), 7.15 (2H, dd, J=8.6, 2.4 Hz), 7.14 (1H, s), 4.29 (1H, td, J=8.4, 2.1 Hz), 3.95 (1H, td, J=8.4, 2.1 Hz), 3.90 (2H, q, J=6.3 Hz), 3.39 (1H, quint, J=8.4 Hz), 3.22 (1H, ddd, J=16.7, 8.4, 2.1 Hz), 3.10 (2H, t, J=6.3 Hz), 2.84 (1H, ddd, J=16.7, 8.4, 2.1 Hz); $^{13}$C NMR (100 MHz, DMSO-d6): δ 172.52, 171.86, 154.61, 135.20, 131.48, 122.05, 115.61, 51.67, 39.49, 36.23, 36.09, 27.40.

An amine 1n (1.0 eq) and itaconic acid (1.0 eq) were mixed at room temperature, and the mixture was heated gradually from 60° C. to 150° C. in an Ar atmosphere in accordance with Literature[1]) (JP 2006-510596 A). The mixture was heated at 150° C. for 30 minutes and then cooled to room temperature to obtain a carboxylic acid 2n. To a solution of the carboxylic acid 2n (1.0 eq) in a mixture of CH$_2$Cl$_2$ and DMF were sequentially added at room temperature DCC (1.2 eq), HOBt (1.2 eq) and histamine (1.2 eq), and the mixture was stirred for 15 hours. A crude product was obtained by distilling off, and purified by silica gel chromatography (CH$_2$Cl$_2$:MeOH=10:1) to obtain 3n as a white solid.

N-[2-(1H-imidazol-4-yl)ethyl]-1-(1H-pyrazol-3-yl)-5-oxo-3-pyrrolidinecarboxamide (3n)

Yield: 30%; mp: 213-211° C.; IR (KBr): 3676, 3320, 3203, 1689, 1652, 1635, 1557 cm$^{-1}$; $^1$H NMR (400 MHz, Pyridine-d5): δ 12.24 (1H, br s), 9.00 (1H, br s), 8.03 (1H, s), 7.88 (1H, s), 7.56 (1H, s), 7.10 (1H, s), 4.78 (1H, dd, J=12.6, 8.1 Hz), 4.26 (1H, t, J=8.1 Hz), 3.82 (2H, q, J=6.7 Hz), 3.69 (1H, quint, J=8.1 Hz), 3.22 (1H, dd, J=15.3, 8.1 Hz), 3.06 (2H, t, J=6.7 Hz), 2.72 (1H, dd, J=15.3, 8.1 Hz); $^{13}$C NMR (100 MHz, DMSO-d6): δ 169.67, 168.26, 162.33, 138.77, 138.73, 134.64, 134.53, 89.01, 47.04, 38.87, 36.72, 33.00, 26.97.

The corresponding amine from the amines 1o to r (1.0 eq) and itaconic acid (1.0 eq) were mixed at room temperature, and the mixture was heated gradually from 60° C. to 150° C. in an Ar atmosphere in accordance with Literature[1]) (JP 2006-510596 A). The mixture was heated at 150° C. for 30 minutes, then cooled to room temperature and purified by silica gel chromatography (CH$_2$Cl$_2$:MeOH=30:1) to obtain carboxylic acids 2o to r, respectively. To a solution of the corresponding carboxylic acid from the carboxylic acids 2o to r (1.0 eq) in a mixture of CH$_2$Cl$_2$ and DMF were sequentially added at room temperature DCC (1.2 eq), HOBt (1.2 eq) and histamine (1.2 eq), and the mixture was stirred for 15 hours. A crude product was obtained by distilling off the solvent, and purified by silica gel chromatography (CH$_2$Cl$_2$:MeOH=10:1) to obtain 3o to r, respectively, as a yellow solid or a white foamy solid.

N-[2-(1H-imidazol-4-yl)ethyl]-5-oxo-1-(phenylmethyl)-3-pyrrolidinecarboxamide (3o)

Yield: 29%; IR (KBr): 3271, 3155, 1670, 1652, 1558 cm$^{-1}$; $^1$H NMR (400 MHz, Pyridine-d5): δ 8.85 (1H, br), 7.92 (1H, s), 7.33-7.25 (5H, m), 7.08 (1H, s), 4.56 (1H, d, J=14.6 Hz), 4.48 (1H, d, J=14.6 Hz), 3.85 (2H, q, J=6.5 Hz), 3.67 (1H, t, J=8.0 Hz), 3.39 (1H, t, J=8.0 Hz), 3.25 (1H, quint, J=8.0 Hz), 3.10 (1H, dd, J=17.0, 8.0 Hz), 3.05 (2H, t, J=6.5 Hz), 2.72 (1H, dd, J=17.0, 8.0 Hz).

N-[2-(1H-imidazol-4-yl)ethyl]-1-[(2-hydroxyphenyl)methyl]-5-oxo-3-pyrrolidinecarboxamide (3p)

Yield: 30%; IR (KBr): 3748, 3738, 3651, 1684, 1653, 1558 cm$^{-1}$; $^1$H NMR (400 MHz, Pyridine-d5): δ 11.36 (1H, br s) 8.81 (1H, t, J=5.8 Hz), 7.84 (1H, d, J=1.2 Hz), 7.34 (1H, dd, J=7.5, 1.3 Hz), 7.13 (1H, td, J=7.5, 1.3 Hz), 7.08 (1H, dd, J=7.5, 1.3 Hz), 7.03 (1H, s), 6.81 (1H, td, J=1.3, 7.5 Hz), 4.74 (1H, d, J=15.2 Hz), 4.65 (1H, d, J=15.2 Hz), 3.82 (1H, dd, J=9.6, 8.2 Hz), 3.77 (2H, q, J=6.6 Hz), 3.57 (1H, t, J=8.2 Hz), 3.22 (1H, quint, J=8.2 Hz), 3.03 (1H, dd, J=16.5, 8.2 Hz), 2.99 (2H, t, J=6.6 Hz), 2.63 (1H, dd, J=16.5, 8.2 Hz); $^{13}$C NMR (100 MHz, DMSO-d6): δ 172.57, 172.18, 155.26, 134.67, 128.78, 128.38, 122.58, 119.03, 115.21, 49.63, 40.57, 38.94, 35.93, 33.91, 26.87.

N-[2-(1H-imidazol-4-yl)ethyl]-1-[(3-hydroxyphenyl)methyl]-5-oxo-3-pyrrolidinecarboxamide (3q)

Yield: 40%; IR (KBr): 3734, 3647, 3623, 1684, 1653, 1558 cm$^{-1}$; $^1$H NMR (400 MHz, Pyridine-d5): δ 8.83 (1H, br s), 7.93 (1H, s), 7.24 (2H, d, J=7.9 Hz), 7.22 (1H, s), 7.09 (1H, s), 7.08 (1H, d, J=7.9 Hz), 6.88 (1H, d, J=7.9 Hz), 4.57 (1H, d, J=14.6 Hz), 4.48 (1H, d, J=14.6 Hz), 3.84 (2H, q, J=6.1 Hz), 3.72 (1H, t, J=8.1 Hz), 3.45 (1H, t, J=8.1 Hz), 3.23 (1H, quint, J=8.1 Hz), 3.09 (1H, dd, J=16.0, 8.1 Hz), 3.05 (2H, t, J=6.1 Hz), 2.67 (1H, dd, J=16.0, 8.1 Hz); $^{13}$C NMR (100 MHz, DMSO-d6): δ 172.31, 172.05, 157.63, 138.14, 134.66, 134.18, 129.55, 118.17, 116.90, 114.41, 114.30, 49.14, 45.31, 38.88, 35.89, 26.78.

N-[2-(1H-imidazol-4-yl)ethyl]-1-[(4-hydroxyphenyl)methyl]-5-oxo-3-pyrrolidinecarboxamide (3r)

Yield: 29%; IR (KBr): 3651, 3271, 3213, 1663, 1653, 1558 cm$^{-1}$; $^1$H NMR (400 MHz, Pyridine-d5): δ 8.85 (1H, br s), 7.91 (1H, s), 7.28 (2H, d, J=7.6 Hz), 7.10 (2H, d, J=7.6 Hz), 4.55 (1H, d, J=14.6 Hz), 4.44 (1H, d, J=14.6 Hz), 3.91-3.71 (2H, m), 3.70 (1H, dd, J=8.8, 7.9 Hz), 3.45 (1H, t, J=7.9 Hz), 3.26 (1H, quint, J=7.9 Hz), 3.11 (1H, dd, J=15.0, 7.9 Hz), 3.06 (2H, t, J=7.4 Hz), 2.71 (1H, dd, J=15.0, 7.9 Hz); $^{13}$C NMR (100 MHz, DMSO-d6): δ 172.15, 156.66, 134.68, 129.07, 126.80, 115.30, 48.93, 44.83, 38.94, 35.83, 34.03, 26.89.

1) JP 2006-510596 A
2) JP 2012-529476 A
3) Saczewski, F. et al. Bioorg. Med. Chem. 2011, 19, 321-329
4) Mestichelli, P. et al. Org. Lett. 2013, 15, 5448-5451
5) Commercially available, Aurora Building Blocks, A17.818.885
6) Commercially available, Aurora Building Blocks, A21.884.126

Examples 3 to 29

In the following Examples, PA-8 and PA-81004 (compound 2o of Example 1) were used as compounds represented by the formula (I), and PA-9 and PA-915 (compound 3d of Example 2) were used as compounds represented by the formula (II).

[Example 3] Effect of Antidepressant/Anxiolytic Drug of Present Invention on Normal Mouse (1) Effects of PA-8 and PA-81004 (Evaluation by Open Field Test)

The effects of PA-8 and PA-81004 on normal mice were evaluated by an open field test (test to measure spontaneous locomotion in a novel environment by exploiting the properties of mice to do exploratory behavior in such a novel environment, and using a 40 cm×40 cm box of 30 cm in height; spontaneous motor activity is measured from the total distance traveled; in this test, anxiety-like behavior is evaluated by exploiting the properties of mice to prefer to stay near walls and avoid light environments, and measuring a time spent in a center zone (20 cm×20 cm) or the number of entries thereto).

Male C57BL/6J mice (8 to 12 weeks old) were acclimatized to a laboratory (illuminance: 40 lx) for 60 minutes. Then, a vehicle (10% DMSO solution; dissolved in saline; n=11), PA-8 (30 mg/kg; n=9) or PA-81004 (30 mg/kg; n=12) was intraperitoneally administered thereto (0.1 mL/10 g). After a lapse of 60 minutes after administration, the test was conducted for 10 minutes. The results are shown in FIG. 1 (A: total distance traveled, B: the number of center zone entries, C: time spent in the center zone).

PA-8 and PA-81004 exhibited no pharmacological action on the normal mice.

(2) Effects of PA-8 and PA-81004 (Evaluation by Light-Dark Test)

The effects of PA-8 and PA-81004 on normal mice were evaluated by a light-dark test (test to measure spontaneous locomotion by exploiting the properties of mice to avoid light environments, and placing the mice in a light box and a dark box joined together (each 20 cm×20 cm, height: 30 cm); in this test, anxiety-like behavior is evaluated by measuring times spent in the light box and the dark box and the number of transitions between the light box and the dark box).

Figure 2:
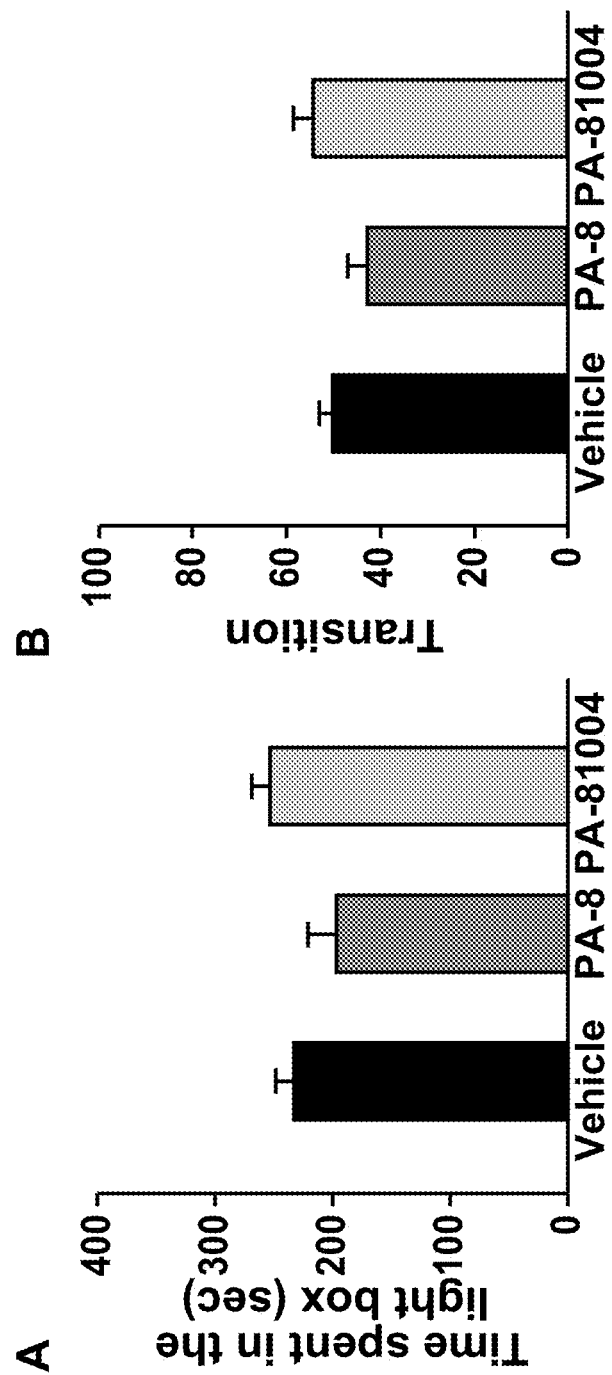
FIG. 2 shows the effects of PA-8 and PA-81004 in normal mice (evaluation by a light-dark test).

Male C57BL/6J mice (8 to 12 weeks old) were acclimatized to a laboratory for 60 minutes. Then, a vehicle (10% DMSO solution; dissolved in saline; n=13), PA-8 (30 mg/kg; n=12) or PA-81004 (30 mg/kg; n=12) was intraperitoneally administered thereto (0.1 mL/10 g). After a lapse of 60 minutes after administration, the test was conducted for 10 minutes. The results are shown in FIG. 2 (A: time spent in the light box, B: the number of transitions between the light and dark boxes; light box illuminance: 330 lx).

PA-8 and PA-81004 exhibited no pharmacological action on the normal mice.

(3) Effects of PA-8 and PA-81004 (Evaluation by Elevated Plus Maze Test)

The effects of PA-8 and PA-81004 on normal mice were evaluated by an elevated plus maze test (test that exploits the properties of mice to avoid heights and prefer to stay near walls; in this test, anxiety-like behavior is evaluated by placing the mice at the center of a maze disposed at a height of 50 cm in which a 26 cm long and 8 cm wide open arm without walls and a closed-arm with walls are disposed in a cross shape, and measuring a time spent in the open arm and the number of entries thereto).

Figure 3:
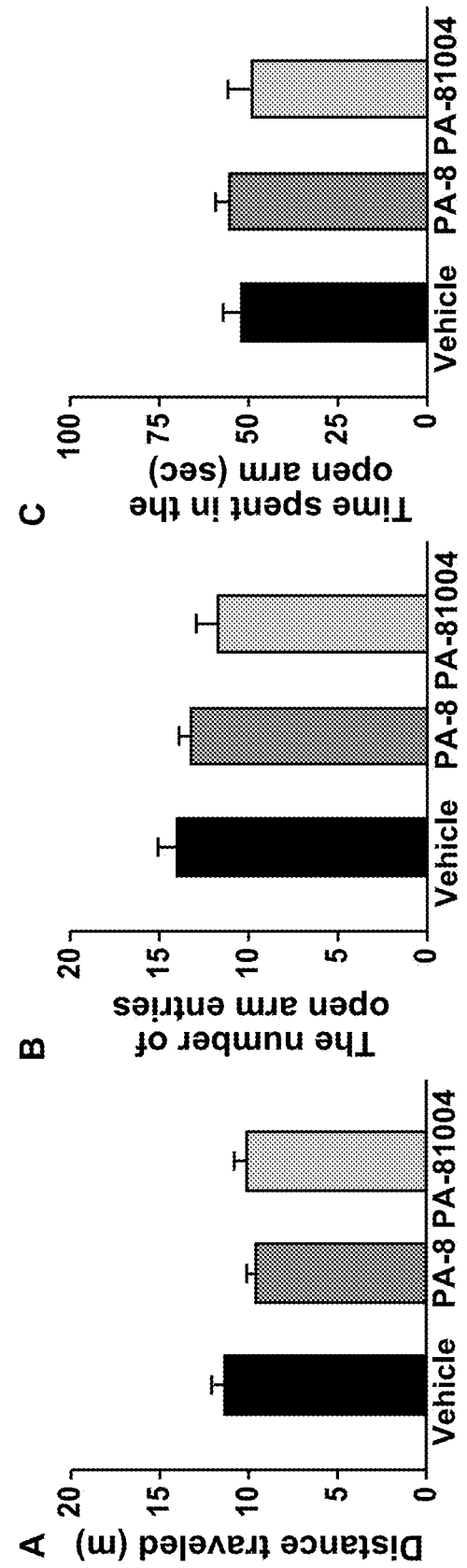
FIG. 3 shows the effects of PA-8 and PA-81004 in normal mice (evaluation by an elevated plus maze test).

Male C57BL/6J mice (8 to 12 weeks old) were acclimatized to a laboratory (illuminance: 50 lx) for 60 minutes. Then, a vehicle (10% DMSO solution; dissolved in saline; n=13), PA-8 (30 mg/kg; n=12) or PA-81004 (30 mg/kg; n=12) was intraperitoneally administered thereto (0.1 mL/10 g). After a lapse of 60 minutes after administration, the test was conducted for 5 minutes. The results are shown in FIG. 3 (A: total distance traveled, B: the number of open arm (course without walls) entries, C: time spent in the open arm).

PA-8 and PA-81004 exhibited no pharmacological action on the normal mice.

(4) Effects of PA-8 and PA-81004 (Evaluation by Forced Swim Test)

The effects of PA-8 and PA-81004 on normal mice were evaluated by a forced swim test (test that exploits the switch of mice caused to swim in an inevitable environment from active escape behavior to a passive state of floating or immobility; in this test, depressive-like behavior is evaluated by placing the mice in an acrylic cylinder of 20 cm in diameter and 25 cm in height filled with water (water temperature: 25° C.) up to a depth of 15 cm, and measuring a passive floating or immobility time).

Figure 4:
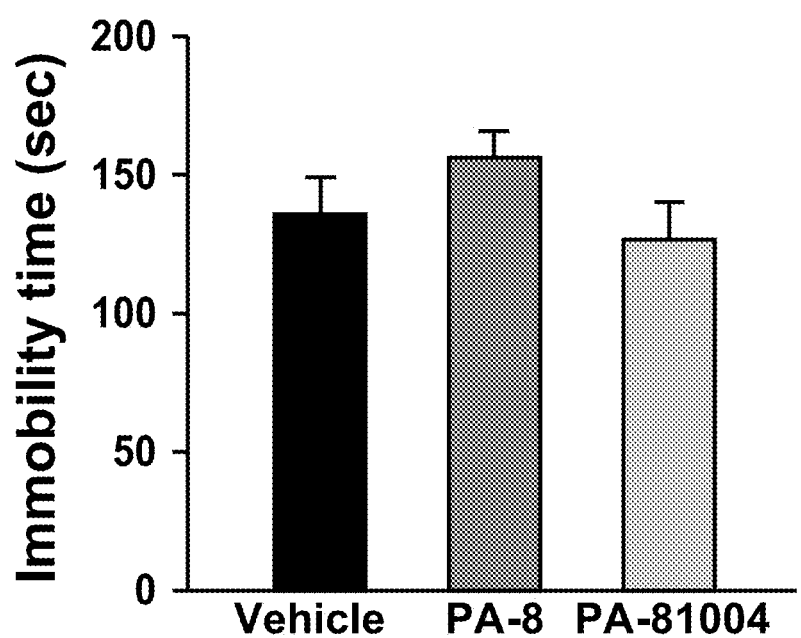
FIG. 4 shows the effects of PA-8 and PA-81004 in normal mice (evaluation by a forced swim test).

Male C57BL/6J mice (8 to 12 weeks old) were acclimatized to a laboratory (illuminance: 200 lx) for 60 minutes. Then, a vehicle (10% DMSO solution; dissolved in saline; n=9), PA-8 (30 mg/kg; n=9) or PA-81004 (30 mg/kg; n=9) was intraperitoneally administered thereto (0.1 mL/10 g). After a lapse of 60 minutes after administration, the mice were forced to swim for 6 minutes, and an immobility time was measured. The results are shown in FIG. 4.

PA-8 and PA-81004 exhibited no pharmacological action on the normal mice.

(5) Effects of PA-9 and PA-915 (Evaluation by Open Field Test)

The effects of PA-9 and PA-915 on normal mice were evaluated by the open field test.

Figure 5:
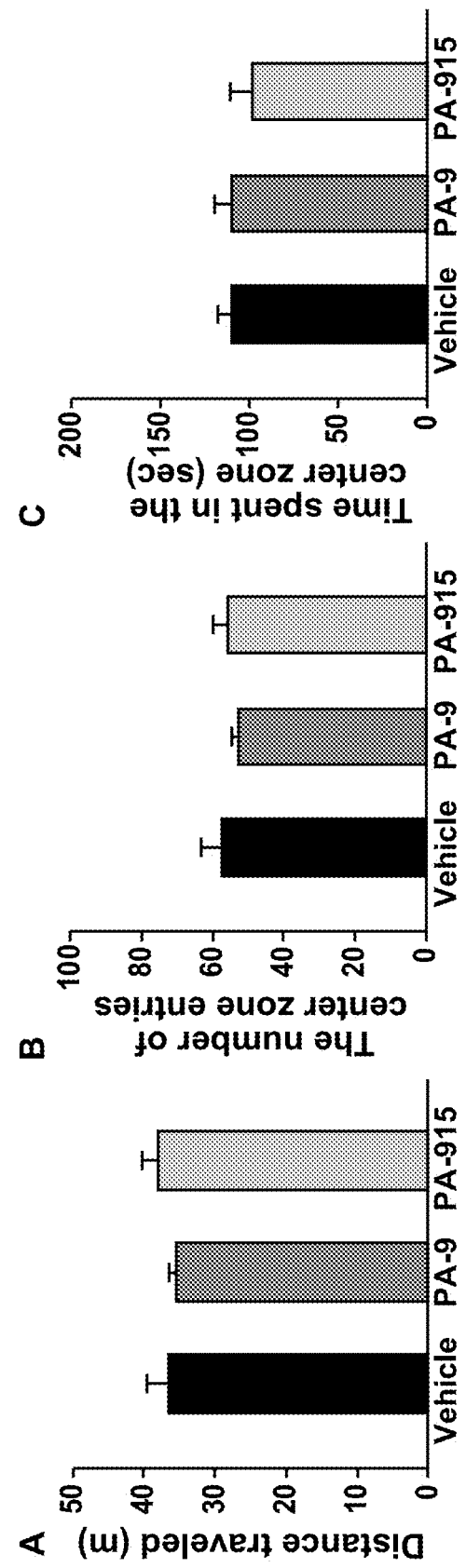
FIG. 5 shows the effects of PA-9 and PA-915 in normal mice (evaluation by an open field test).

Male C57BL/6J mice (8 to 12 weeks old) were acclimatized to a laboratory (illuminance: 40 lx) for 60 minutes. Then, a vehicle (10% DMSO solution; dissolved in saline; n=10), PA-9 (30 mg/kg; n=11) or PA-915 (30 mg/kg; n=10) was intraperitoneally administered thereto (0.1 mL/10 g). After a lapse of 60 minutes after administration, the test was conducted for 10 minutes. The results are shown in FIG. 5 (A: total distance traveled, B: the number of center zone entries, C: time spent in the center zone).

PA-9 and PA-915 exhibited no pharmacological action on the normal mice.

(6) Effects of PA-9 and PA-915 (Evaluation by Light-Dark Test)

The effects of PA-9 and PA-915 on normal mice were evaluated by the light-dark test.

Figure 6:
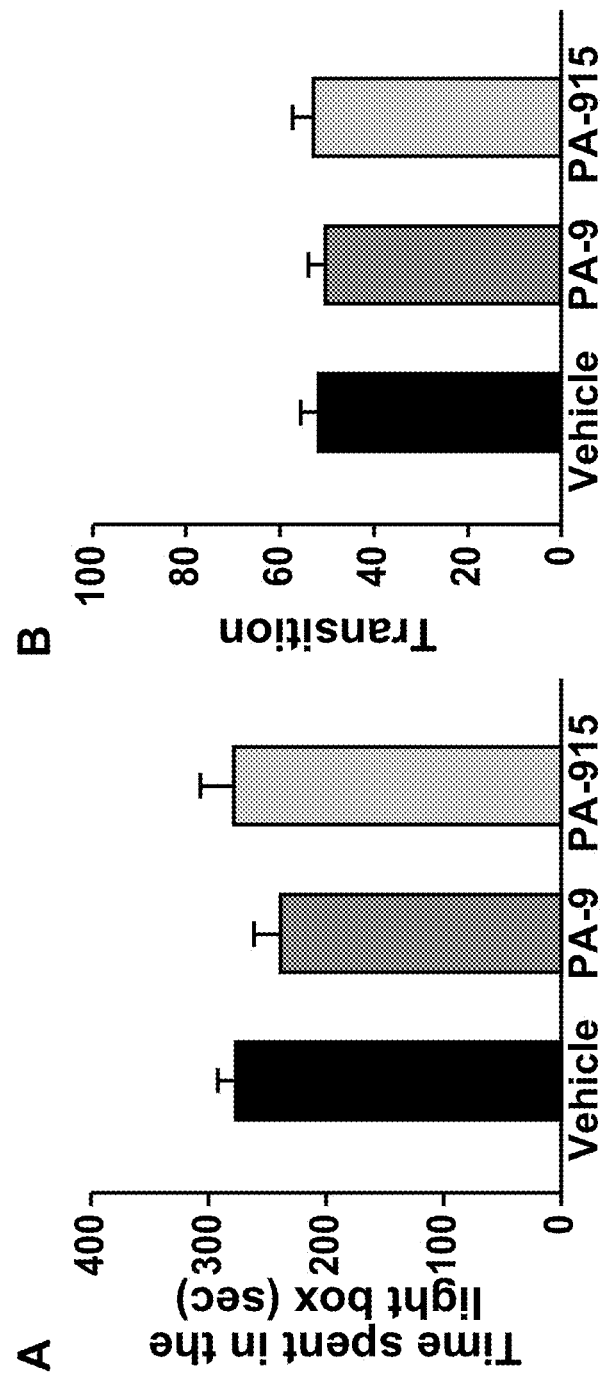
FIG. 6 shows the effects of PA-9 and PA-915 in normal mice (evaluation by a light-dark test).

Male C57BL/6J mice (8 to 12 weeks old) were acclimatized to a laboratory (illuminance: 330 lx) for 60 minutes. Then, a vehicle (10% DMSO solution; dissolved in saline; n=12), PA-9 (30 mg/kg; n=10) or PA-915 (30 mg/kg; n=10) was intraperitoneally administered thereto (0.1 mL/10 g). After a lapse of 60 minutes after administration, the test was conducted for 10 minutes. The results are shown in FIG. 6 (A: time spent in the light box, B: the number of transitions between the light and dark boxes; light box illuminance: 330 lx).

PA-9 and PA-915 exhibited no pharmacological action on the normal mice.

(7) Effects of PA-9 and PA-915 (Evaluation by Elevated Plus Maze Test)

The effects of PA-9 and PA-915 on normal mice were evaluated by the elevated plus maze test.

Figure 7:
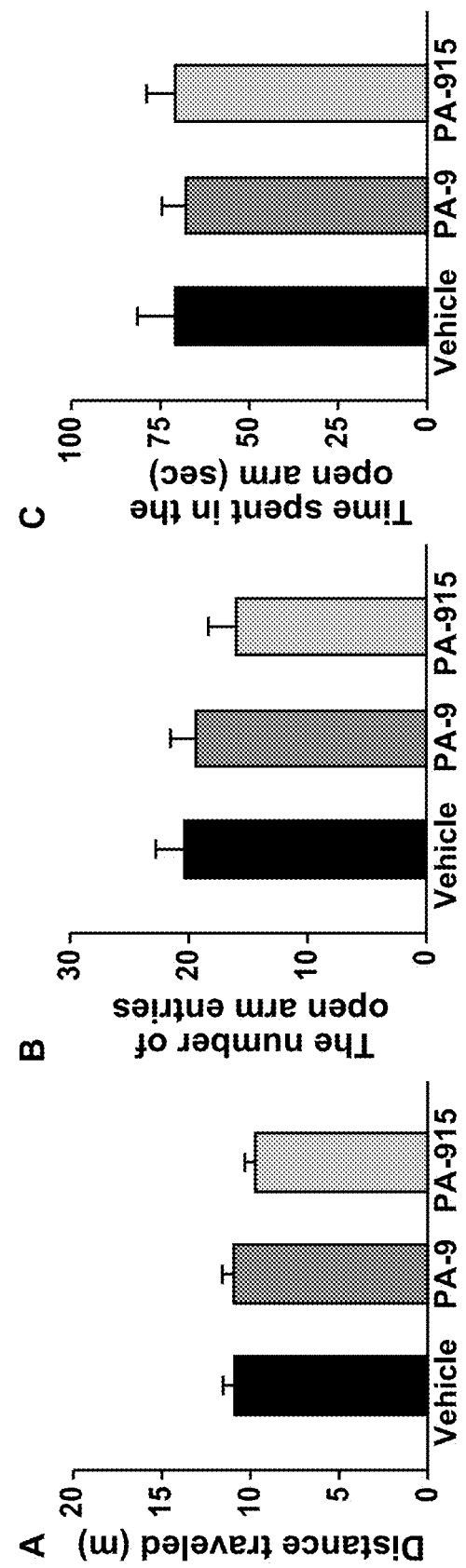
FIG. 7 shows the effects of PA-9 and PA-915 in normal mice (evaluation by an elevated plus maze test).

Male C57BL/6J mice (8 to 12 weeks old) were acclimatized to a laboratory (illuminance: 50 lx) for 60 minutes. Then, a vehicle (10% DMSO solution; dissolved in saline; n=8), PA-9 (30 mg/kg; n=8) or PA-915 (30 mg/kg; n=7) was intraperitoneally administered thereto (0.1 mL/10 g). After a lapse of 60 minutes after administration, the test was conducted for 5 minutes. The results are shown in FIG. 7 (A: total distance traveled, B: the number of open arm entries, C: time spent in the open arm).

PA-9 and PA-915 exhibited no pharmacological action on the normal mice.

(8) Effects of PA-9 and PA-915 (Evaluation by Forced Swim Test)

The effects of PA-9 and PA-915 on normal mice were evaluated by the forced swim test.

Figure 8:
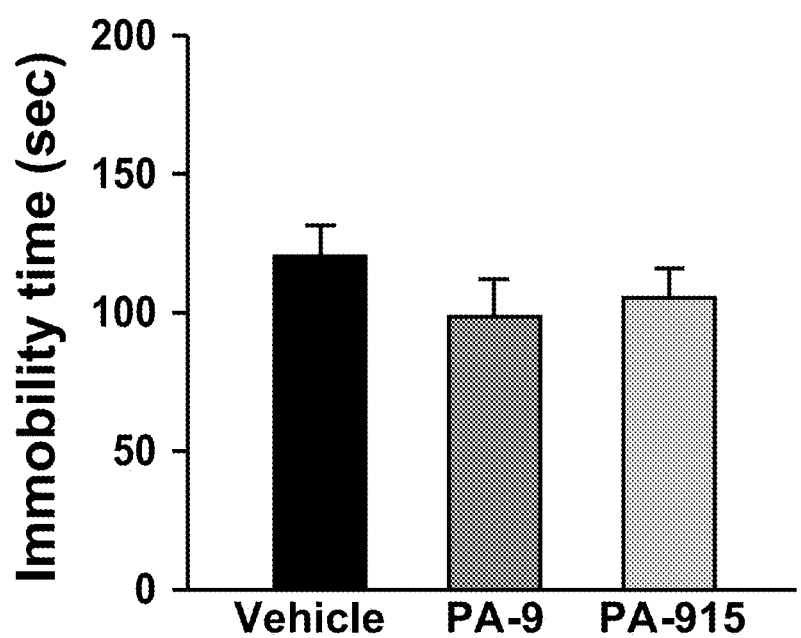
FIG. 8 shows the effects of PA-9 and PA-915 in normal mice (evaluation by a forced swim test).

Male C57BL/6J mice (8 to 12 weeks old) were acclimatized to a laboratory (illuminance: 200 lx) for 60 minutes. Then, a vehicle (10% DMSO solution; dissolved in saline; n=10), PA-9 (30 mg/kg; n=9) or PA-915 (30 mg/kg; n=9) was intraperitoneally administered thereto (0.1 mL/10 g). After a lapse of 60 minutes after administration, the mice were forced to swim for 6 minutes, and an immobility time was measured. The results are shown in FIG. 8.

PA-9 and PA-915 exhibited no pharmacological action on the normal mice.

[Example 4] Improving Effects of PA-8 and PA-81004 on Single-Restraint Stress-Induced Anxiety-Like Behavior (Evaluation by Open Field Test)

The improving effects of PA-8 and PA-81004 on single-restraint stress-induced anxiety-like behavior were evaluated by an open field test (test to measure spontaneous locomotion in a novel environment by exploiting the properties of mice to do exploratory behavior in such a novel environment, and using a 40 cm×40 cm box of 30 cm in height; spontaneous motor activity is measured from the total distance traveled; in this test, anxiety-like behavior is evaluated by exploiting the properties of mice to prefer to stay near walls and avoid light environments, and measuring a time spent in a center zone (20 cm×20 cm) or the number of entries thereto).

Figure 9:
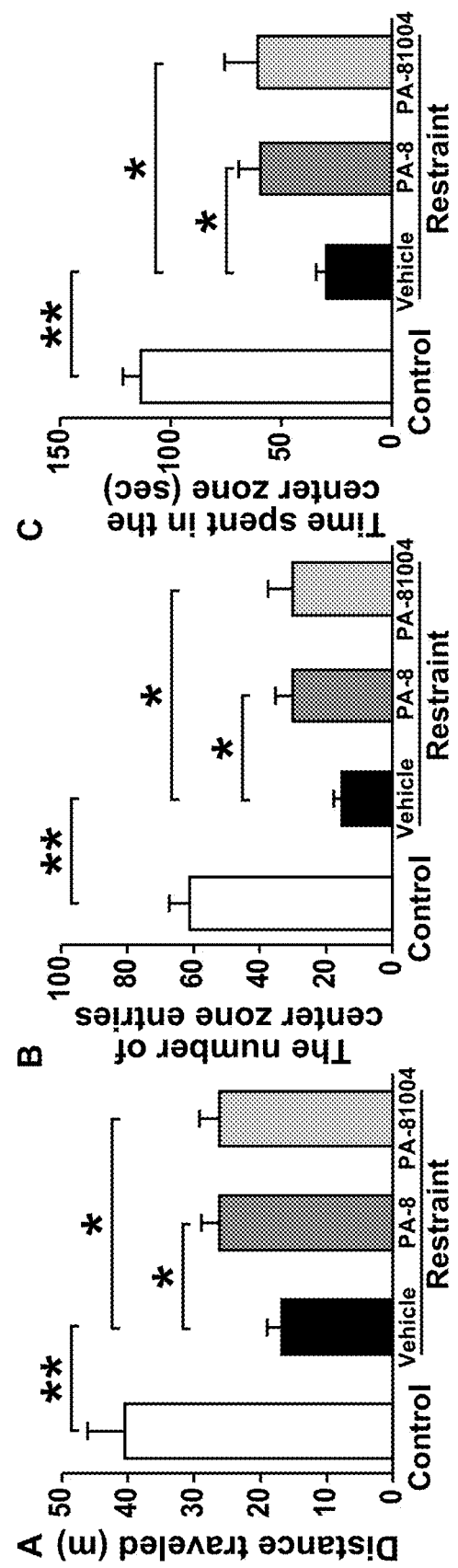
FIG. 9 shows the improving effects of PA-8 and PA-81004 on single-restraint stress-induced anxiety-like behavior (evaluation by an open field test).

Male C57BL/6J mice (8 to 12 weeks old) were acclimatized to a laboratory (illuminance: 40 lx) for 60 minutes. Then, a vehicle (10% DMSO solution; dissolved in saline; n=11), PA-8 (30 mg/kg; n=11) or PA-81004 (30 mg/kg; n=8) was intraperitoneally administered thereto (0.1 mL/10 g). After a lapse of 30 minutes after administration, restraint stress (stress caused by holding the mice in tubes of 2.8 cm in diameter with a hole for breathing) was applied thereto for 30 minutes. The mice were allowed to freely explore an open field cage for 10 minutes from immediately after the completion of restraint. Mice that freely behaved in a home cage for 30 minutes without being held and without accessing water and food were used as a control (n=10). The results are shown in FIG. 9 (A: total distance traveled, B: the number of center zone entries, C: time spent in the center

[Example 5] Improving Effects of PA-8 and PA-81004 on Single-Restraint Stress-Induced Anxiety-Like Behavior (Evaluation by Light-Dark Test)

The improving effects of PA-8 and PA-81004 on single-restraint stress-induced anxiety-like behavior were evaluated by a light-dark test (test to measure spontaneous locomotion by exploiting the properties of mice to avoid light environments, and placing the mice in a light box and a dark box joined together (each 20 cm×20 cm, height: 30 cm); in this test, anxiety-like behavior is evaluated by measuring times spent in the light box and the dark box and the number of transitions between the light box and the dark box).

Figure 10:
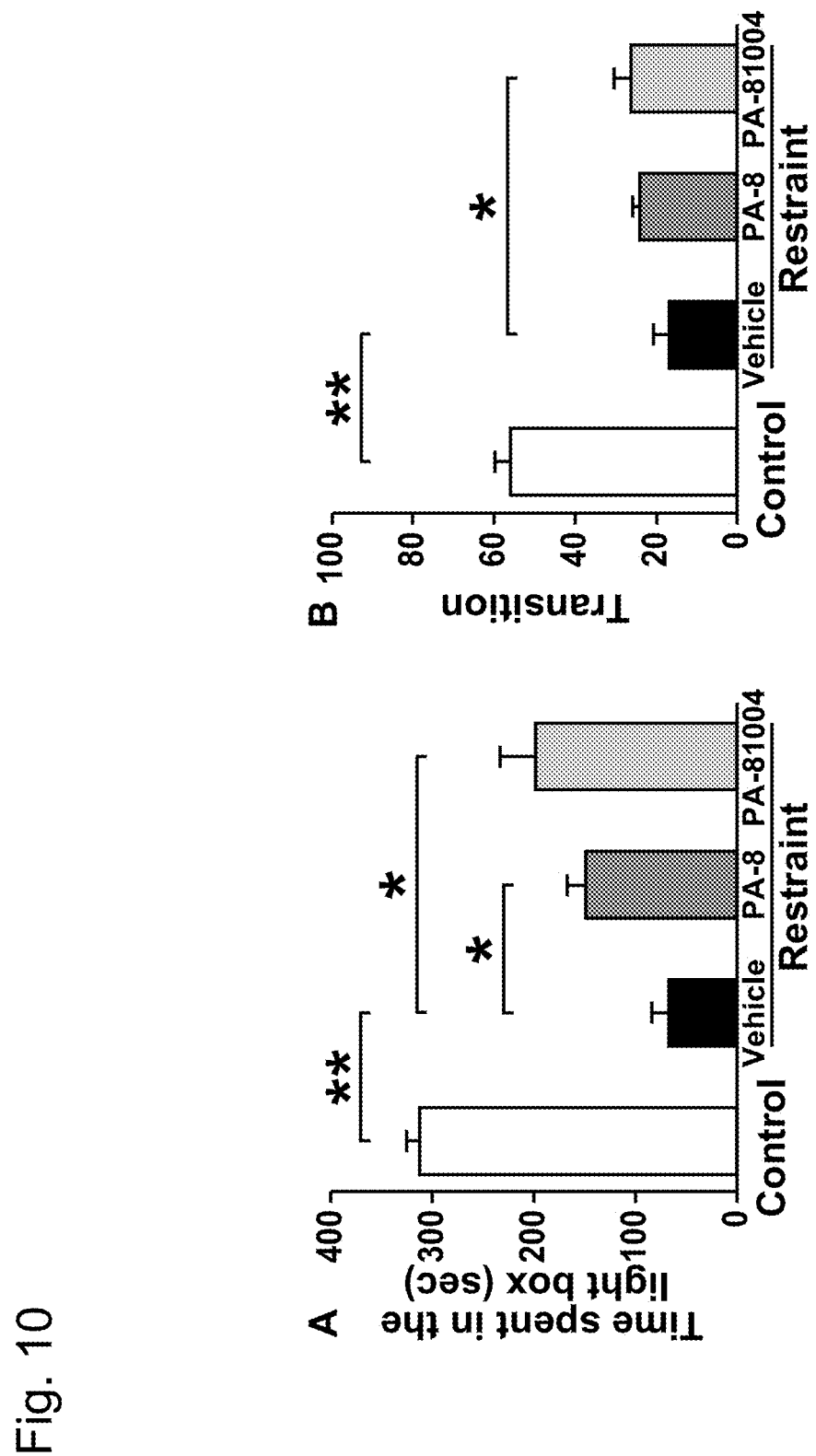
FIG. 10 shows the improving effects of PA-8 and PA-81004 on single-restraint stress-induced anxiety-like behavior (evaluation by a light-dark test).

Male C57BL/6J mice (8 to 12 weeks old) were acclimatized to a laboratory (illuminance: 330 lx) for 60 minutes. Then, a vehicle (10% DMSO solution; dissolved in saline; n=9), PA-8 (30 mg/kg; n=9) or PA-81004 (30 mg/kg; n=10) was intraperitoneally administered thereto (0.1 mL/10 g). After a lapse of 30 minutes after administration, restraint stress (stress caused by holding the mice in tubes of 2.8 cm in diameter with a hole for breathing) was applied thereto for 30 minutes. The light-dark test (10 min) was conducted from immediately after the completion of restraint. Mice that freely behaved in a home cage for 30 minutes without being held and without accessing water and food were used as a control (n=12). The results are shown in FIG. 10 (A: time spent in the light box, B: the number of transitions between the light and dark boxes; light box illuminance: 330 lx). The data was indicated by mean±standard error. **$P<0.01$, *$P<0.05$ (One-way ANOVA followed by Tukey-Kramer test).

[Example 6] Improving Effects of PA-9 and PA-915 on Single-Restraint Stress-Induced Anxiety-Like Behavior (Evaluation by Open Field Test)

The improving effects of PA-9 and PA-915 on single-restraint stress-induced anxiety-like behavior were evaluated by an open field test (test to measure spontaneous locomotion in a novel environment by exploiting the properties of mice to do exploratory behavior in such a novel environment, and using a 40 cm×40 cm box of 30 cm in height; spontaneous motor activity is measured from the total distance traveled; in this test, anxiety-like behavior is evaluated by exploiting the properties of mice to prefer to stay near walls and avoid light environments, and measuring a time spent in a center zone (20 cm×20 cm) or the number of entries thereto).

Figure 11:
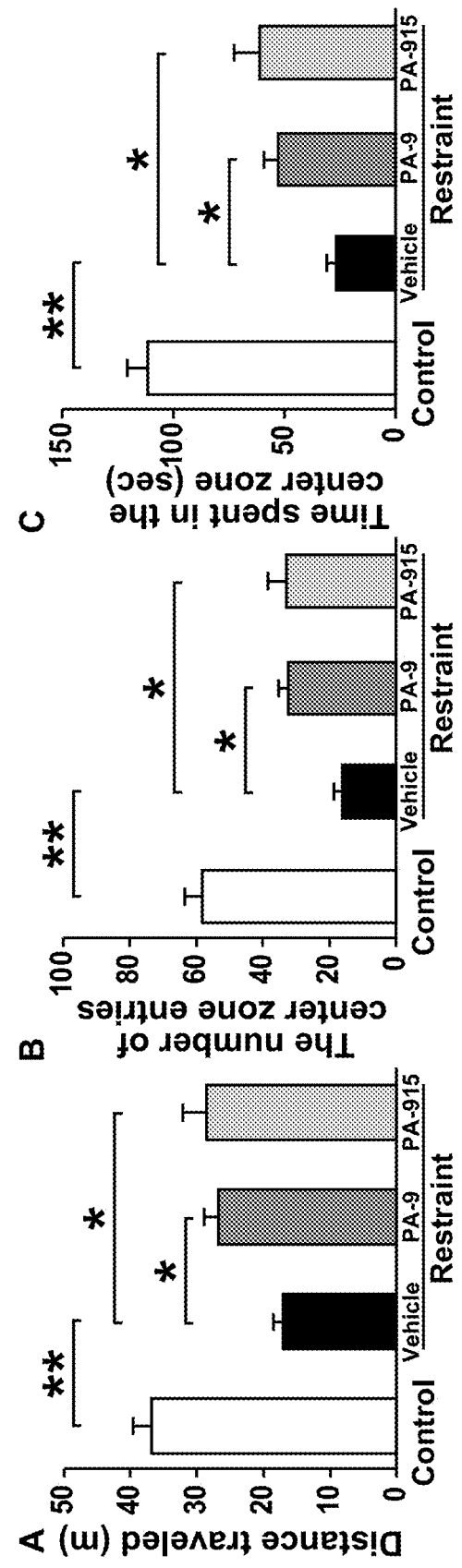
FIG. 11 shows the improving effects of PA-9 and PA-915 on single-restraint stress-induced anxiety-like behavior (evaluation by an open field test).

Male C57BL/6J mice (8 to 12 weeks old) were acclimatized to a laboratory (illuminance: 40 lx) for 60 minutes. Then, a vehicle (10% DMSO solution; dissolved in saline; n=10), PA-9 (30 mg/kg; n=13) or PA-915 (30 mg/kg; n=12) was intraperitoneally administered thereto (0.1 mL/10 g). After a lapse of 30 minutes after administration, restraint stress (stress caused by holding the mice in tubes of 2.8 cm in diameter with a hole for breathing) was applied thereto for 30 minutes. The mice were allowed to freely explore an open field cage for 10 minutes from immediately after the completion of restraint. Mice that freely behaved in a home cage for 30 minutes without being held and without accessing water and food were used as a control (n=10). The results are shown in FIG. 11 (A: total distance traveled, B: the number of center zone entries, C: time spent in the center zone). The data was indicated by mean±standard error. **$P<0.01$, *$P<0.05$ (One-way ANOVA followed by Tukey-Kramer test).

[Example 7] Improving Effects of PA-9 and PA-915 on Single-Restraint Stress-Induced Anxiety-Like Behavior (Evaluation by Light-Dark Test)

The improving effects of PA-9 and PA-915 on single-restraint stress-induced anxiety-like behavior were evaluated by a light-dark test (test to measure spontaneous locomotion by exploiting the properties of mice to avoid light environments, and placing the mice in a light box and a dark box joined together (each 20 cm×20 cm, height: 30 cm); in this test, anxiety-like behavior is evaluated by measuring times spent in the light box and the dark box and the number of transitions between the light box and the dark box).

Figure 12:
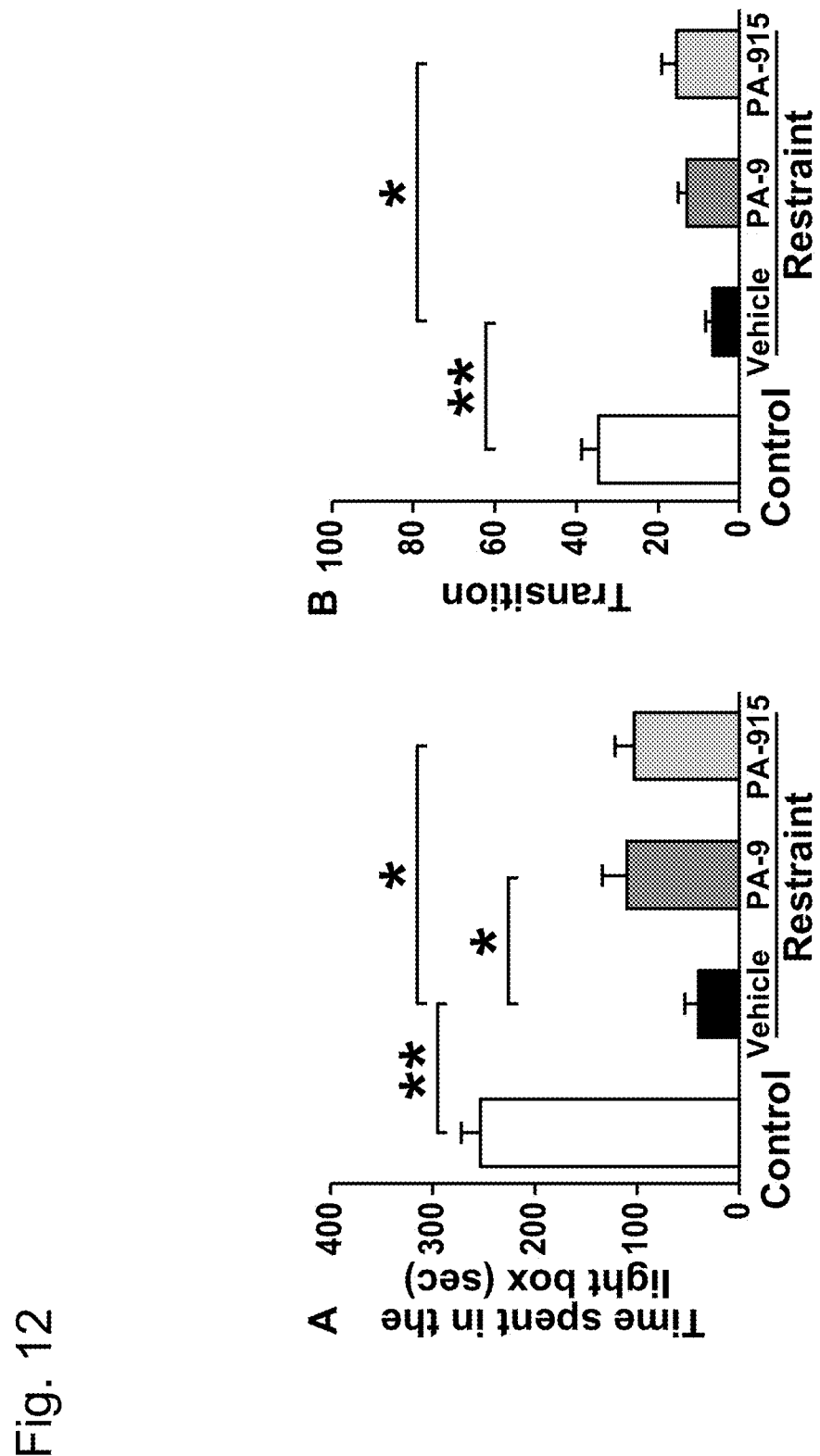
FIG. 12 shows the improving effects of PA-9 and PA-915 on single-restraint stress-induced anxiety-like behavior (evaluation by a light-dark test).

Male C57BL/6J mice (8 to 12 weeks old) were acclimatized to a laboratory (illuminance: 330 lx) for 60 minutes. Then, a vehicle (10% DMSO solution; dissolved in saline; n=11), PA-9 (30 mg/kg; n=8) or PA-915 (30 mg/kg; n=9) was intraperitoneally administered thereto (0.1 mL/10 g). After a lapse of 30 minutes after administration, restraint stress (stress caused by holding the mice in tubes of 2.8 cm in diameter with a hole for breathing) was applied thereto for 30 minutes. The light-dark test (10 min) was conducted from immediately after the completion of restraint. Mice that freely behaved in a home cage for 30 minutes without being held and without accessing water and food were used as a control (n=11). The results are shown in FIG. 12 (A: time spent in the light box, B: the number of transitions between the light and dark boxes; light box illuminance: 330 lx). The data was indicated by mean±standard error. **$P<0.01$, *$P<0.05$ (One-way ANOVA followed by Tukey-Kramer test).

[Example 8] Comparison Between Effects of PA-915 and Existing Drug Fluoxetine on Single-Restraint Stress-Induced Anxiety-Like Behavior (Evaluation by Open Field Test)

The effects of PA-915 and fluoxetine on single-restraint stress-induced anxiety-like behavior were compared by an open field test (test to measure spontaneous locomotion in a novel environment by exploiting the properties of mice to do exploratory behavior in such a novel environment, and using a 40 cm×40 cm box of 30 cm in height; spontaneous motor activity is measured from the total distance traveled; in this test, anxiety-like behavior is evaluated by exploiting the properties of mice to prefer to stay near walls and avoid light environments, and measuring a time spent in a center zone (20 cm×20 cm) or the number of entries thereto).

Figure 13:
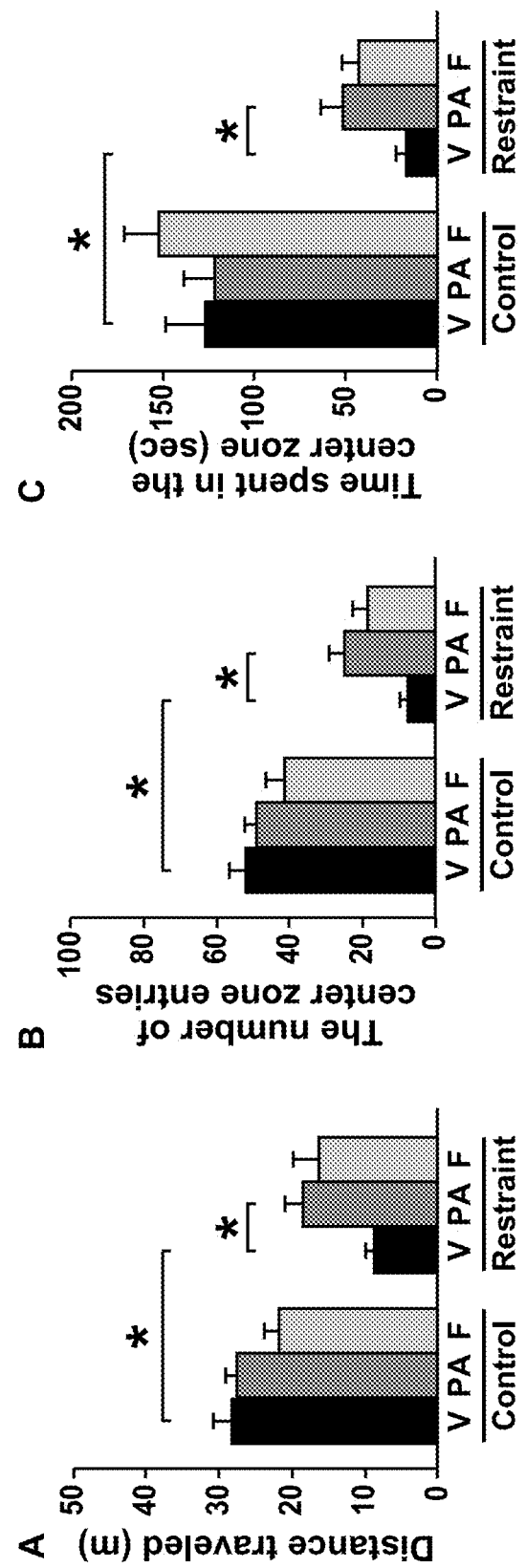
FIG. 13 shows the comparison between the effects of PA-915 and an existing drug fluoxetine on single-restraint stress-induced anxiety-like behavior (evaluation by an open field test (10-minute free exploration)).
Figure 14:
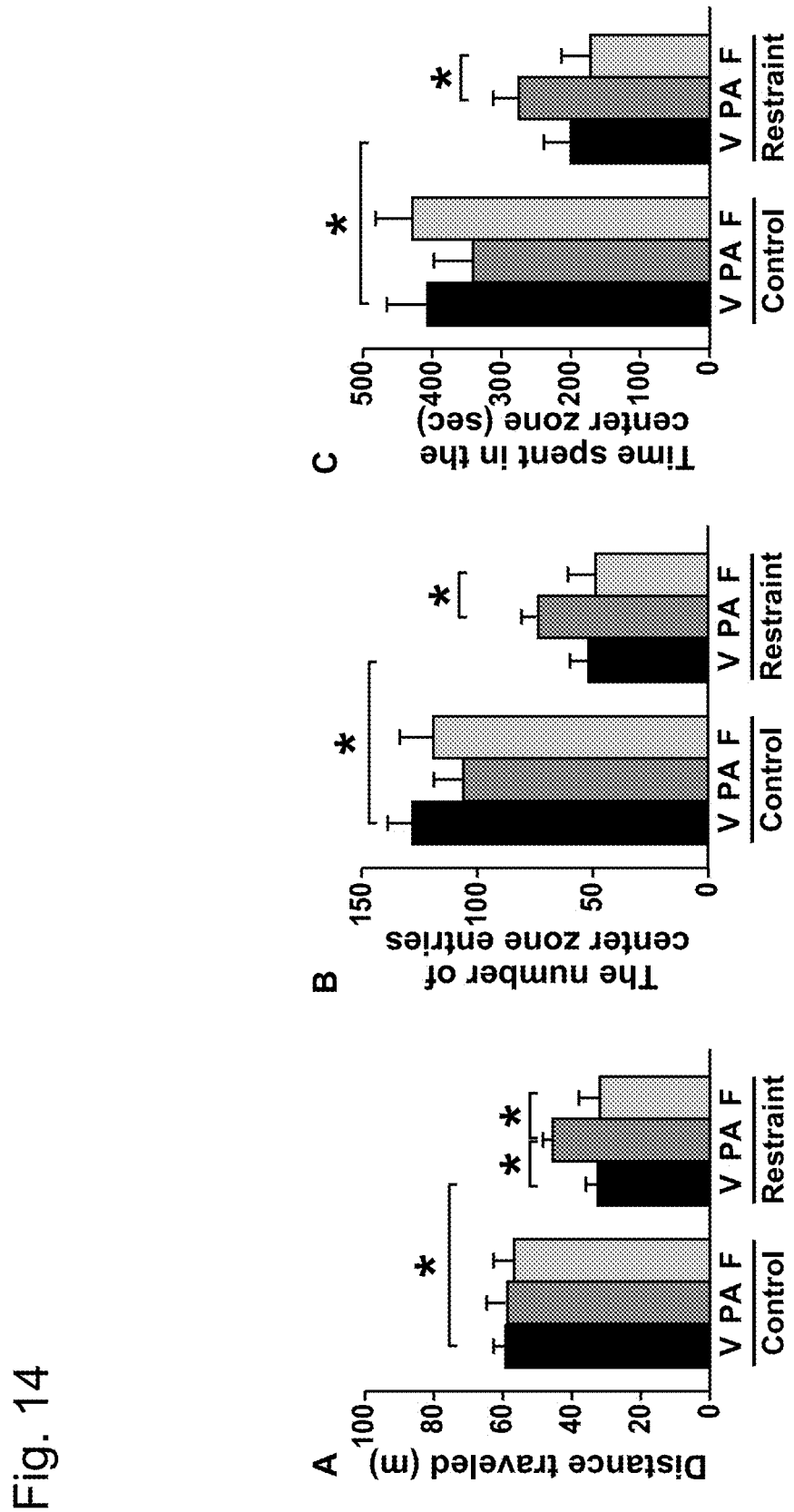
FIG. 14 shows the comparison between the effects of PA-915 and an existing drug fluoxetine on single-restraint stress-induced anxiety-like behavior (evaluation by an open field test (30-minute free exploration)).

Male C57BL/6J mice (8 to 12 weeks old) were acclimatized to a laboratory (illuminance: 40 lx) for 60 minutes. Then, a vehicle (V: 10% DMSO solution; dissolved in saline; n=9 for a control group, n=10 for a restraint group), PA-915 (PA: 30 mg/kg; n=10 for a control group, n=11 for a restraint group) or fluoxetine (F: 20 mg/kg; n=9 for a control group, n=9 for a restraint group) was intraperitoneally administered thereto (0.1 mL/10 g). After a lapse of 30 minutes after administration, restraint stress (stress caused by holding the mice in tubes of 2.8 cm in diameter with a hole for breathing) was applied thereto for 30 minutes. The mice were allowed to freely explore an open field cage for 30 minutes from immediately after the completion of restraint. Mice that freely behaved in a home cage for 30 minutes without being held and without accessing water and food were used as the control groups. The results of free exploration for the first 10 minutes or for 30 minutes are shown in FIGS. 13 and 14, respectively (A: total distance traveled, B: the number of center zone entries, C: time spent in the center zone). The data was indicated by mean±standard error. *P<0.05 (Two-way ANOVA followed by Tukey-Kramer test).

[Example 9] Improving Effect of PA-8 on Chronic Social Defeat Stress-Induced Social Behavioral Abnormality (Depressive-Like Behavior)

When male C57BL/6N mice (8 to 12 weeks old) are allowed to coexist with ICR mice having a large physical size, the male C57BL/6N mice run about in the beginning in order to avoid attack by the ICR mice, but eventually make a posture to immediately raise their forelegs and accept defeats (obedience) by repeated load for 5 days to 10 days (chronic social defeat stress (SDS) load).

The social preference or avoidance test (SPAT) is a test that has received attention in recent years as a highly extrapolatable antidepressant drug screening system. SPAT evaluates the degree of interest in others (sociality). A box (which has a wired contact surface) is disposed in an open field. A time of contact with a target (time spent in an interaction zone) and a time spent in an avoidance zone are measured without the target (ICR mice) placed in the box in the first run and with the target (ICR mice) placed in the box in the second run. Time spent in the second run/Time spent in the first run is calculated (social interaction ratio). The social interaction ratio is decreased in chronic social defeat stress mice. Stress susceptibility differs among individuals, and susceptible individuals (social interaction ratio <1) and resilient individuals (social interaction ratio 1) are found.

Figure 15:
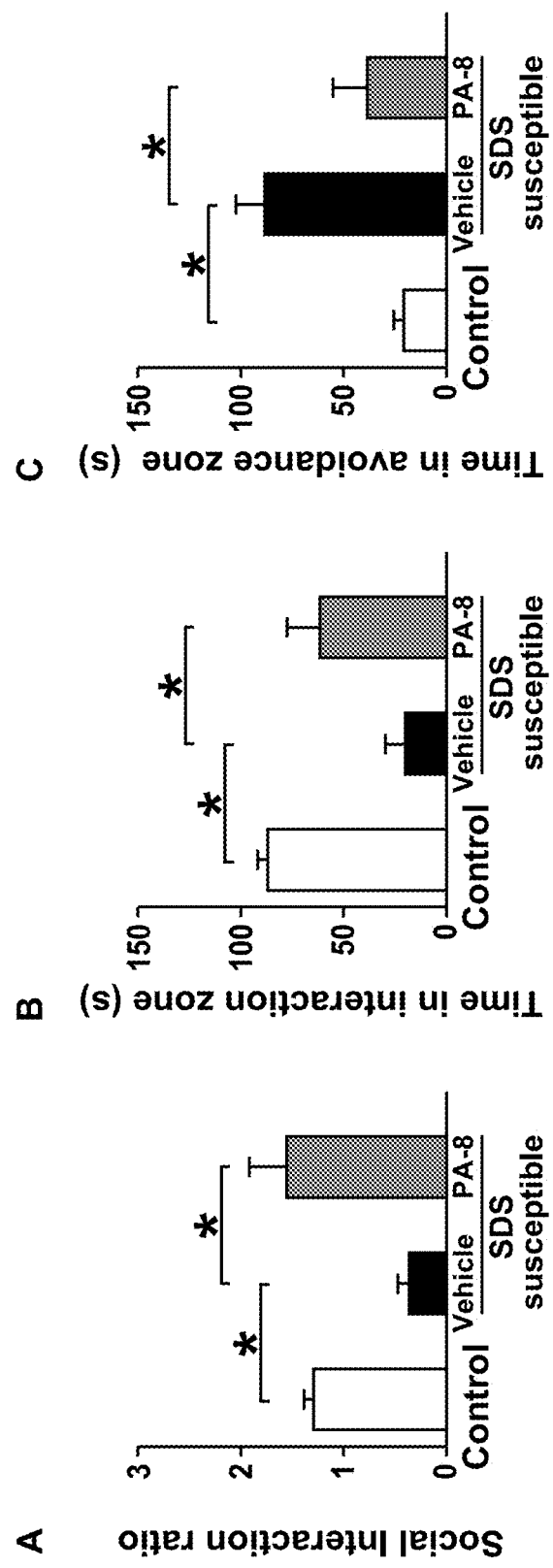
FIG. 15 shows the improving effect of PA-8 administered once daily for 7 consecutive days on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. A vehicle (10% DMSO solution; dissolved in saline; n=12) or PA-8 (30 mg/kg; n=9) was intraperitoneally administered once daily (0.1 mL/10 g) for 7 consecutive days from day 12. SPAT was conducted for 150 seconds 30 minutes after the final administration on the 7th day (Day 18). Mice reared for 10 days in a home cage without chronic social defeat stress load were used as a control (n=12). The results are shown in FIG. 15 (A: social interaction ratio, B: time spent in the interaction zone, C: time spent in the avoidance zone). The data was indicated by mean±standard error. *P<0.05 (One-way ANOVA followed by Tukey-Kramer test).

[Example 10] Improving Effect of PA-8 on Reduced Sucrose Preference (Depressive-Like Behavior) Ascribable to Chronic Social Defeat Stress In a sucrose preference test, mice are exposed to a sucrose solution and regular water contained in bottles at the same time. Normal mice prefer to drink the sweet sucrose solution, whereas depressed mice drink the sucrose solution at a decreased ratio.

Figure 16:
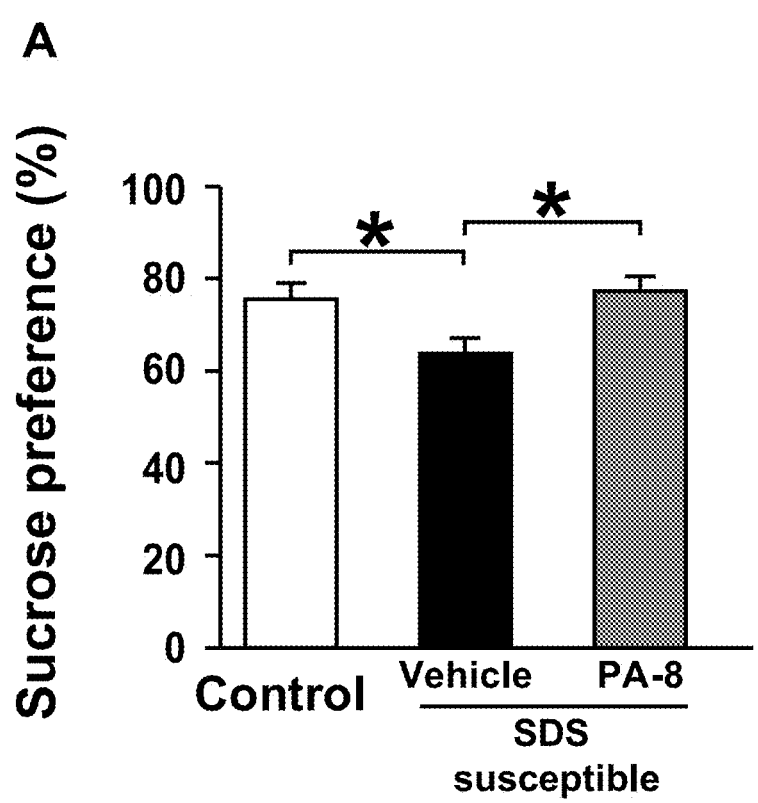
FIG. 16 shows the improving effect of PA-8 administered for 7 consecutive days on reduced sucrose preference (depressive-like behavior) ascribable to chronic social defeat stress.

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. A vehicle (10% DMSO solution; dissolved in saline; n=11) or PA-8 (30 mg/kg; n=9) was intraperitoneally administered once daily (0.1 mL/10 g) for 7 consecutive days from day 12. The sucrose preference test was conducted (a sucrose preference ratio was studied for 17 hours) 30 minutes after the final administration on the 7th day (Day 18). Mice reared for 10 days in a home cage without chronic social defeat stress load were used as a control (n=10). The results are shown in FIG. 16. The data was indicated by mean±standard error. *P<0.05 (One-way ANOVA followed by Tukey-Kramer test).

[Example 11] Effect of PA-9 on Chronic Social Defeat Stress-Induced Social Behavioral Abnormality (Depressive-Like Behavior)

Figure 17:
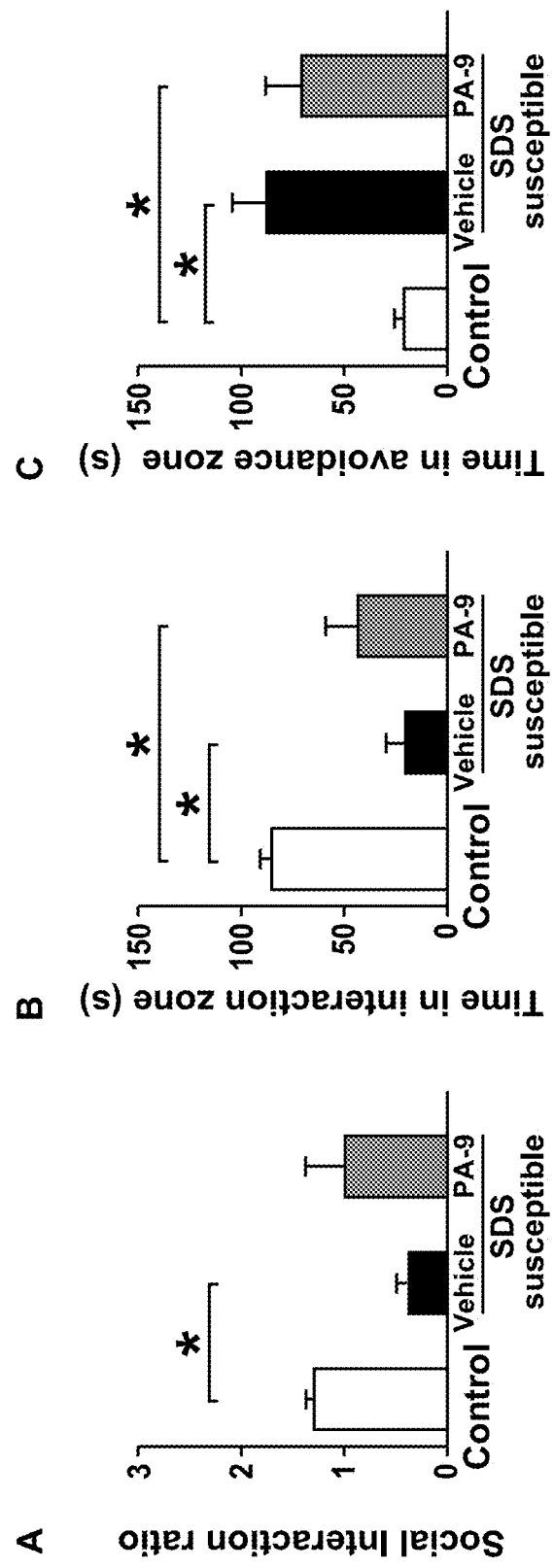
FIG. 17 shows the effect of PA-9 administered once daily for 7 consecutive days on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. A vehicle (10% DMSO solution; dissolved in saline; n=12) or PA-9 (30 mg/kg; n=9) was intraperitoneally administered once daily (0.1 mL/10 g) for 7 consecutive days from day 12. SPAT was conducted for 150 seconds 30 minutes after the final administration on the 7th day (Day 18). Mice reared for 10 days in a home cage without chronic social defeat stress load were used as a control (n=12). The results are shown in FIG. 17 (A: social interaction ratio, B: time spent in the interaction zone, C: time spent in the avoidance zone). PA-9 tended to improve social behavioral abnormality. The data was indicated by mean±standard error. *P<0.05 (One-way ANOVA followed by Tukey-Kramer test).

Figure 18:
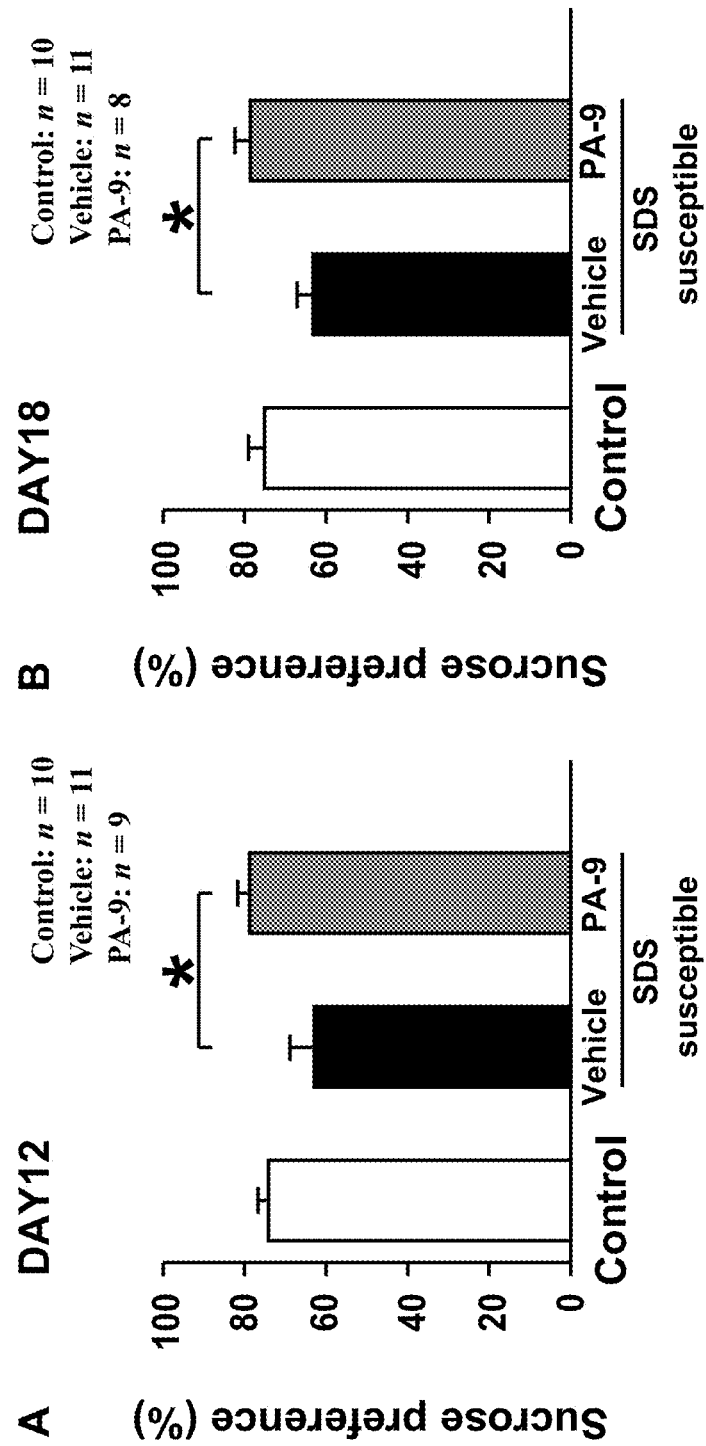
FIG. 18 shows the improving effect of PA-9 by single-dose administration and 7-day consecutive administration on reduced sucrose preference (depressive-like behavior) ascribable to chronic social defeat stress.

[Example 12] Improving Effect of PA-9 on Reduced Sucrose Preference (Depressive-Like Behavior) Ascribable to Chronic Social Defeat Stress Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. A vehicle (10% DMSO solution; dissolved in saline; n=11) or PA-9 (30 mg/kg; n=9 or 8) was intraperitoneally administered once daily (0.1 mL/10 g) for 7 consecutive days from day 12. The sucrose preference test was conducted (a sucrose preference ratio was studied for 17 hours) 30 minutes after administration on the first day (Day 12) and on the 7th day (Day 18). The results are shown in FIG. 18. PA-9 improved sucrose preference even by single-dose administration (FIG. 18, A: fast-acting antidepressant effect), and its effect was also sustained after repeated administration for 7 days (FIG. 18, B: sustained antidepressant effect). Mice reared for 10 days in a home cage without chronic social defeat stress load were used as a control (n=10). The data was indicated by mean±standard error. *P<0.05 (One-way ANOVA followed by Tukey-Kramer test).

[Example 13] Fast-Acting Antidepressant Effect of PA-915 60 Minutes after Single-Dose Administration on Chronic Social Defeat Stress-Induced Social Behavioral Abnormality (Depressive-Like Behavior)

Figure 19:
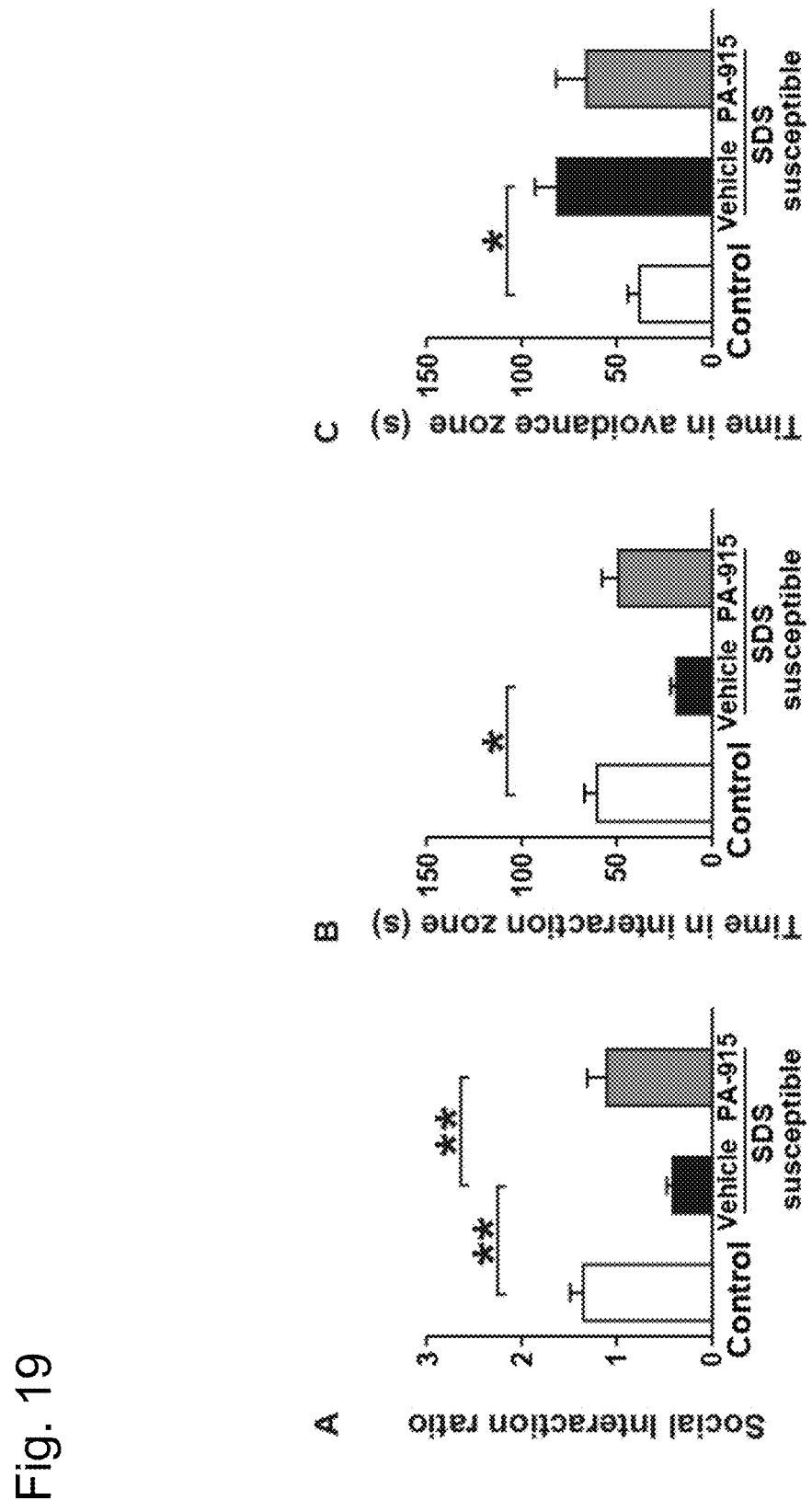
FIG. 19 shows the fast-acting antidepressant effect of PA-915 60 minutes after single-dose administration on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=17) or PA-915 (30 mg/kg; n=17) was intraperitoneally administered (0.1 mL/10 g) to the mice. SPAT was conducted for 150 seconds 60 minutes later. Mice reared for 10 days in a home cage without chronic social defeat stress load were used as a control (n=22). The results are shown in FIG. 19 (A: social interaction ratio, B: time spent in the interaction zone, C: time spent in the avoidance zone). The single-dose administration of PA-915 significantly improved social behavioral abnormality (fast-acting antidepressant effect). The data was indicated by mean±standard error. **P<0.01; *P<0.05 (One-way ANOVA followed by Tukey-Kramer test).

[Example 14] Sustained Antidepressant Effect of PA-915 by Single-Dose Administration on Chronic Social Defeat Stress-Induced Social Behavioral Abnormality (Depressive-Like Behavior)

Figure 20:
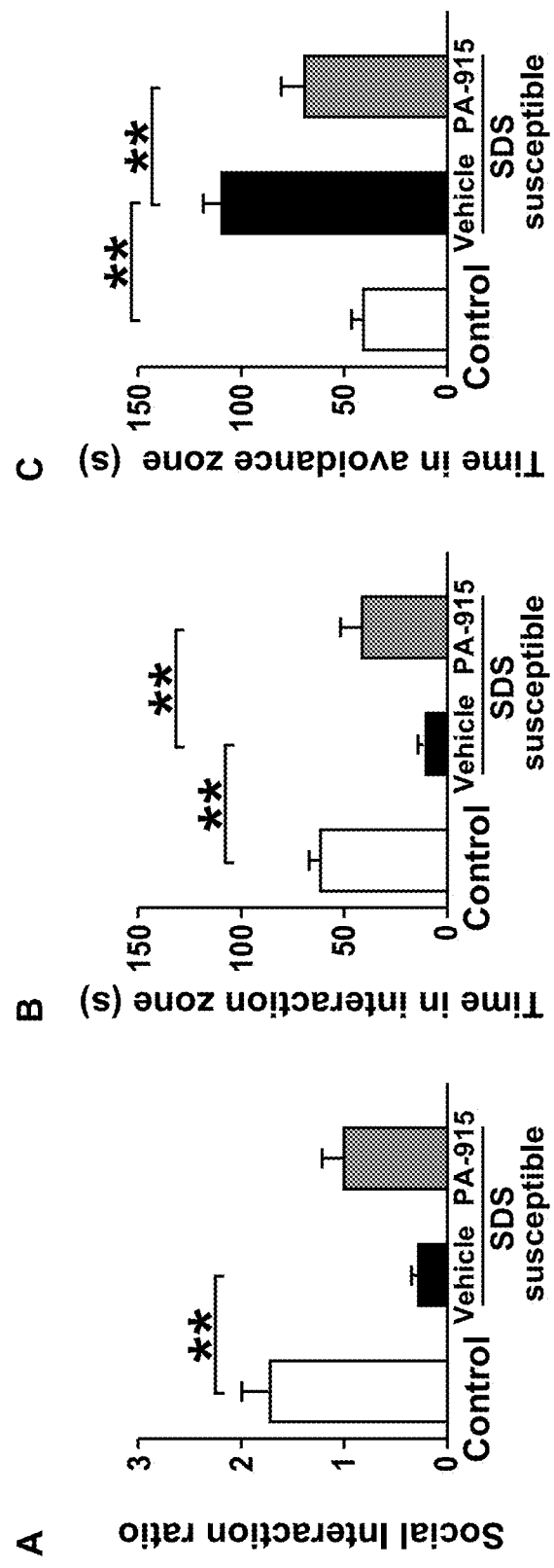
FIG. 20 shows the sustained antidepressant effect of PA-915 7 days after single-dose administration on chronic social defeat stress-induced social behavioral abnormality (depressive-like behavior).
Figure 21:
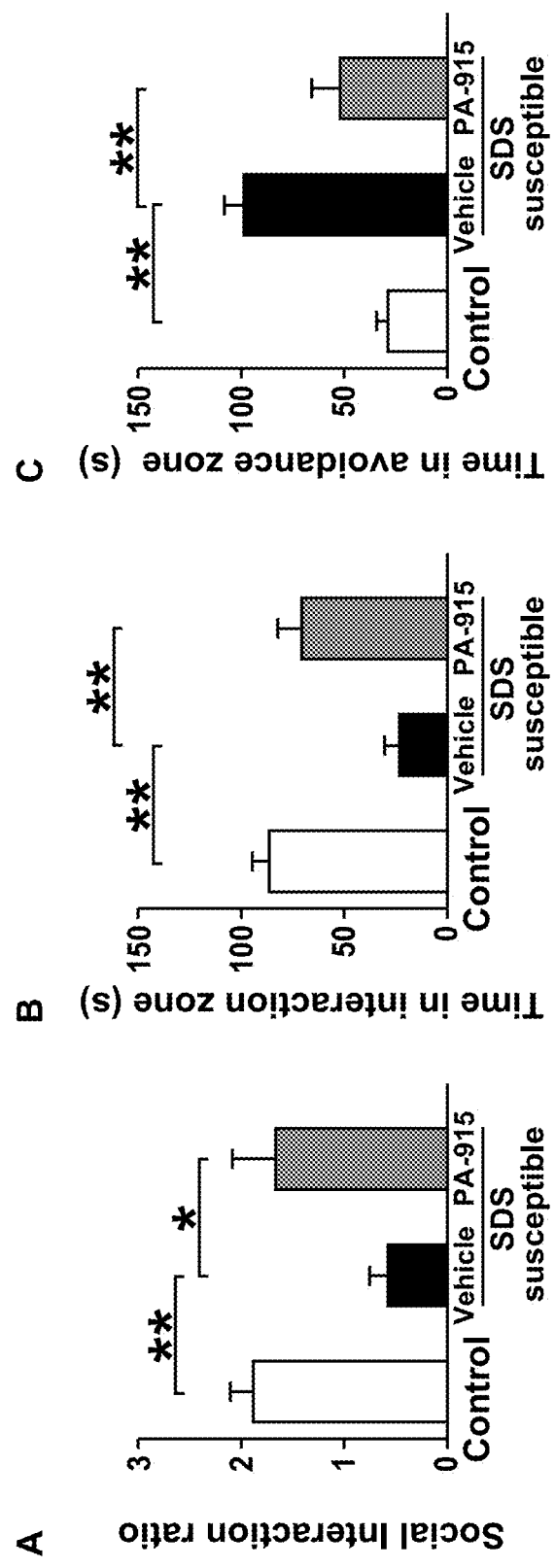
FIG. 21 shows the sustained antidepressant effect of PA-915 28 days after single-dose administration on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=17, n=16 only on Day 40) or PA-915 (30 mg/kg; n=17) was intraperitoneally administered (0.1 mL/10 g) to the mice. SPAT was conducted for 150 seconds 7 days later (Day 19) or 28 days later (Day 40) (study on a social interaction ratio). Mice reared for 10 days in a home cage without chronic social defeat stress load were used as a control (n=22). The results are shown in FIG. 20 or 21 (A: social interaction ratio, B: time spent in the interaction zone, C: time spent in the avoidance zone). The single-dose administration of PA-915 also maintained its effectiveness (improvement in social behavioral abnormality) 7 days (FIG. 20) and 28 days (FIG. 21) after improving social behavioral abnormality (sustained antidepressant effect). The data was indicated by mean±standard error. **P<0.01; *P<0.05 (One-way ANOVA followed by Tukey-Kramer test).

[Example 15] Effect of PA-915 by Single-Dose Administration on Chronic Social Defeat Stress-Induced Anxiety-Like Behavior (1) Effect of PA-915 (Evaluation by Light-Dark Test)

The effect of PA-915 on mice loaded with chronic social defeat stress was evaluated by a light-dark test (test to measure spontaneous locomotion by exploiting the properties of mice to avoid light environments, and placing the mice in a light box and a dark box joined together (20 cm×20 cm, height: 30 cm); in this test, anxiety-like behavior is evaluated by measuring times spent in the light box and the dark box and the number of transitions between the light box and the dark box).

Figure 22:
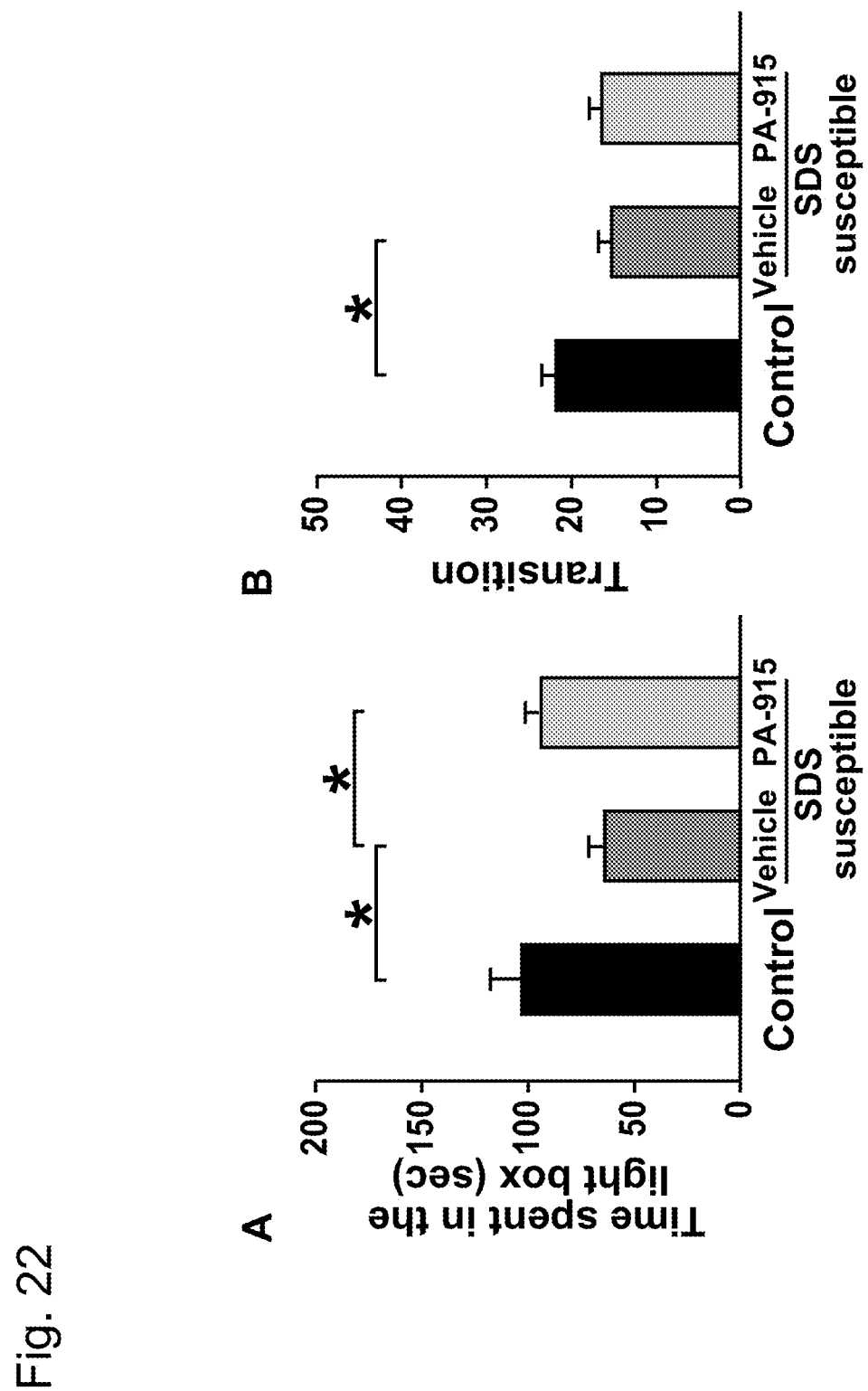
FIG. 22 shows the fast-acting anti-anxiety effect of PA-915 60 minutes after single-dose administration on anxiety-like behavior ascribable to chronic social defeat stress (evaluation by a light-dark test).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=12) or PA-915 (30 mg/kg; n=12) was intraperitoneally administered (0.1 mL/10 g) to the mice. After a lapse of 60 minutes after administration, the test was conducted for 5 minutes. Mice reared for 10 days in a home cage without chronic social defeat stress load were used as a control (n=8). The results are shown in FIG. 22 (A: time spent in the light box, B: the number of transitions between the light and dark boxes; light box illuminance: 330 lx). The data was indicated by mean±standard error. *P<0.05 (One-way ANOVA followed by Tukey-Kramer test).

(2) Effect of PA-915 (Evaluation by Open Field Test)

The improving effect of PA-915 on chronic social defeat stress-induced anxiety-like behavior was evaluated by an open field test (test to measure spontaneous locomotion in a novel environment by exploiting the properties of mice to do exploratory behavior in such a novel environment, and using a 40 cm×40 cm box of 30 cm in height; spontaneous motor activity is measured from the total distance traveled; in this test, anxiety-like behavior is evaluated by exploiting the properties of mice to prefer to stay near walls and avoid light environments, and measuring a time spent in a center zone (20 cm×20 cm) or the number of entries thereto).

Figure 23:
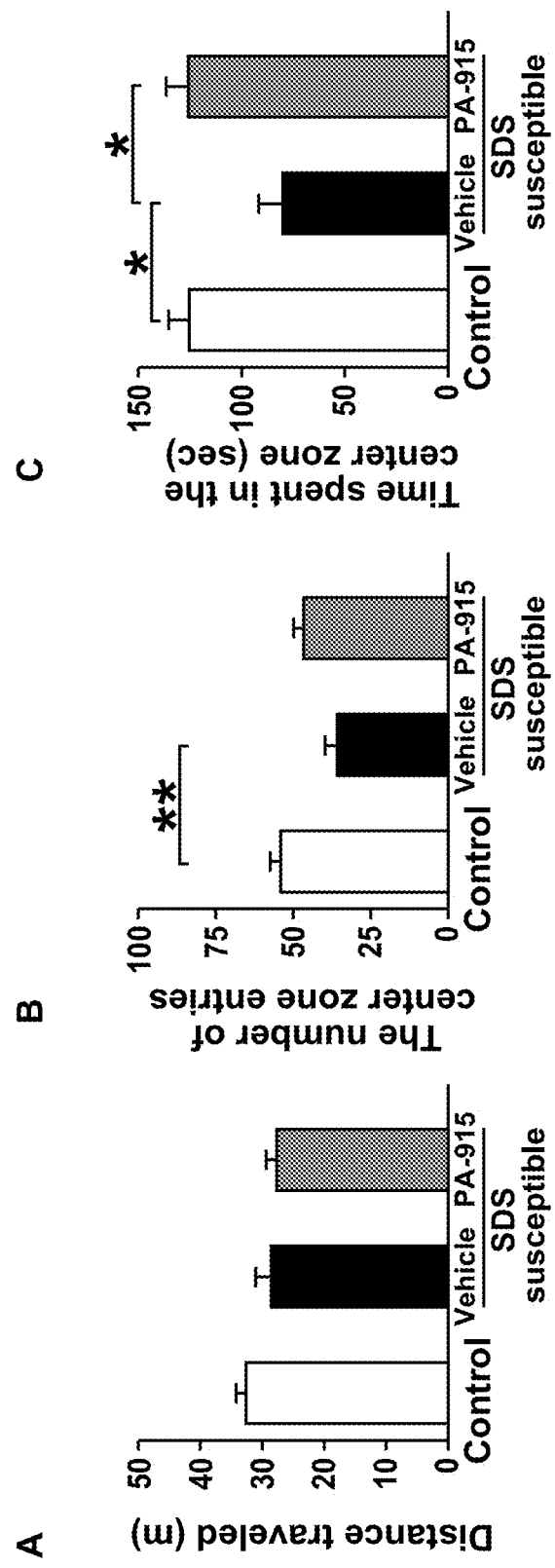
FIG. 23 shows the significant anti-anxiety effect of PA-915 24 hours after single-dose administration on anxiety-like behavior ascribable to chronic social defeat stress (evaluation by an open field test).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=12) or PA-915 (30 mg/kg; n=12) was intraperitoneally administered (0.1 mL/10 g) to the mice. On Day 13, the mice were acclimatized to a laboratory (illuminance: 40 lx) for 60 minutes and then subjected to the open field test for 10 minutes. Mice reared for 10 days in a home cage without chronic social defeat stress load were used as a control (n=8). The results are shown in FIG. 23 (A: total distance traveled, B: the number of center zone entries, C: time spent in the center zone). The data was indicated by mean±standard error. **P<0.01; *P<0.05 (One-way ANOVA followed by Tukey-Kramer test).

(3) Effect of PA-915 (Evaluation by Elevated Plus Maze Test)

The improving effect of PA-915 on chronic social defeat stress-induced anxiety-like behavior was evaluated by an elevated plus maze test (test that exploits the properties of mice to avoid heights and prefer to stay near walls; in this test, anxiety-like behavior is evaluated by placing the mice at the center of a maze disposed at a height of 50 cm in which a 26 cm long and 8 cm wide open arm without walls and a closed-arm with walls are disposed in a cross shape, and measuring a time spent in the open arm and the number of entries thereto).

Figure 24:
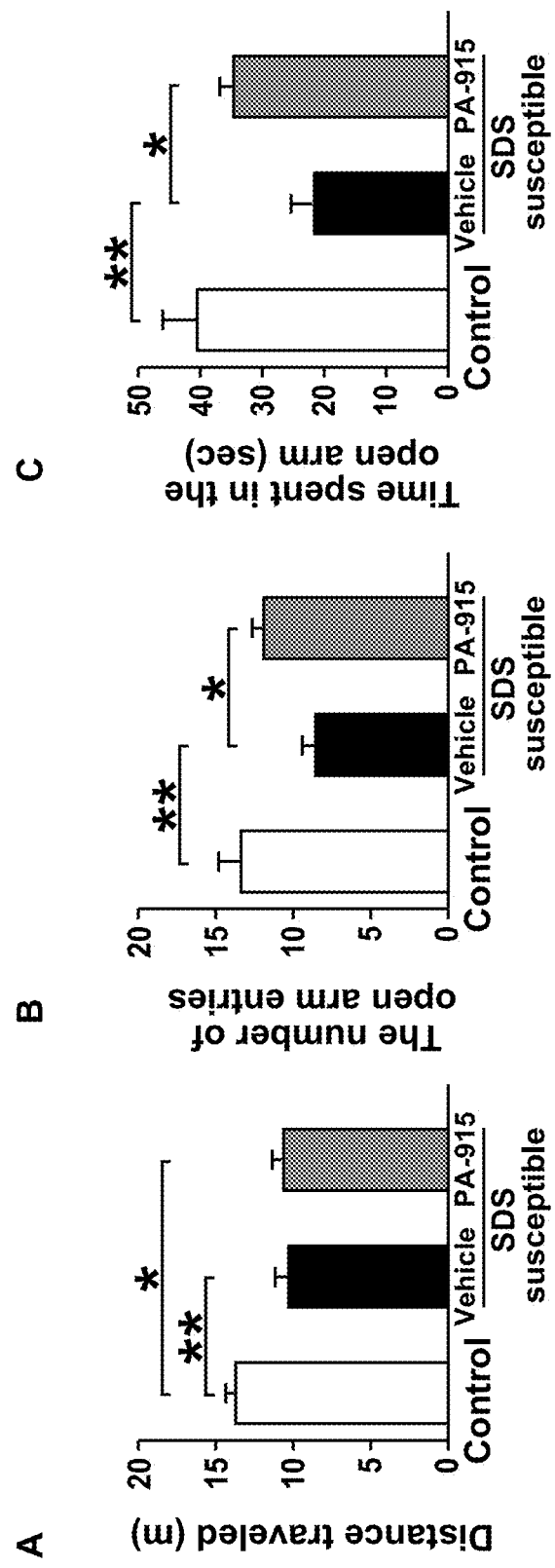
FIG. 24 shows the sustained anti-anxiety effect of PA-915 48 hours after single-dose administration on anxiety-like behavior ascribable to chronic social defeat stress (evaluation by an elevated plus maze test).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=11) or PA-915 (30 mg/kg; n=12) was intraperitoneally administered (0.1 mL/10 g) to the mice. Two days later (Day 14), the mice were acclimatized to a laboratory (illuminance: 50 lx) for 60 minutes and then subjected to the elevated plus maze test for 5 minutes. Mice reared for 10 days in a home cage without chronic social defeat stress load were used as a control (n=8). The results are shown in FIG. 24 (A: total distance traveled, B: the number of open arm entries, C: time spent in the open arm). The data was indicated by mean±standard error. **P<0.01; *P<0.05 (One-way ANOVA followed by Tukey-Kramer test).

[Example 16] Effect of PA-915 by Single-Dose Administration on Chronic Social Defeat Stress-Induced Depressive-Like Behavior (1) Improving Effect of PA-915 on Reduced Sucrose Preference (Depressive-Like Behavior)

In a sucrose preference test, mice are exposed to a sucrose solution and regular water contained in bottles at the same time. Normal mice prefer to drink the sweet sucrose solution, whereas depressed mice drink the sucrose solution at a decreased ratio.

Figure 25:
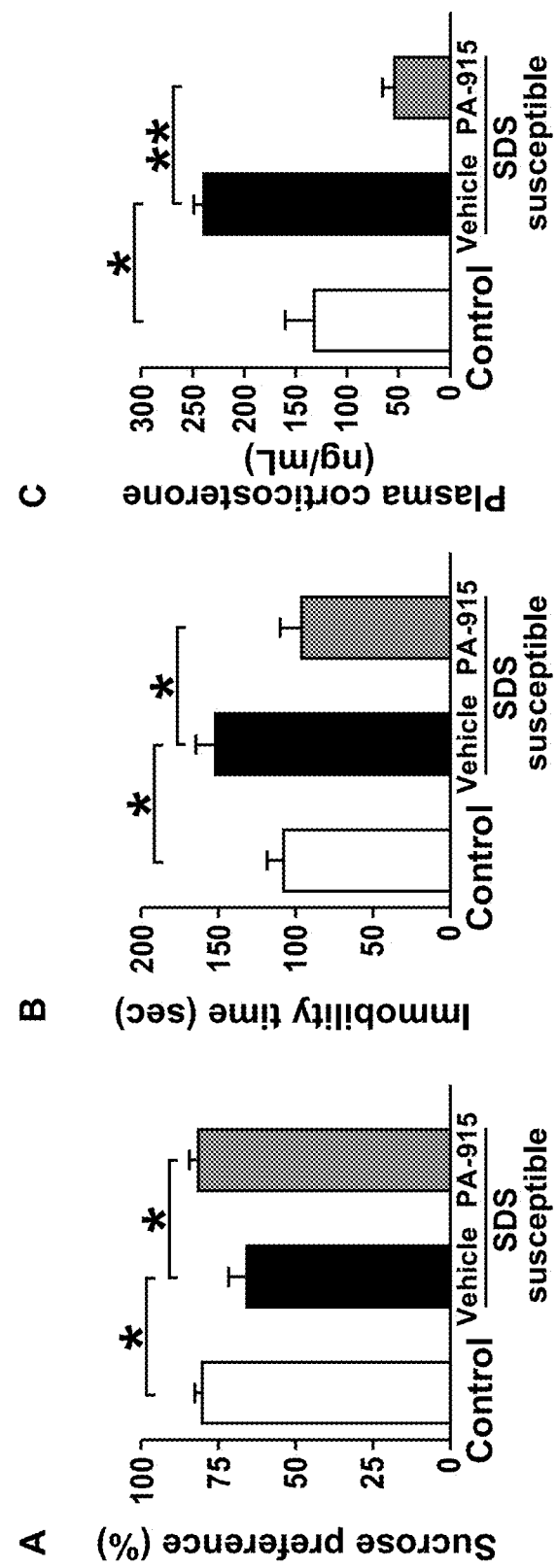
FIG. 25 shows the improving effect of PA-915 by single-dose administration on depressive-like behavior ascribable to chronic social defeat stress and abnormal corticosterone secretion in plasma (evaluation by a sucrose preference test, a forced swim test, and enzyme-linked immunosorbent assay (ELISA)).

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=11) or PA-915 (30 mg/kg; n=10) was intraperitoneally administered (0.1 mL/10 g) to the mice. The sucrose preference test was conducted (a sucrose preference ratio was studied for 17 hours) from 30 minutes after administration. The results are shown in FIG. 25A. Mice reared for 10 days in a home cage without chronic social defeat stress load were used as a control (n=15). The data was indicated by mean±standard error. *P<0.05 (One-way ANOVA followed by Tukey-Kramer test).

(2) Effect of PA-915 (Evaluation by Forced Swim Test)

The improving effect of PA-915 on chronic social defeat stress-induced depressive-like behavior was evaluated by a forced swim test (test that exploits the switch of mice caused to swim in an inevitable environment from active escape behavior to a passive state of floating or immobility; in this test, depressive-like behavior is evaluated by placing the mice in an acrylic cylinder of 20 cm in diameter and 25 cm in height filled with water (water temperature: 25° C.) up to a depth of 15 cm, and measuring a passive floating or immobility time).

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=11) or PA-915 (30 mg/kg; n=10) was intraperitoneally administered (0.1 mL/10 g) to the mice. On Day 13, the mice were forced to swim for 6 minutes, and an immobility time was measured. The results are shown in FIG. 25B. Mice reared for 10 days in a home cage without chronic social defeat stress load were used as a control (n=15). The data was indicated by mean±standard error. *P<0.05 (One-way ANOVA followed by Tukey-Kramer test).

(3) Effect of PA-915 (Evaluation by Plasma Corticosterone Level)

It is known that the amount of glucocorticoid (typically, corticosterone in mice) secreted into plasma from the adrenal cortex is increased in association with physical or mental stress load. A plasma corticosterone level is generally used as an index for stress response.

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=3) or PA-915 (30 mg/kg; n=3) was intraperitoneally administered (0.1 mL/10 g) to the mice. On Day 13, the mice were decapitated, and systemic circulating blood was collected. The plasma corticosterone level was measured using Corticosterone ELISA kit from Cayman Chemical Company. The results are shown in FIG. 25C. Mice reared for 10 days in a home cage without chronic social defeat stress load were used as a control (n=4). The data was indicated by mean±standard error. **P<0.01; *P<0.05 (One-way ANOVA followed by Tukey-Kramer test).

[Example 17] Improving Effect of PA-915 by Single-Dose Administration on Cognitive Function Decline Ascribable to Chronic Social Defeat Stress (1) Effect of PA-915 (Evaluation by Y Maze Test)

The effect of PA-915 by single-dose administration on abnormal cognitive function ascribable to chronic social defeat stress was evaluated by a Y maze test (spatial cognitive function test that exploits the properties of mice to enter an arm different from the immediate prior one using a Y-shaped apparatus having 40 cm long, 3 cm wide, and 12 cm high arms; in this test, short-term working memory is evaluated by dividing spontaneous alterations (the number of consecutive entries to the three different arms) upon free exploration in the apparatus by the total number of entries to determine an alterations ratio).

Figure 26:
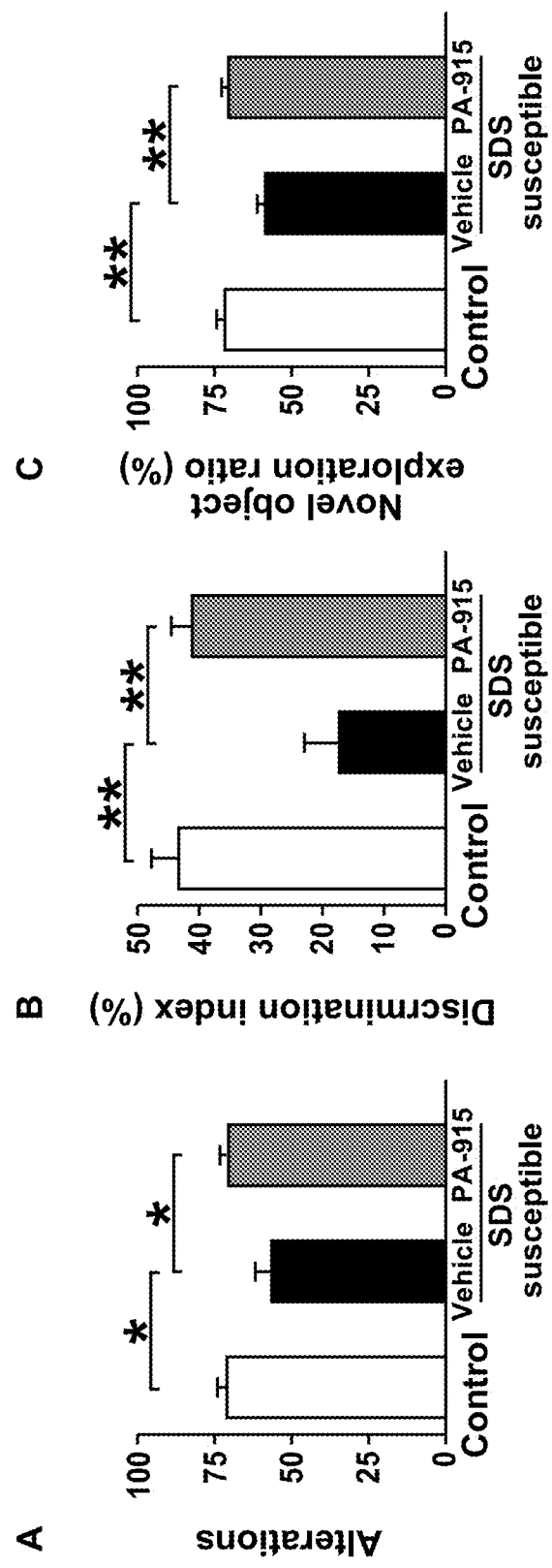
FIG. 26 shows the fast-acting and sustained improving effect of PA-915 by single-dose administration on cognitive impairment ascribable to chronic social defeat stress (evaluation by a Y maze test and a novel object recognition test).

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=15) or PA-915 (30 mg/kg; n=16) was intraperitoneally administered (0.1 mL/10 g) to the mice. After a lapse of 60 minutes after administration, the mice were allowed to explore the Y maze for 5 minutes in a laboratory (illuminance: 20 lx). The results are shown in FIG. 26A. Mice reared for 10 days in a home cage without chronic social defeat stress load were used as a control (n=16). The data was indicated by mean±standard error. *P<0.05 (One-way ANOVA followed by Tukey-Kramer test).

(2) Effect of PA-915 (Evaluation by Novel Object Recognition Test)

The effect of PA-915 by single-dose administration on abnormal cognitive function ascribable to chronic social defeat stress was evaluated by a novel object recognition test (test to evaluate visual perception memory by exploiting the properties of mice to prefer novelty for exploration, and determining the ratio of a novel object exploration time to the total exploration time in a 30 cm×30 cm box of 35 cm in height).

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=15) or PA-915 (30 mg/kg; n=15) was intraperitoneally administered (0.1 mL/10 g) to the mice. The mice were acclimatized to the test box by exploration at 10 min/day from Day 13 to Day 15. On Day 16, two objects differing in shape were placed in the test box, and the mice were allowed to freely explore the test box for 10 minutes (training trial). 60 minutes after the completion of exploration, one of the two objects was further changed to a novel object differing in shape therefrom, and the mice were allowed to explore the test box for 5 minutes (retention trial). Novel and known object exploration times were measured. The results are shown in FIGS. 26B and 26C (B: discrimination index, C: novel object exploration ratio). Mice reared for 10 days in a home cage without chronic social defeat stress load were used as a control (n=15). The data was indicated by mean±standard error. **$P<0.01$ (One-way ANOVA followed by Tukey-Kramer test).

[Example 18] Comparison Among Fast-Acting and Sustained Effects of PA-915 by Single-Dose Administration, Ketamine by Single-Dose Administration and Existing Drug Fluoxetine by Consecutive Administration on Chronic Social Defeat Stress-Induced Social Behavioral Abnormality (Depressive-Like Behavior)

Figure 27:
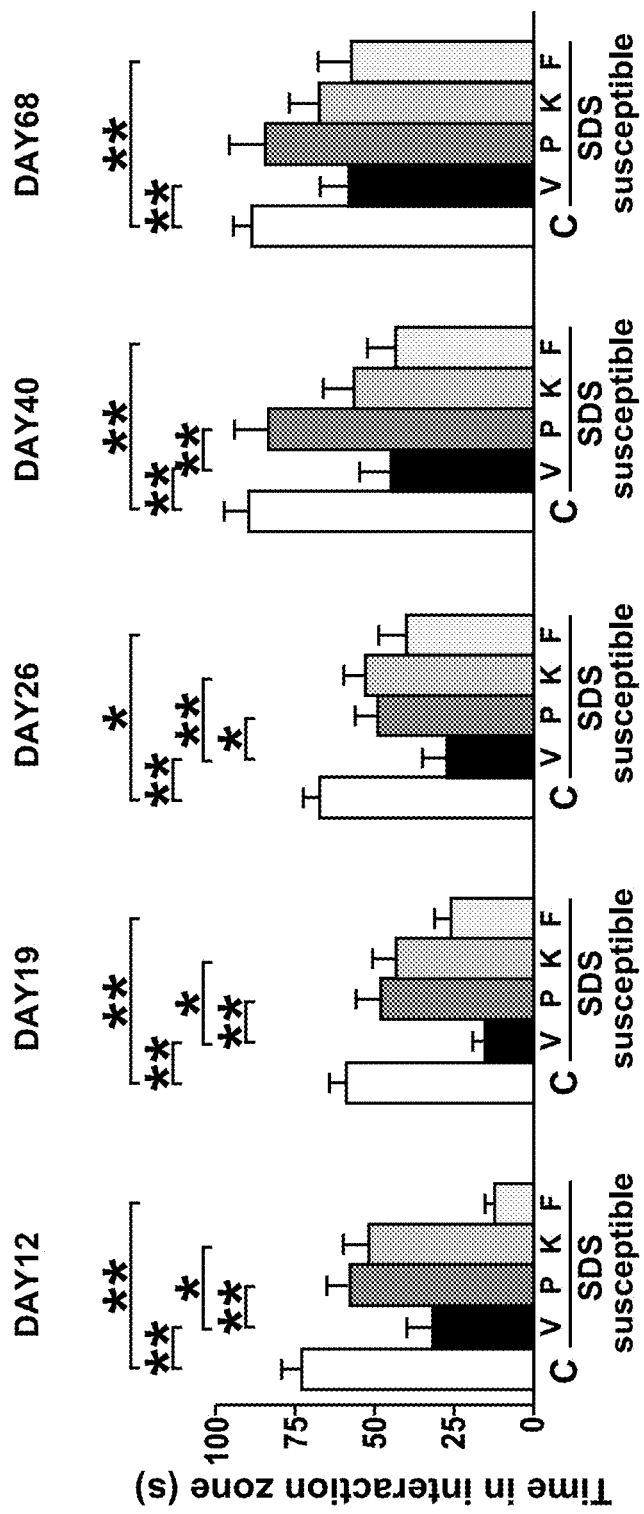
FIG. 27 shows the comparison among the fast-acting (60 minutes later) and sustained (7 days, 14 days, 28 days, and 56 days later) effects of PA-915, ketamine and an existing drug fluoxetine on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (V: 10% DMSO solution; dissolved in saline; n=17), PA-915 (P: 30 mg/kg; n=15), ketamine (K: 20 mg/kg; n=15) or fluoxetine (F: 20 mg/kg; n=16) was intraperitoneally administered (0.1 mL/10 g) to the mice. SPAT was conducted for 150 seconds 60 minutes later, 7 days later (Day 19), 14 days later (Day 26), 28 days later (Day 40), and 56 days later (Day 68) (study on a social interaction ratio). However, for the fluoxetine administration group, consecutive administration (F: 20 mg/kg, intraperitoneal administration (0.1 mL/10 g)) was performed for 14 days from Day 12 to Day 26. Mice reared for 10 days in a home cage without chronic social defeat stress load were used as a control (n=22). The results about the social interaction ratio are shown in FIG. 27. The data was indicated by mean±standard error. **$P<0.01$; *$P<0.05$ (Unpaired t-test). The single-dose administration of PA-915 or ketamine improved social behavioral abnormality (depressive-like behavior) in a fast-acting manner (Day 12) and also maintained its effectiveness 7, 14, and 28 days later (sustained antidepressant effect). On the other hand, neither the single-dose administration nor 14-day consecutive administration of fluoxetine improved social behavioral abnormality.

Figure 28:
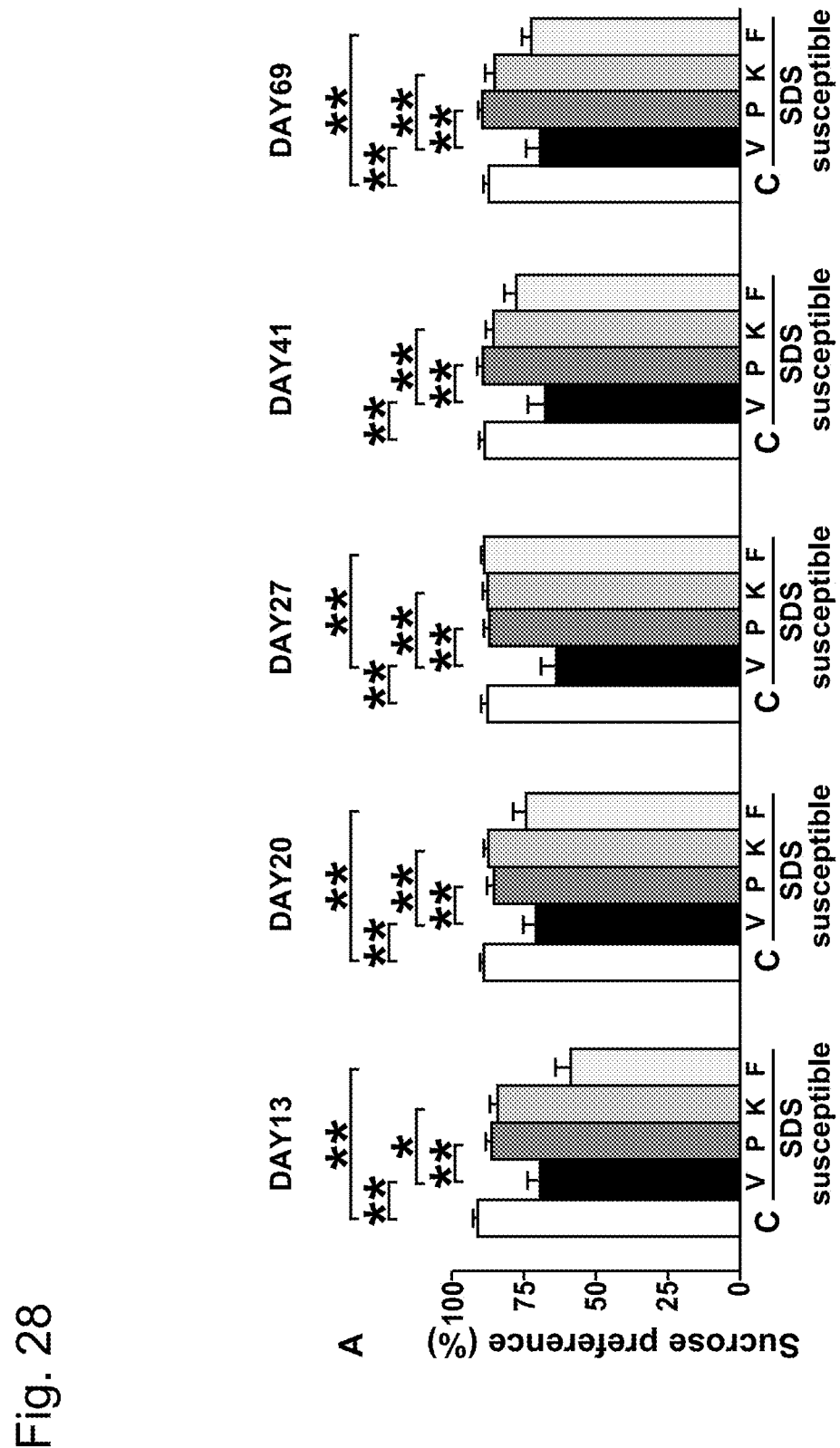
FIG. 28 shows the comparison among the fast-acting (24 hours later) and sustained (8 days, 15 days, 29 days, and 57 days later) effects of PA-915, ketamine and an existing drug fluoxetine on reduced sucrose preference (depressive-like behavior) ascribable to chronic social defeat stress.

[Example 19] Comparison Among Fast-Acting and Sustained Effects of PA-915 by Single-Dose Administration, Ketamine by Single-Dose Administration and Existing Drug Fluoxetine by Consecutive Administration on Reduced Sucrose Preference (Depressive-Like Behavior) Ascribable to Chronic Social Defeat Stress Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (V: 10% DMSO solution; dissolved in saline; n=17), PA-915 (P: 30 mg/kg; n=15), ketamine (K: 20 mg/kg; n=15) or fluoxetine (F: 20 mg/kg; n=16, n=15 only on Day 69) was intraperitoneally administered (0.1 mL/10 g) to the mice. The sucrose preference test was conducted 24 hours later (Day 13), 8 days later (Day 20), 15 days later (Day 27), 29 days later (Day 41), and 57 days later (Day 69) (a sucrose preference ratio was studied on each day from 5:00 p.m. of the previous day to 10:00 a.m. of the day). However, for the fluoxetine administration group, consecutive administration (F: 20 mg/kg, intraperitoneal administration (0.1 mL/10 g)) was performed for 14 days from Day 12 to Day 26. Mice reared for 10 days in a home cage without chronic social defeat stress load were used as a control (n=22). The results about the social interaction ratio are shown in FIG. 28. The data was indicated by mean±standard error. **$P<0.01$; *$P<0.05$ (One-way ANOVA followed by Tukey-Kramer test). The single-dose administration of PA-915 or ketamine improved reduced sucrose preference in a fast-acting manner and also maintained its effectiveness 8, 15, 29, and 57 days later (sustained antidepressant effect). On the other hand, the single-dose administration of fluoxetine did not improve sucrose preference, and the 14-day consecutive administration thereof improved reduced sucrose preference, but its effectiveness was not maintained after drug withdrawal.

[Example 20] Comparison Among Influences of PA-915, Ketamine and Existing Drug Fluoxetine on Spontaneous Motor Activity, Startle Response, and Spatial Working Memory in Normal Mouse (1) The effects of PA-915, ketamine and the existing drug fluoxetine on normal mice were evaluated by an open field test (test to measure spontaneous locomotion in a novel environment by exploiting the properties of mice to do exploratory behavior in such a novel environment, and using a 45 cm×45 cm box of 30 cm in height).

Figure 29:
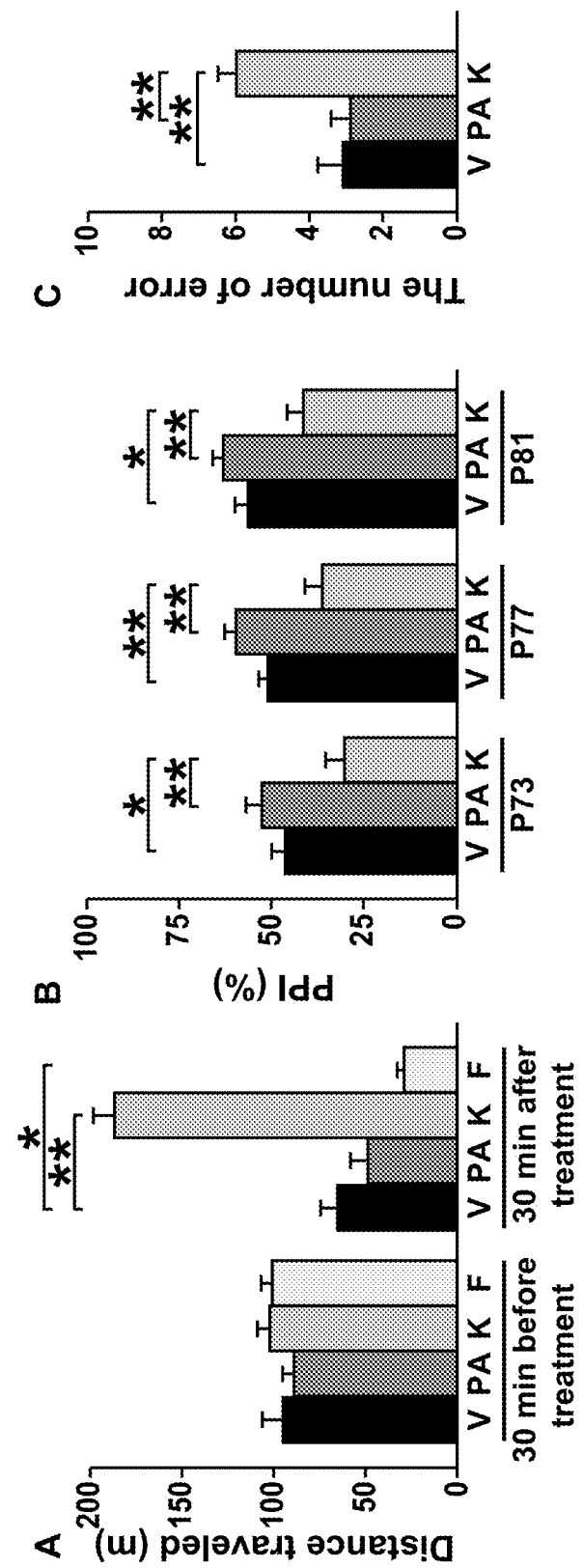
FIG. 29 shows the comparison among the effects of PA-915, ketamine and an existing drug fluoxetine on normal mice (evaluation by spontaneous motor activity, prepulse inhibition, and a radial maze test).

Male C57BL/6J mice (8 to 12 weeks old) were placed in the box (illuminance: 100 lx) and allowed to freely explore the box for 60 minutes. Then, a vehicle (V: 10% DMSO solution; dissolved in saline; n=8), PA-915 (PA: 30 mg/kg; n=9), ketamine (K: 20 mg/kg; n=8) or fluoxetine (F: 20 mg/kg; n=11) was intraperitoneally administered thereto (0.1 mL/10 g). Spontaneous motor activity was measured by using the total distances traveled for 30 minutes before administration and for 30 minutes after administration as indexes. The results about the total distances traveled are shown in FIG. 29A. The data was indicated by mean±standard error. **$P<0.01$; *$P<0.05$ (Two-way ANOVA followed by Tukey-Kramer test). A decrease in spontaneous motor activity by fluoxetine, and an increase in spontaneous motor activity by ketamine were found. By contrast, PA-915 did not cause such significant change in spontaneous motor activity.

(2) The effects of PA-915 and ketamine on normal mice were evaluated by a prepulse inhibition (PPI) test (prepulse inhibition refers to a phenomenon in which startle response is drastically suppressed by a relatively weak stimulus that immediately precedes a sudden sensory stimulus; test to measure the ability to process sensory information by measuring startle response to an acoustic stimulus using a 33 cm long, 43 cm wide, and 33 cm height box).

A vehicle (V: 10% DMSO solution; dissolved in saline; n=13), PA-915 (PA: 30 mg/kg; n=10) or ketamine (K: 20 mg/kg; n=15) was intraperitoneally administered (0.1 mL/10 g) to male C57BL/6J mice (8 to 12 weeks old), which were then acclimatized to 65 dB background noise for 5 minutes in the apparatus. The mice were randomly stimulated 20 times with 50-msec 120 dB startle sound or with 20-msec 73 dB, 77 dB, and 81 dB prepulse sounds and 50-msec 120 dB startle sound 50 msec after each prepulse sound for 30 minutes from the completion of acclimatization. In this respect, the ratio of PPI was calculated according to [(Average startle amplitude without prepulse)−(Average startle amplitude of trial with prepulse)]/(Average startle amplitude without prepulse)×100. The results about the PPI ratio are shown in FIG. 29B. The data was indicated by mean±standard error. **P<0.01; *P<0.05 (One-way ANOVA followed by Tukey-Kramer test). The administration of ketamine caused prepulse inhibition deficits, whereas the administration of PA-915 caused no significant change.

(3) The effects of PA-915 and ketamine on normal mice were evaluated by a radial maze test (test to evaluate spatial working memory by exploiting the foraging behavior of mice, and using an apparatus having 40 cm long, 10 cm wide and 12 cm high arms radially arranged in 8 directions).

On Day 0, male C57BL/6J mice (8 weeks old) were acclimatized to the apparatus by free exploration for 10 minutes in the apparatus in a laboratory (illuminance: 200 lx). On Days 1 and 2, the mice were allowed to explore only correct arms baited with a reward (food pellets, 5 mg) for 10 minutes. On Days 3 to 9, the mice were allowed to explore all the arms for 5 minutes at maximum until the mice finished the reward while the ends of the correct arms were baited with the reward. On Day 10, a vehicle (V: 10% DMSO solution; dissolved in saline; n=10), PA-915 (PA: 30 mg/kg; n=10) or ketamine (K: 20 mg/kg; n=10) was intraperitoneally administered thereto (0.1 mL/10 g). The mice were allowed to freely explore the maze from 30 minutes later, and the number of entries to the arms without the reward (the number of errors) was measured. During the test period, the absence of marked change in the body weights of the mice by dietary restriction was confirmed. The results about the number of errors on Day 10 are shown in FIG. 29C. The data was indicated by mean±standard error. **P<0.01 (One-way ANOVA followed by Tukey-Kramer test). Ketamine decreased spatial cognitive function, whereas PA-915 had no such significant influence.

[Example 21] Fast-Acting Antidepressant Effect of PA-915 60 Minutes after Oral Administration on Chronic Social Defeat Stress-Induced Social Behavioral Abnormality (Depressive-Like Behavior)

Figure 30:
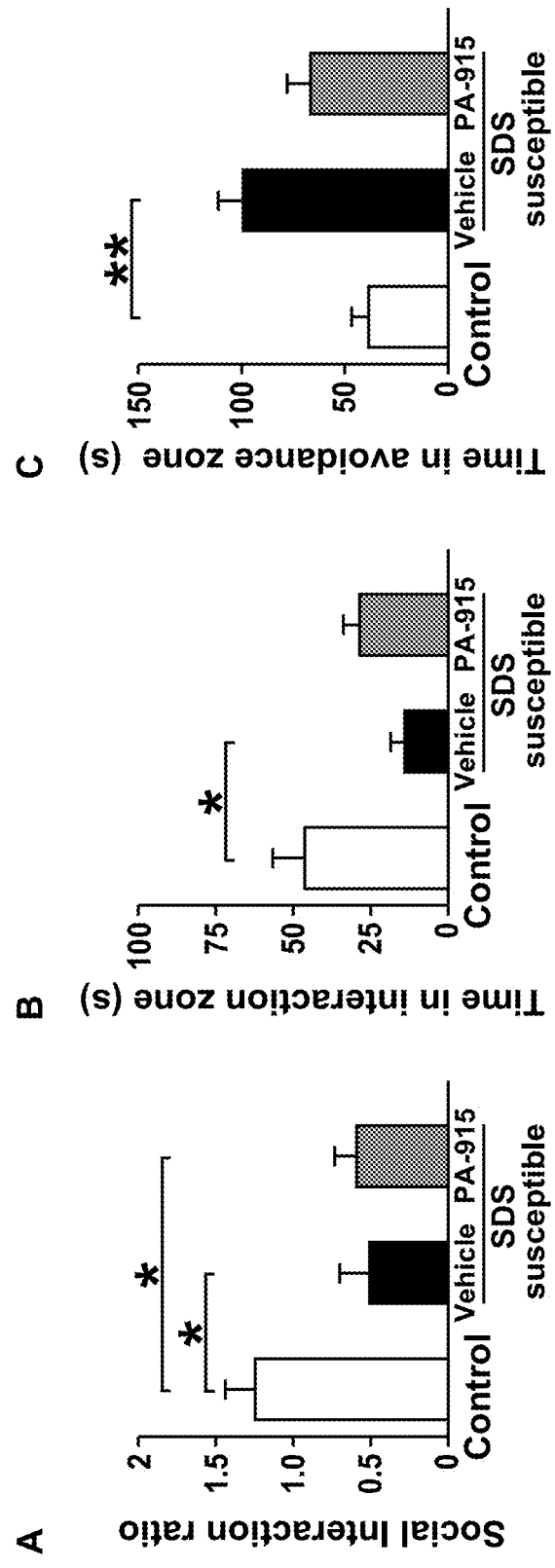
FIG. 30 shows the fast-acting antidepressant effect of PA-915 60 minutes after oral administration on chronic social defeat stress-induced social behavioral abnormality (depressive-like behavior).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=15) or PA-915 (30 mg/kg; n=16) was orally administered thereto (0.1 mL/10 g). SPAT was conducted for 150 seconds 60 minutes later. Mice reared for 10 days in a home cage without chronic social defeat stress load were used as a control (n=10). The results are shown in FIG. 30 (A: social interaction ratio, B: time spent in the interaction zone, C: time spent in the avoidance zone). The oral administration of PA-915 tended to improve social behavioral abnormality (fast-acting antidepressant effect). The data was indicated by mean±standard error. **P<0.01; *P<0.05 (One-way ANOVA followed by Tukey-Kramer test).

[Example 22] Effect of PA-915 by Oral Administration on Anxiety-Like Behavior Ascribable to Chronic Social Defeat Stress (Evaluation by Elevated Plus Maze Test)

Figure 31:
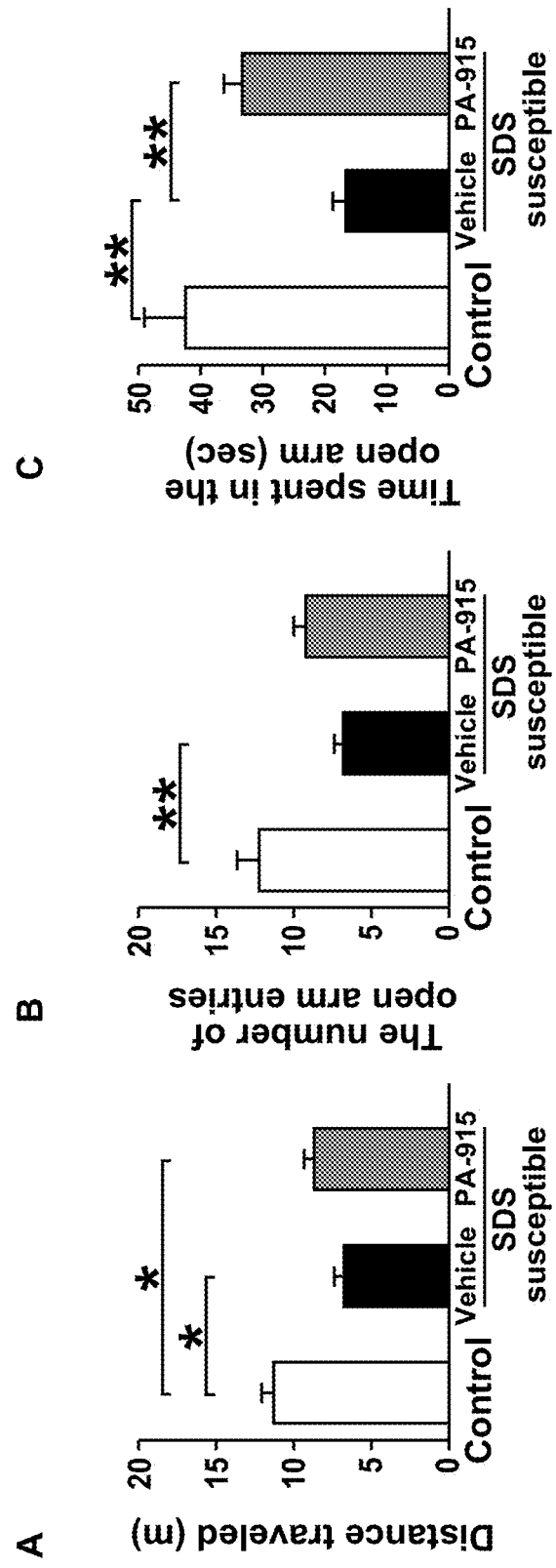
FIG. 31 shows the significant anti-anxiety effect of PA-915 by oral administration on anxiety-like behavior ascribable to chronic social defeat stress (evaluation by an elevated plus maze test).

Chronic social defeat stress was applied at 10 min/day for 10 days (Days 1 to 10) to male C57BL/6N mice (8 to 12 weeks old) each reared in isolation for 10 days or longer. On Day 11, the social preference or avoidance test (SPAT) was conducted, and susceptible mice were selected. On the next day (Day 12), a vehicle (10% DMSO solution; dissolved in saline; n=15) or PA-915 (30 mg/kg; n=16) was orally administered thereto (0.1 mL/10 g). Two days later (Day 14), the mice were subjected to the elevated plus maze test for 5 minutes in a laboratory (illuminance: 50 lx). Mice reared for 10 days in a home cage without chronic social defeat stress load were used as a control (n=11). The results are shown in FIG. 31 (A: total distance traveled, B: the number of open arm entries, C: time spent in the open arm). The data was indicated by mean±standard error. **P<0.01; *P<0.05 (One-way ANOVA followed by Tukey-Kramer test).

[Example 23] Effect of PA-915 by Oral Administration on Chronic Social Defeat Stress-Induced Depressive-Like Behavior (1) Improving Effect of PA-915 by Oral Administration on Reduced Sucrose Preference (Depressive-Like Behavior)

Figure 32:
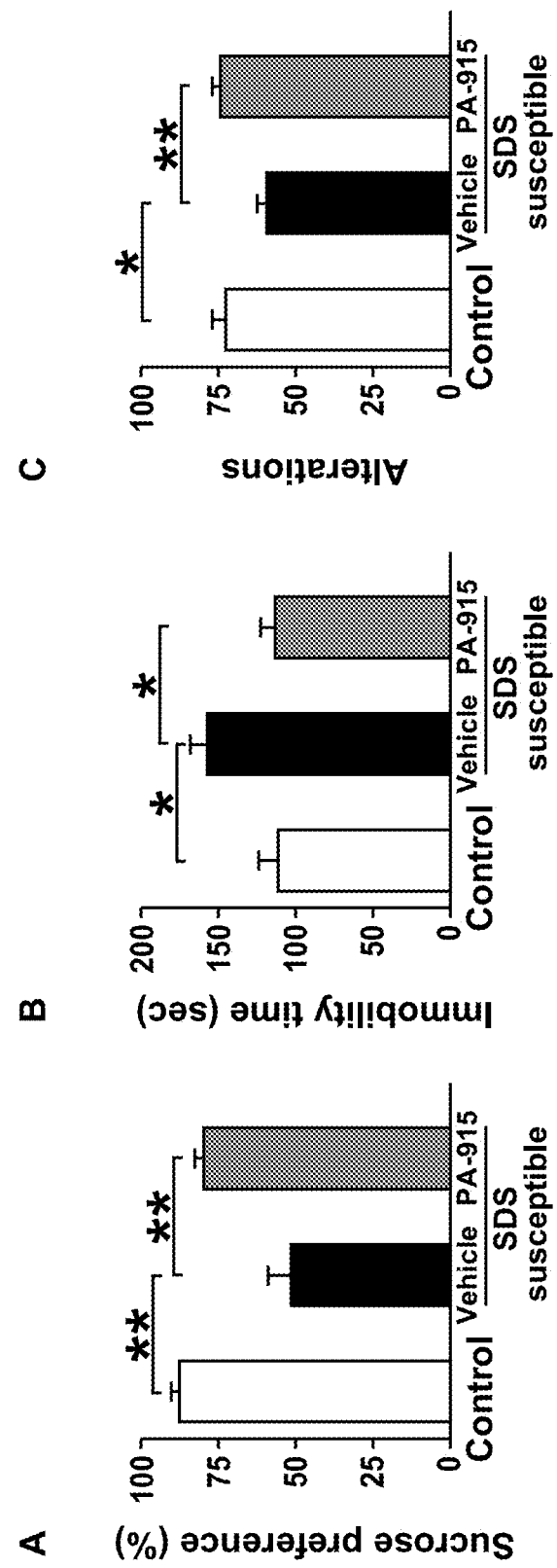
FIG. 32 shows the significant improving effect of PA-915 by oral administration on depressive-like behavior and cognitive impairment ascribable to chronic social defeat stress (evaluation by a sucrose preference test, a forced swim test, and a Y maze test).

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=16) or PA-915 (30 mg/kg; n=17) was orally administered thereto (0.1 mL/10 g). On Day 15, the sucrose preference test was conducted (a sucrose preference ratio was studied from 5:00 p.m. on Day 14 to 10:00 a.m. on Day 15). The results are shown in FIG. 32A. Mice reared for 10 days in a home cage without chronic social defeat stress load were used as a control (n=12). The data was indicated by mean±standard error. **P<0.01 (One-way ANOVA followed by Tukey-Kramer test).

(2) Improving Effect of PA-915 by Oral Administration on Depressive-Like Behavior (Evaluation by Forced Swim Test)

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=14) or PA-915 (30 mg/kg; n=16) was orally administered thereto (0.1 mL/10 g). On Day 15, the mice were forced to swim for 6 minutes, and an immobility time was measured. The results are shown in FIG. 32B. Mice reared for 10 days in a home cage without chronic social defeat stress load were used as a control (n=12). The data was indicated by mean±standard error. *P<0.05 (One-way ANOVA followed by Tukey-Kramer test).

(3) Improving Effect of PA-915 by Oral Administration on Cognitive Impairment (Evaluation by Y Maze Test)

Chronic social defeat stress was applied at 10 min/day for 10 days (Days 1 to 10) to male C57BL/6N mice (8 to 12 weeks old) each reared in isolation for 10 days or longer. On Day 11, SPAT was conducted, and susceptible mice were selected. On the next day (Day 12), a vehicle (10% DMSO solution; dissolved in saline; n=15) or PA-915 (30 mg/kg; n=16) was intraperitoneally administered thereto (0.1 mL/10 g). On Day 13, the mice were allowed to explore the Y maze for 5 minutes in a laboratory (illuminance: 20 lx). The results are shown in FIG. 32C. Mice reared for 10 days in a home cage without chronic social defeat stress load were used as a control (n=16). The data was indicated by mean±standard error. **P<0.01; *P<0.05 (One-way ANOVA followed by Tukey-Kramer test).

[Example 24] Effect of PA-915 on Depressive-Like Behavior Ascribable to Long-Term Isolated Rearing Stress (Evaluation by Forced Swim Test)

Social long-term isolated rearing from a juvenile stage is known to cause attack, anxiety, depressive-like behavior, and the like after maturation, and generally used as antidepressant drug evaluation models.

Figure 33:
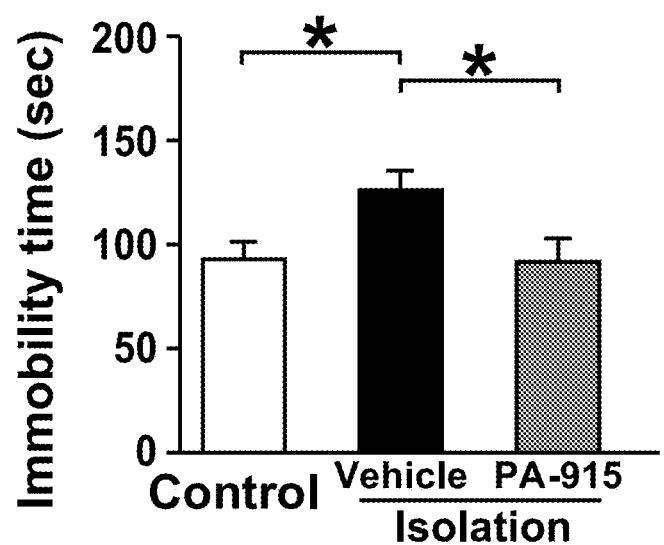
FIG. 33 shows the significant improving effect of PA-915 by single-dose administration on depressive-like behavior ascribable to long-term isolated rearing stress (evaluation by a forced swim test).

Male C57BL/6J mice (3 weeks old) were each individually reared in a gray cage (24 cm long, 17 cm wide, and 12 cm high) that prevented the mice from seeing surroundings for 6 weeks. A vehicle (10% DMSO solution; dissolved in saline; n=14) or PA-915 (30 mg/kg; n=13) was intraperitoneally administered (0.1 mL/10 g) to the mice. The mice were forced to swim for 6 minutes 24 hours later, and an immobility time was measured. The results are shown in FIG. 33. Mice reared in a group (6 mice per cage) in a cage having the same size thereas without long-term isolated rearing were used as a control (n=16). The data was indicated by mean±standard error. *P<0.05 (One-way ANOVA followed by Tukey-Kramer test). The single-dose administration of PA-915 also improved depressive-like behavior with the immobility time as an index in depression model animals other than chronic social defeat stress models.

[Example 25] Comparison Among Effects of PA-915, Ketamine and Existing Drug Fluoxetine on Depressive-Like Behavior Ascribable to Repeated Corticosterone Administration (Evaluation by Forced Swim Test and Enzyme-Linked Immunosorbent Assay (ELISA))

(1) Improving Effect of PA-915 on Depressive-Like Behavior (Evaluation by Forced Swim Test)

Chronically corticosterone-administered model mice are model mice that mimic high plasma corticosterone levels associated with the hyperactivation of the hypothalamic-pituitary-adrenal system under pathological stress, and are generally used as depression model mice.

Figure 34:
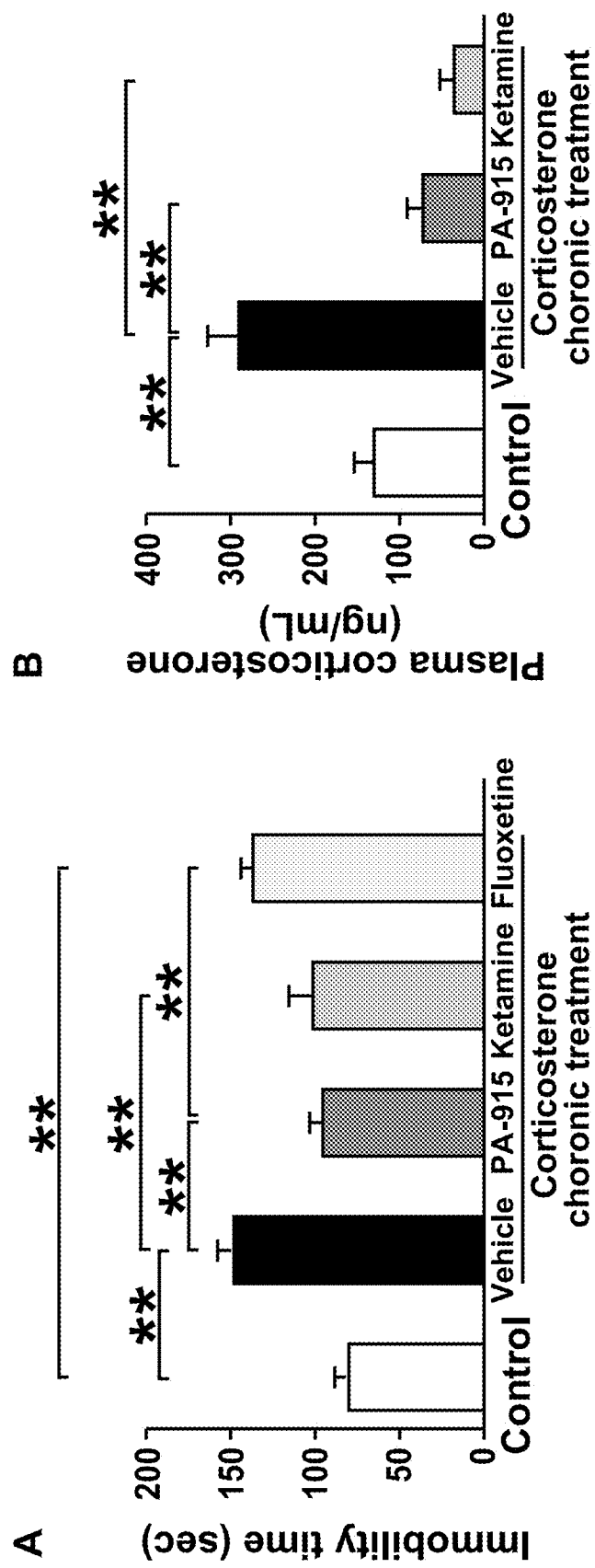
FIG. 34 shows the comparison among the effects of PA-915, ketamine and an existing drug fluoxetine on depressive-like behavior ascribable to repeated corticosterone administration (evaluation by a forced swim test and enzyme-linked immunosorbent assay (ELISA)).

A vehicle (0.5% carboxymethylcellulose solution) or corticosterone (20 mg/kg) was subcutaneously administered (0.1 mL/10 g) to male C57BL/6J mice (6 weeks old) for 21 days. A vehicle (10% DMSO solution; dissolved in saline; n=11), PA-915 (30 mg/kg; n=13), ketamine (20 mg/kg; n=13) or fluoxetine (20 mg/kg; n=15) was intraperitoneally administered thereto (0.1 mL/10 g) 3 hours after administration on the 21st day. The mice were forced to swim for 6 minutes 24 hours later, and an immobility time was measured. The results are shown in FIG. 34A. Mice given the vehicle by repeated administration without repeated corticosterone administration were used as a control (n=11). The data was indicated by mean±standard error. **P<0.01 (One-way ANOVA followed by Tukey-Kramer test). The single-dose administration of PA-915 also improved depressive-like behavior with the immobility time as an index in these depression models, as in ketamine. On the other hand, fluoxetine exhibited no improving effect.

(2) Improving Effect of PA-915 on Depressive-Like Behavior (Evaluation by Plasma Corticosterone Level)

A vehicle (0.5% carboxymethylcellulose solution) or corticosterone (20 mg/kg) was subcutaneously administered (0.1 mL/10 g) to male C57BL/6J mice (7 weeks old) for 21 days. A vehicle (10% DMSO solution; dissolved in saline; n=4), PA-915 (30 mg/kg; n=4) or ketamine (20 mg/kg; n=4) was intraperitoneally administered thereto (0.1 mL/10 g) 3 hours after administration on the 21st day. On the next day, the mice were subjected to the forced swim test and then decapitated, and systemic circulating blood was collected. The plasma corticosterone level was measured using Corticosterone ELISA kit from Cayman Chemical Company. The results are shown in FIG. 34B. Mice given the vehicle by repeated administration without repeated corticosterone administration were used as a control (n=4). The data was indicated by mean±standard error. **P<0.01 (One-way ANOVA followed by Tukey-Kramer test). The single-dose administration of PA-915 decreased the plasma corticosterone level, as in ketamine.

[Example 26] Effect of PA-915 on Depressive-Like Behavior of Female Mouse Ascribable to Repeated Corticosterone Administration (Evaluation by Forced Swim Test)

Figure 35:
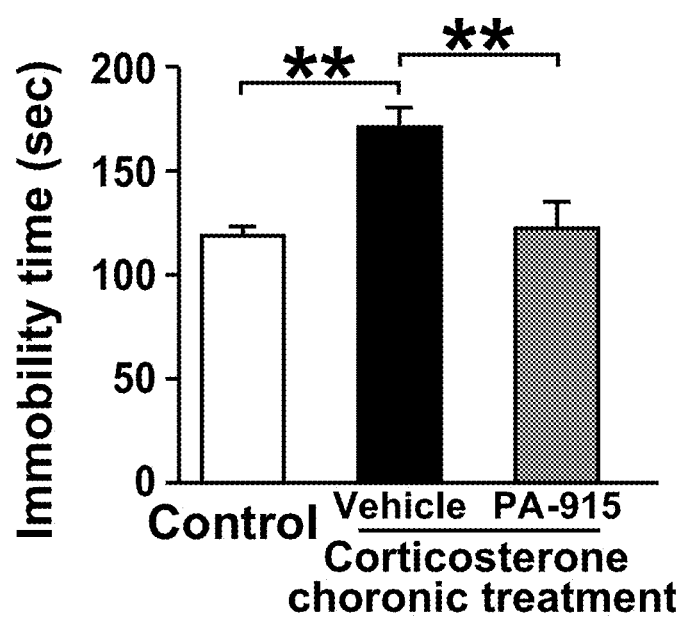
FIG. 35 shows the significant improving effect of PA-915 by single-dose administration on depressive-like behavior ascribable to repeated corticosterone administration using female mice (evaluation by a forced swim test).

A vehicle (0.5% carboxymethylcellulose solution) or corticosterone (20 mg/kg) was subcutaneously administered (0.1 mL/10 g) to female C57BL/6J mice (9 weeks old) for 21 days. A vehicle (10% DMSO solution; dissolved in saline; n=8) or PA-915 (30 mg/kg; n=9) was intraperitoneally administered thereto (0.1 mL/10 g) immediately after administration on the 21st day. The mice were forced to swim for 6 minutes 24 hours later, and an immobility time was measured. The results are shown in FIG. 35. Mice given the vehicle by repeated administration without repeated corticosterone administration were used as a control (n=8). The data was indicated by mean±standard error. **P<0.01 (One-way ANOVA followed by Tukey-Kramer test). PA-915 improved depressive-like behavior with the immobility time as an index not only in the male mice but in the female mice.

[Example 27] Effect of PA-915 on Normal Mouse (Evaluation by Y Maze Test)

Figure 36:
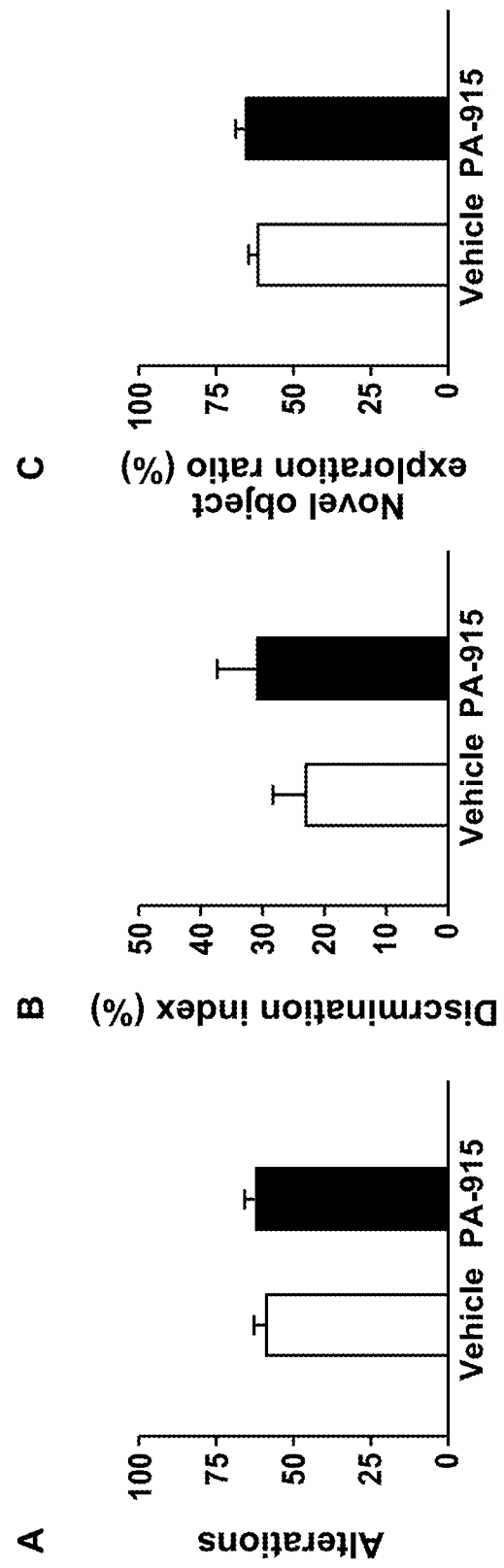
FIG. 36 shows the effect of PA-915 on normal mice (evaluation by a Y maze test and a novel object recognition test).

A vehicle (10% DMSO solution; dissolved in saline; n=11) or PA-915 (30 mg/kg; n=10) was intraperitoneally administered (0.1 mL/10 g) to male C57BL/6J mice (8 to 12 weeks old). After a lapse of 60 minutes after administration, the mice were allowed to explore the Y maze for 5 minutes in a laboratory (illuminance: 20 lx). The results are shown in FIG. 36A. The data was indicated by mean±standard error. PA-915 had no influence on the cognitive function of the normal mice.

[Example 28] Effect of PA-915 on Normal Mouse (Evaluation by Novel Object Recognition Test)

Male C57BL/6J mice (8 weeks old) were acclimatized to the test box by exploration at 10 min/day for 3 days. On the fourth day, two objects differing in shape were placed in the test box, and the mice were allowed to freely explore the test box for 10 minutes (training trial). 23 hours after the completion of exploration, a vehicle (10% DMSO solution; dissolved in saline; n=10) or PA-915 (30 mg/kg; n=10) was intraperitoneally administered thereto (0.1 mL/10 g). 60 minutes later, one of the two objects was changed to a novel object, and the mice were allowed to explore the test box for 5 minutes (retention trial). Novel and known object exploration times were measured. The results are shown in FIGS. 36B and 36C (B: discrimination index, C: novel object exploration ratio). The data was indicated by mean±standard error. PA-915 had no influence on the cognitive function of the normal mice.

[Example 29] Fear Memory Retrieval Suppressing Effect of PA-915: Study in Fear-Conditioned Learning Model (PTSD Model)

Figure 37:
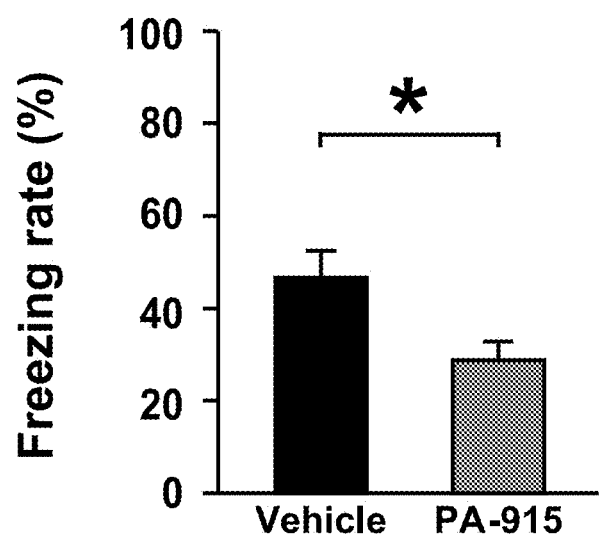
FIG. 37 shows results of studying the fear memory retrieval suppressing effect of PA-915 in fear-conditioned learning models (PTSD models).

On Day 0, male C57BL/6J mice (8 to 12 weeks old) were acclimatized to an experimental environment. On the next day (Day 1), the mice learned in relation to a contextual stimulus (introduction to a test cage) and an unconditioned stimulus (stimulus that causes freezing response by itself; electric stimulus in this study) and were thereby caused to exhibit fear response (freezing response) by the contextual stimulus alone (fear conditioning). On the next day (Day 2), a vehicle (10% DMSO solution; dissolved in saline; n=9) or PA-915 (30 mg/kg; n=10) was intraperitoneally administered thereto (0.1 mL/10 g). 60 minutes later, the mice were exposed to the contextual stimulus (introduction to a test cage with an electric stimulus) for 3 minutes, and a freezing rate was measured during the exposure to the contextual stimulus. The results are shown in FIG. 37. PA-915 significantly suppressed fear memory retrieval (fast-acting anti-anxiety effect). The data was indicated by mean±standard error. *P<0.05 (Student's t-test).

All publications, patents, and patent applications cited herein are incorporated herein by reference in their entirety.

The invention claimed is:

1. A method for treating and/or preventing a disease that is anxiety disorder, stress disorder, and/or depression, comprising administering to a subject in need thereof an effective amount of a compound of formula (I):

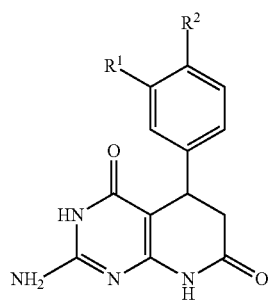

(I)

wherein
$R^1$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group; and $R^2$ is a hydrogen atom, a $C_{1-6}$-alkyl group, a $C_{1-6}$-alkoxy group, a $C_{2-6}$-alkenyloxy group, a halogen atom, a $C_{1-6}$-haloalkyl group, a $C_{1-6}$-haloalkoxy group, or a substituted or unsubstituted phenyl group;

or a salt thereof, or a solvate thereof.

2. The method according to claim 1, wherein the compound of formula (I) or the salt thereof, or the solvate thereof is orally administered.

3. A method for treating and/or preventing a disease that is anxiety disorder, stress disorder, and/or depression, comprising administering to a subject in need thereof an effective amount of a compound of formula (II):

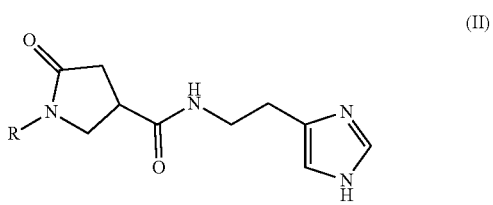

(II)

wherein R is an indazolyl group substituted with a halogen atom; a substituted or unsubstituted phenyl group; a pyrazolyl group; or a substituted or unsubstituted aralkyl group;

or a salt thereof, or a solvate thereof.

4. The method according to claim 3, wherein R is an indazolyl group substituted with a halogen atom.

5. The method according to claim 3, wherein the halogen is chlorine.

6. The method according to claim 3, wherein the compound of formula (II) or the salt thereof, or the solvate thereof is orally administered.

7. The method according to claim 4, wherein the compound of formula (II) or the salt thereof, or the solvate thereof is orally administered.

8. The method according to claim 5, wherein the compound of formula (II) or the salt thereof, or the solvate thereof is orally administered.

9. The method according to claim 1, wherein the disease is depression.

10. The method according to claim 1, wherein the disease is an anxiety disorder.

11. The method according to claim 1, wherein the disease is a stress disorder.

12. The method according to claim 3, wherein the disease is depression.

13. The method according to claim 3, wherein the disease is an anxiety disorder.

14. The method according to claim 3, wherein the disease is a stress disorder.

* * * * *